(12) United States Patent
Imai et al.

(10) Patent No.: US 7,212,721 B2
(45) Date of Patent: May 1, 2007

(54) VARIABLE OPTICAL ATTENUATOR

(75) Inventors: Kiyoshi Imai, Kyoto (JP); Kazuki Fukuda, Kasatsu (JP); Yoichi Nakanishi, Kyoto (JP); Hirokazu Tanaka, Nagaokakyo (JP); Tetsuya Onishi, Kasatsu (JP)

(73) Assignee: Omron Corporation, Kyoto (JP)

(*) Notice: Subject to any disclaimer, the term of this patent is extended or adjusted under 35 U.S.C. 154(b) by 0 days.

(21) Appl. No.: 10/519,762

(22) PCT Filed: Jun. 27, 2003

(86) PCT No.: PCT/JP03/08188

§ 371 (c)(1),
(2), (4) Date: Jul. 26, 2005

(87) PCT Pub. No.: WO2004/008219

PCT Pub. Date: Jan. 22, 2004

(65) Prior Publication Data

US 2006/0013553 A1 Jan. 19, 2006

(30) Foreign Application Priority Data

Jul. 12, 2002 (JP) ............................. 2002-204727
Jan. 20, 2003 (JP) ............................. 2003-010661

(51) Int. Cl.
*G02B 6/00* (2006.01)
(52) U.S. Cl. .................................................... 385/140
(58) Field of Classification Search ............ 385/16–24, 385/140
See application file for complete search history.

(56) References Cited

U.S. PATENT DOCUMENTS 6,137,941 A 10/2000 Robinson
6,304,709 B1* 10/2001 Fujita ......................... 385/140
6,628,882 B2* 9/2003 Vaganov et al. ............ 385/140

FOREIGN PATENT DOCUMENTS

| JP | 2-58721 | 4/1990 |
| JP | 10-307264 A | 11/1998 |
| JP | 2003-195191 A | 7/2003 |

OTHER PUBLICATIONS

English Translation of JP-A-2003-195191 published on Jul. 9, 2003, 10 pages (Japanese Publication and Patent Abstracts of Japan were filed on Dec. 29, 2004).
English Translation of Japanese Utility Model Laid-Open No. 2-58721 published on Apr. 26, 1990, 3 pages (Japanese Utility Model Laid-Open was filed on Dec. 29, 2004).
Patent Abstracts of Japan, publication No. 10-307264, published on Nov. 17, 1998 (1 page).
Patent Abstracts of Japan, publication No. 2003-195191, published on Jul. 9, 2003 (1 page).

* cited by examiner

*Primary Examiner*—Quyen Leung
(74) *Attorney, Agent, or Firm*—Osha Liang LLP

(57) ABSTRACT

Two mirrors (15) and (16) making an angle of 90 degrees are formed on a front face of a mirror member (17). An optical fiber for input (12) and an optical fiber for output (13) are held in a fiber array (14) with a predetermined interval, and an emission lens (23) and an injection lens (24) are provided on a front face of the fiber array (14) in a way that they are opposed to end faces of the optical fiber for input (12) and the optical fiber for output (13) respectively. According to the variable optical attenuator, when the mirror member (17) is straightly moved by an actuator (18), light attenuation can be varied thereby.

9 Claims, 55 Drawing Sheets

PRIOR ART

SINGLE-MODE FIBER

MULTI-MODE FIBER

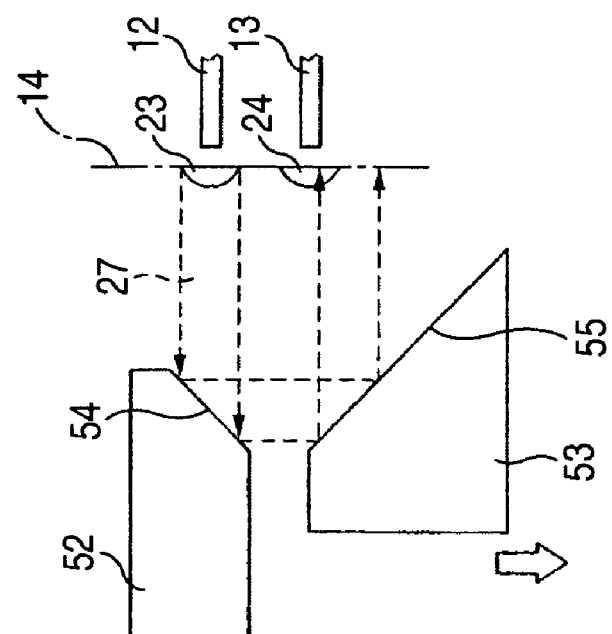
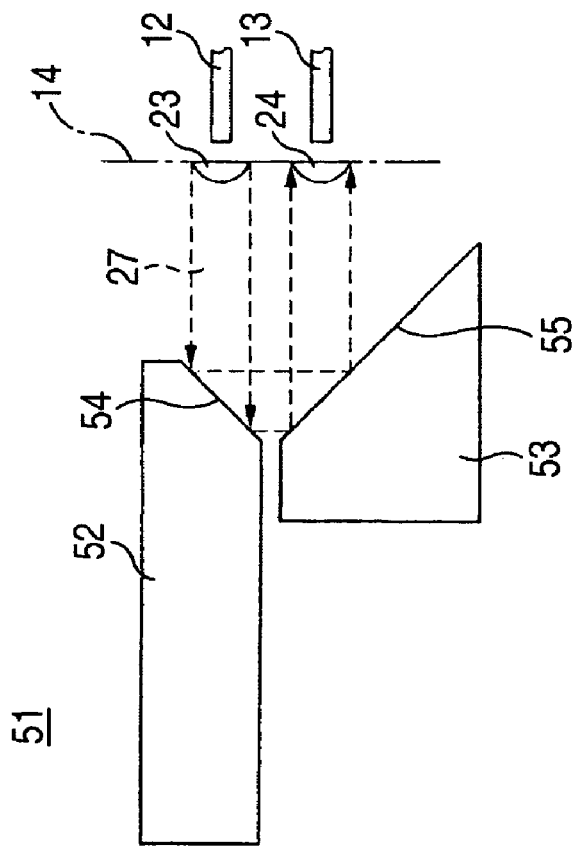
FIG. 29A
FIG. 29B

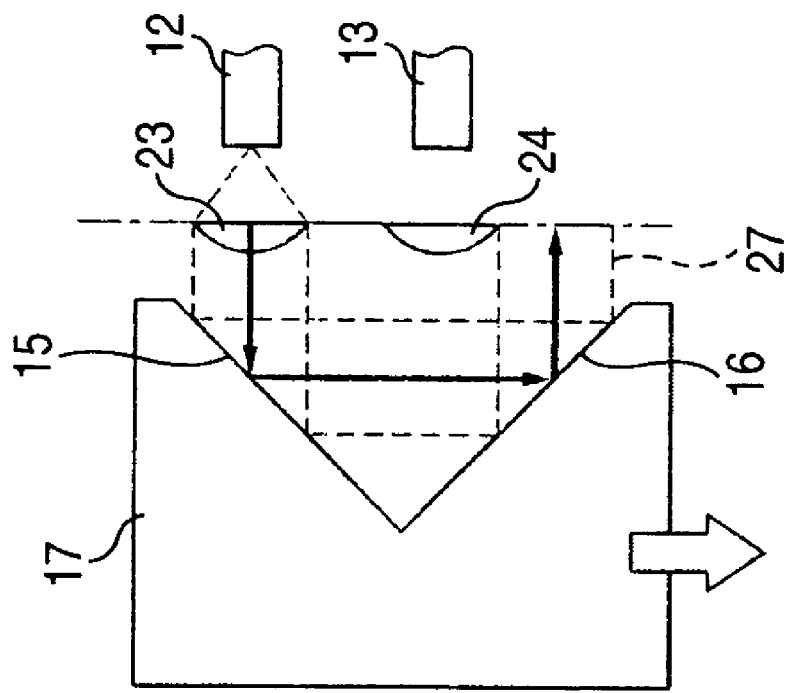
FIG. 53A WHEN SWITCH IS ON
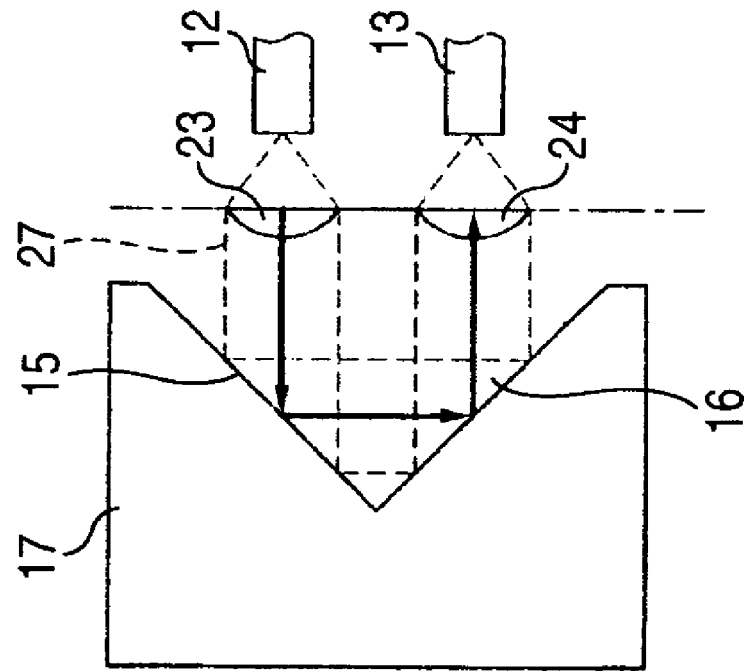
FIG. 53B WHEN SWITCH IS OFF

VARIABLE OPTICAL ATTENUATOR

TECHNICAL FIELD

The present invention relates to a variable optical attenuator that can adjust light attenuation.

BACKGROUND ART

The variable optical attenuator (VOA), which attenuates light injected from an optical transmission channel for input (typically, optical fiber) and outputs it to an optical transmission channel for output (typically, optical fiber), can variably adjust the light attenuation. As a method for controlling the light attenuation in such a variable optical attenuator, various types have been proposed. For example, there are a mechanical type in which a shutter is inserted/removed halfway an optical path between opposed end faces of optical fibers and the light attenuation is adjusted using a shading level by the shutter, and a type in which an optical element such as Faraday rotator or thermooptic element is disposed halfway the optical channel.

However, in the first variable optical attenuator of the mechanical type, there is a problem of wavelength dependence or polarization-dependant loss because of diffraction at an edge of the shutter. Furthermore, a conventional actuator used in the mechanical-type attenuator is large in size, therefore miniaturization of the variable optical attenuator has been difficult.

In the second variable optical attenuator using the optical element, the variable optical attenuator is expensive because the expensive optical element such as Faraday rotator or thermooptic element is required, in addition, since it does not have self-holding capability of the light attenuation, current needs to be continuously applied to an electrical element for affecting on the optical element, therefore power consumption has been large. Also, an electrical element for affecting on other optical elements or an optical element is necessary with regard to the optical element, therefore a structure of the attenuator has been apt to be complicated.

As a variable optical attenuator using a light reflection surface, an attenuator disclosed in U.S. Pat. No. 6,137,941 is known. FIG. 1 is a schematic view showing a structure of the conventional variable optical attenuator. In the variable optical attenuator, as shown in FIG. 1, a lens 3 is disposed on end faces of an optical transmission channel for input 1 and an optical transmission channel for output 2 arranged parallel, a mirror 4 is provided at a position distant from the lens 3 only by the focal distance of the lens f, and the mirror 4 is rotatably supported by a fulcrum 5. Here, an intermediate line between the optical transmission channel for input 1 and the optical transmission channel for output 2 coincides with an optical axis of the lens 3, and the fulcrum 5 is located on an extension of the line. A piezoelectric actuator 7 is inserted between the mirror 4 and a base 6, and the piezoelectric actuator 7 is expanded and contracted with being controlled by a controller 8, thereby tilt of the mirror 4 can be optionally adjusted.

Thus, when the mirror 4 is perpendicular to the optical axis of the lens 3, light emitted parallel to the optical axis of the lens 3 from the optical transmission channel for input 1 refracts when it transmits through the lens 3 and then reaches the mirror 4, and the light reflected on the mirror 4 refracts when it transmits through the lens 3 and becomes parallel to the optical axis of the lens 3 and then it is injected into the optical transmission channel for output 2. In this case, when an optical axis of the light injected into the optical transmission channel for output 2 coincides with an axis center of the optical transmission channel for output 2, a quantity of light injected into the optical transmission channel for output 2 is maximized (the light attenuation is minimized). On the contrary, when the mirror 4 is tilted by the piezoelectric actuator 7, the optical axis of the light that is emitted from the optical transmission channel for input 1 and reflected on the mirror 4 and then returned to the optical transmission channel for output 2 is displaced from the axis center of the optical transmission channel for output 2, and the quantity of light injected into the optical transmission channel for output 2 decreases, therefore as the tilt of the mirror 4 increases, the attenuation of the light injected into the optical transmission channel for output 2 increases.

According to the variable optical attenuator having such a structure, the problem such as the wavelength dependence in the variable optical attenuator of the shutter type does not occur, in addition, the problem of high price due to the optical element can be avoided.

However, in the variable optical attenuator having such a structure, the lens 3 must be distant from the mirror 4 only by the focal distance of the lens 3, in addition, to reduce aberration of the light emitted from the optical transmission channel for input 1 or the light injected into the optical transmission channel for output 2, a portion near the optical axis of the lens 3 needs to be used as much as possible, and a short-focus lens can not be used, therefore the miniaturization of the variable optical attenuator has been restricted in such a structure. In the method of tilting the mirror 3, since the optical axis of light injected into the optical transmission channel for output 2 sensitively displaces even upon slight tilt of the mirror 3, the tilt of the mirror 3 needs to be controlled severely, therefore accurate control of the light attenuation has been difficult. Since the piezoelectric actuator is also used in this variable optical attenuator, the mirror 3 can not hold its angle by itself, resulting in large power consumption.

DISCLOSURE OF THE INVENTION

The invention, which was made in the light of such points, aims to provide a variable optical attenuator that can be miniaturized and can accurately control the light attenuation.

The variable optical attenuator according to the invention attenuates the light injected from the optical transmission channel for input and outputs it into the transmission channel for output, and can adjust the light attenuation, which has the optical transmission channel for input, the optical transmission channel for output, light reflection surfaces for reflecting the light emitted from the optical transmission channel for input to the optical transmission channel for output, and an actuator that straightly moves all or part of the light reflection surfaces relatively and straightly to at least one of the optical transmission channel for input and the optical transmission channel for output.

Here, in an embodiment of the variable optical attenuator according to the invention, the actuator can straightly move one of at least part of the light reflection surfaces, the optical transmission channel for input, or the optical transmission channel for output (hereinafter, referred to as light reflection surfaces and the like) such that the optical axis of the light reflected to the optical transmission channel for emission is displaced with respect to an axis center of the optical transmission channel for emission.

According to the variable optical attenuator according to the invention, the light reflection surfaces and the like for reflecting the light emitted from the optical transmission channel for input is straightly moved by the actuator, thereby the optical axis of the light injected into the optical transmission channel for output can be moved relatively to the optical transmission channel for output, and thereby the light attenuation can be varied. Here, while the light reflection surfaces can be a surface capable of reflecting light, particularly, a mirror, mirror surface of metal, and mirror coating surface are desirable. Also, the light reflection surface can be formed by a boundary surface of transparent media having different refraction indicia (for example, boundary surface between a prism and air), wherein the light is perfectly reflected on the light reflection surfaces. The light reflection surfaces can be not only surfaces formed to be a flat surface, but also curved surfaces such as spherical surface. When any of the light reflection surfaces are the flat surfaces, a moving direction of the light reflection surfaces must not be parallel to surface directions of all the light reflection surfaces, however in case of the curved surface, such restriction is eliminated. As the optical transmission channel for input or output, the optical fiber or an optical waveguide channel can be used.

Thus, since the variable optical attenuator has a simple structure that the light reflection surfaces and the like for reflecting light emitted from the optical transmission channel for input are merely moved straightly by the actuator, the variable optical attenuator can be miniaturized. In addition, because of only straightly moving the light reflection surfaces and the like, the light attenuation does not sensitively respond upon variation during moving the light reflection surfaces compared with the attenuator using tilt of the light reflection surfaces, therefore the light attenuation can be accurately controlled.

Another embodiment of the variable optical attenuator according to the invention has a monitor part which receives light that is emitted from the optical transmission channel for input but not injected into the optical transmission channel for output. The variable optical attenuator of the embodiment can indirectly know the quantity of light injected into the optical transmission channel for output, because it has the monitor part which receives the light that is not injected into the optical transmission channel for output. In addition, since it does not directly detect the quantity of light injected into the optical transmission channel for output, loss of light outputted from the variable optical attenuator is prevented. Also, monitoring accuracy can be improved. Furthermore, by providing the monitor part in the variable optical attenuator, an individual monitor need not be provided at, for example, a subsequent stage of the variable optical attenuator, therefore entire cost including the monitor part can be reduced, in addition, size is not substantially increased even if the monitor part is provided.

Furthermore, in the embodiment, an injection lens disposed oppositely to the light injection surface of the optical transmission channel for output, and a monitor lens disposed oppositely to the light injection surface of the monitor part can be integrated. In such a variable optical attenuator, since the injection lens and the monitor lens are integrated, the quantity of light that is not injected into either the injection lens or the monitor lens and causes loss can be decreased. Accordingly, the quantity of monitoring light increases and the monitoring accuracy can be improved. Furthermore, temperature rise in the variable optical attenuator due to the light causing loss can be prevented.

Furthermore, in the embodiment, a function of correcting a position of the light reflection surfaces depending on output from the monitor part can be provided. For example, the variable optical attenuator is subjected to feedback control using the monitor output outputted from the monitor part, thereby the attenuator can be controlled such that the quantity of light injected into the optical transmission channel for output is maintained to be constant, or the light attenuation is constant.

In still another embodiment of the variable optical attenuator according to the invention, the actuator comprises a voice coil motor and a latch mechanism. In such a variable optical attenuator, since the voice coil is used, the actuator can be extremely diminished, in addition, the position of the light reflection surfaces can be accurately adjusted. Furthermore, since the latch mechanism is provided, when the voice coil is not applied with current, the light reflection surfaces can be fixed by the latch mechanism. Particularly, by forming a non-electrical latch mechanism, power consumption can be reduced.

In still another embodiment of the variable optical attenuator according to the invention, a mirror member having the light reflection surfaces that are two surfaces making an angle of 90 degrees, and the actuator that straightly moves the mirror member. According to such a variable optical attenuator, since the two light reflection surfaces are integrated into the mirror member such that they make the angle of 90 degrees, alignment between the mirror member and the optical transmission channel for input as well as the optical transmission channel for output can be performed without needing adjusting an angle between the light reflection surfaces, therefore assemble of the variable optical attenuator is facilitated.

Still another embodiment of the variable optical attenuator according to the invention is characterized by having a fiber array that holds the optical transmission channel for input and the optical transmission channel for output arranged parallel to each other. According to the embodiment, since the optical transmission channel for input and the optical transmission channel for output are integrated into the fiber array, alignment between the light reflection surface and the fiber array can be performed without needing adjusting a positional relation between both the transmission channels, therefore assemble of the variable optical attenuator is facilitated.

The components of the invention described above can be optionally combined to the utmost extent.

BRIEF DESCRIPTION OF THE DRAWING

FIGS. 29(a) and (b) are schematic plan views showing a configuration of a variable optical attenuator according to a seventh embodiment of the invention;

FIGS. 53(a) and (b) are schematic plan views showing a configuration of a variable optical attenuator according to still another embodiment of the invention;

BEST MODE FOR CARRYING OUT THE INVENTION

Hereinafter, the best mode for carrying out the invention is described in detail with reference to drawings.

First Embodiment

Figure 1:
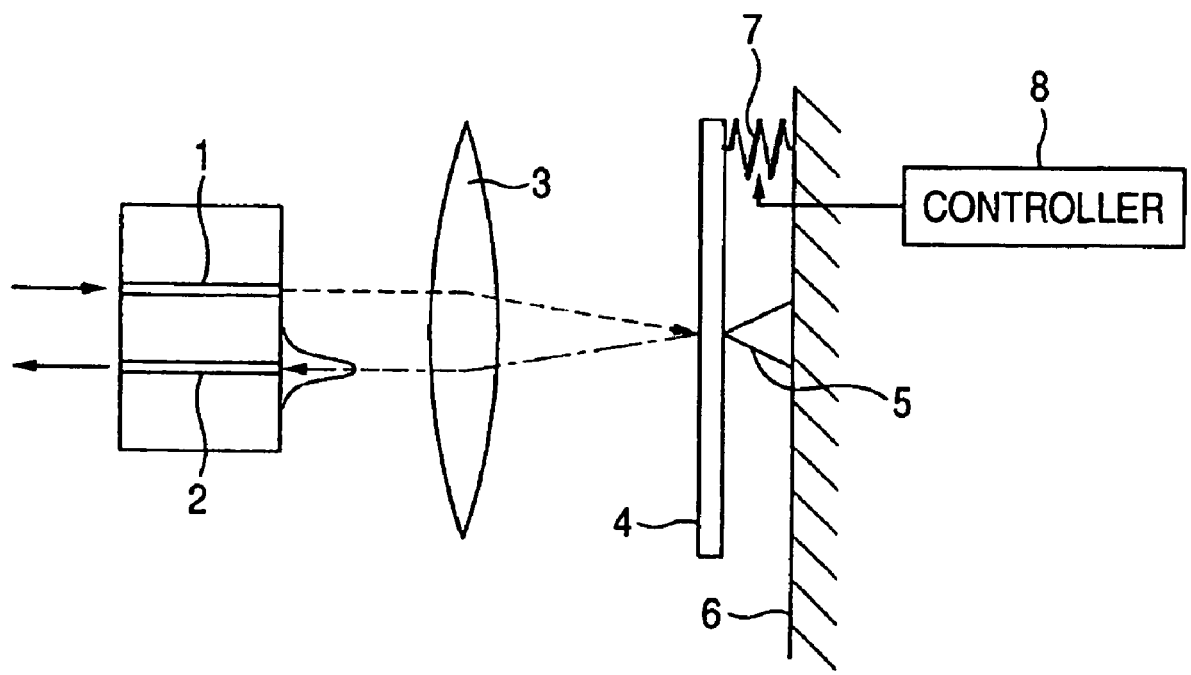
FIG. 1 is a schematic view showing a structure of a conventional, variable optical attenuator.
Figure 2:
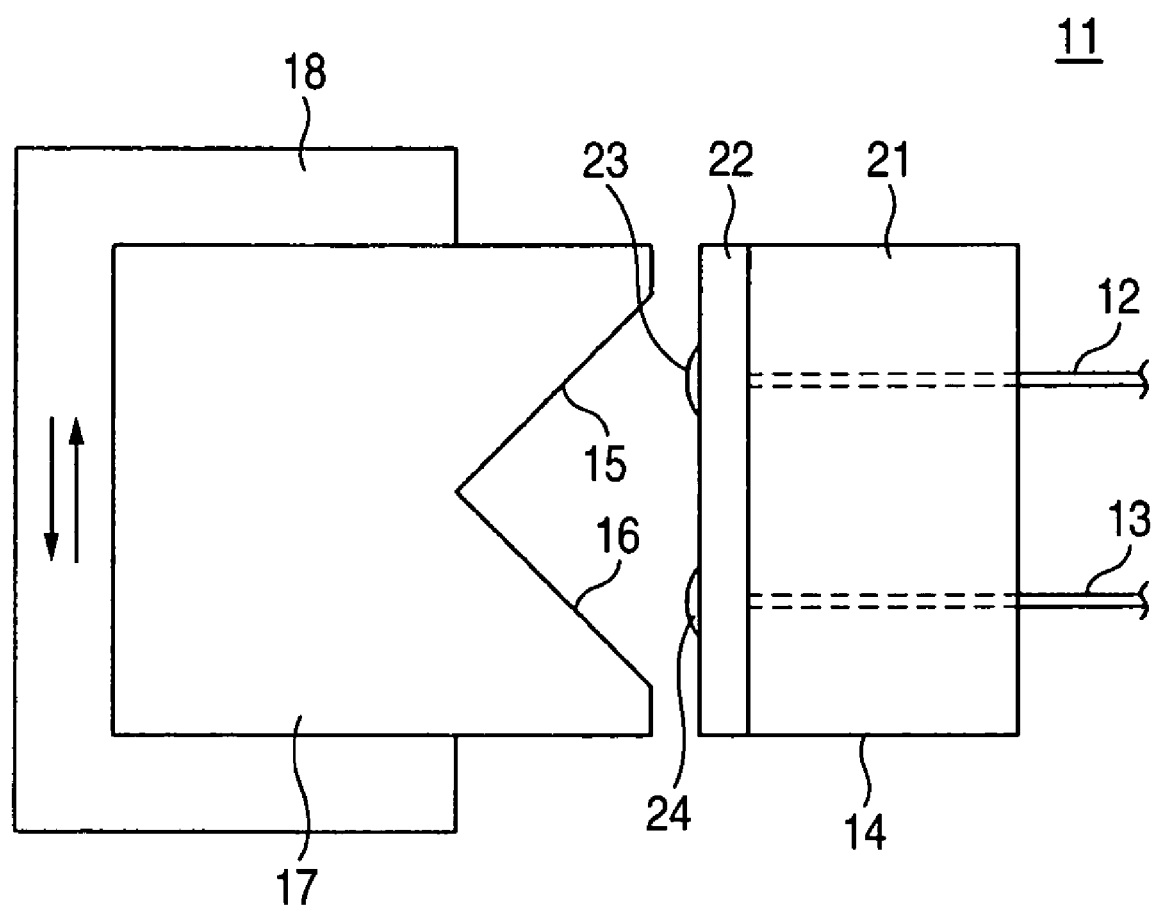
FIG. 2 is a plan view showing a structure of a variable optical attenuator according to a first embodiment of the invention.
Figure 3:
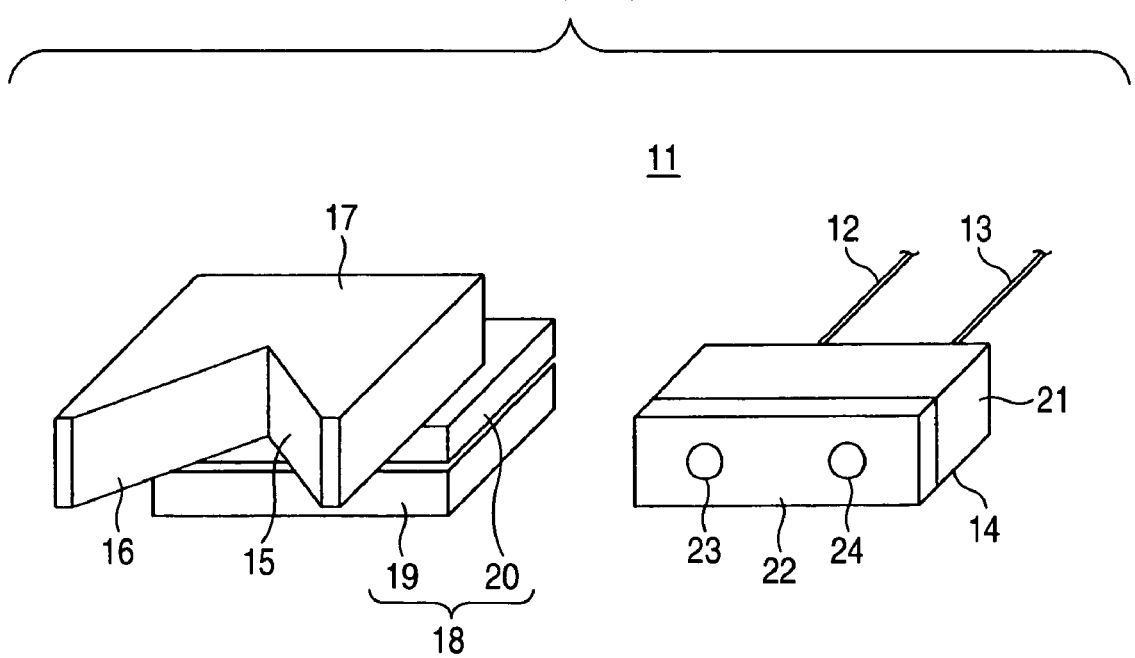
FIG. 3 is a perspective view of an actuator, a mirror member and a fiber array forming the same, variable optical attenuator in a condition that they are separated with each together.

FIG. 2 is a plan view showing a structure of a variable optical attenuator 11 according to the invention, and FIG. 3 is a perspective view of a member at a light reflection side of the attenuator and a member for light input/output in a condition that they are separated from each other. The variable optical attenuator 11 comprises a fiber array 14 having an optical fiber for input 12 (single-mode fiber) and an optical fiber for output 13 (single-mode fiber); a mirror member 17 having a first mirror 15 and a second mirror 16 intersecting at a right angle of 90 degrees (both of them are assumed to have mirror surface smoothness of λ/10 or more); and an actuator 18 for straightly moving the mirror member 17.

Two vertical mirrors 15, 16 which intersect at a right angle of 90 degrees to each other in planar view are formed on the front of the mirror member 17. The mirror member 17 comprises glass, silicon substrate, or metal such as brass, and the mirrors 15, 16 can be formed integrally into the mirror member 17. Alternatively, the mirrors 15, 16 that are members separated from the mirror member 17 can be pasted to the mirror member 17.

Figure 4:
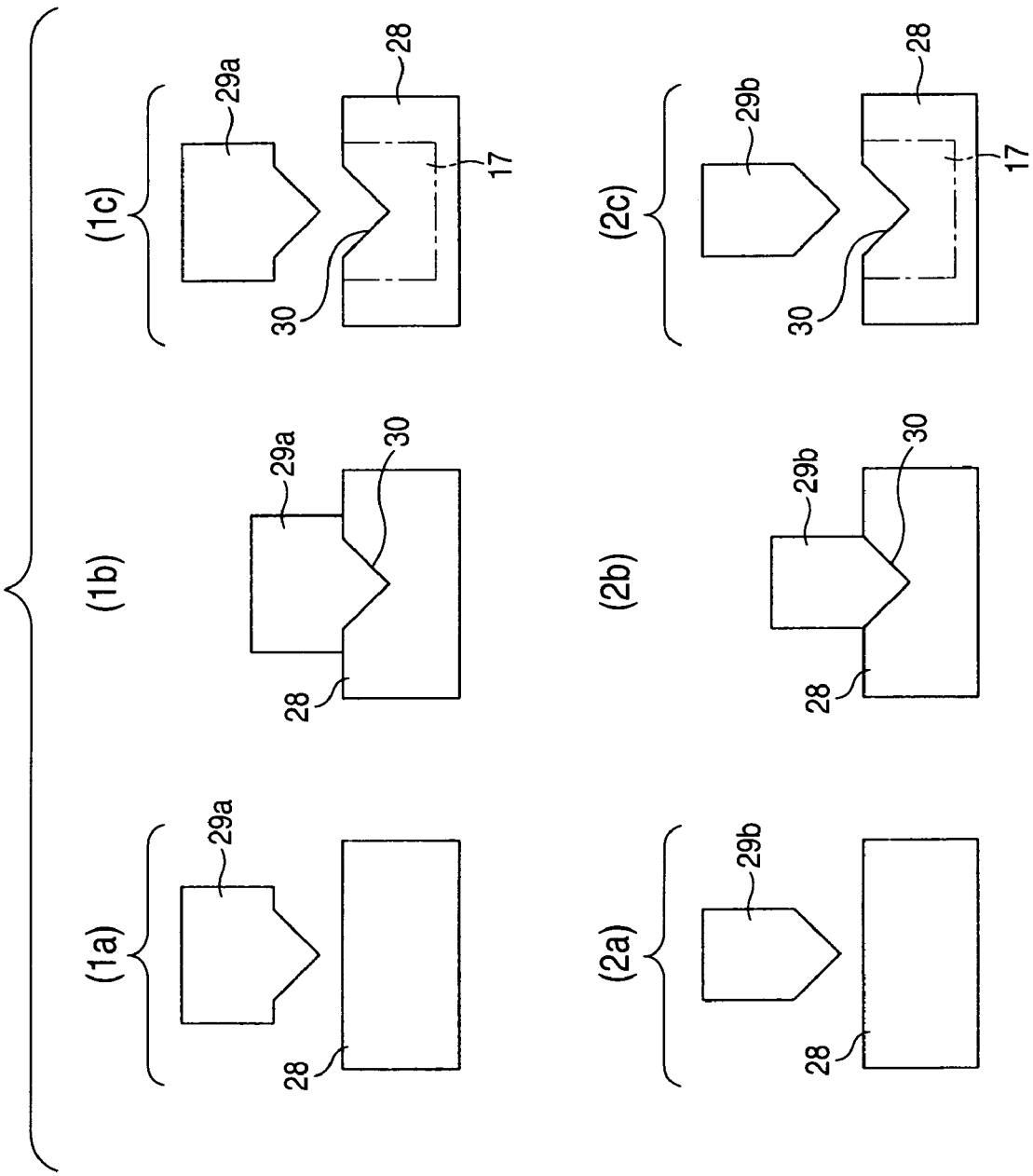
FIGS. 4 (1a), (1b) and (1c) are schematic views for illustrating a method for manufacturing the mirror member by metal pressing, and (2a), (2b) and (2c) are schematic views for illustrating a method for manufacturing the mirror member by machining process.

For example, FIGS. 4 (1a), (1b) and (1c) show a method for manufacturing the mirror member 17 by metal pressing. In FIG. 4 (1a), a symbol 28 is a metal material plate, a symbol 29a is a master for pressing, and a bottom of the master 29a has a projection having an angle of 90 degrees. When the master 29a is hit down and pressed against a top of the metal material plate 28, as shown in FIG. 4 (1b), an orthogonal groove 30 having inner surfaces making an angle of 90 degrees is formed on the upper surface of the metal material plate 28 by the master 29a. After the master 29a is separated from the metal material plate 28, when the metal material plate 28 is cut out along an alternate long and short dash line shown in FIG. 4 (1c), the mirror member 17 is obtained. After that, surfaces in the orthogonal groove 30 can be subjected to mirror polish.

FIG. 4 (2a), (2b) and (2c) show a method for manufacturing the mirror member 17 by machining process. A symbol 29b shown in FIG. 4 (2a) is a cutter for machining, and both sides of the cutter 29b make an angle of 90 degrees at outer circumference of the cutter. When the upper surface of the metal material plate 28 is machined using the cutter 29b, as shown in FIG. 4 (2b), the orthogonal groove 30 having inner surfaces making an angle of 90 degrees is formed on the upper surface of the metal material plate 28 by the cutter 29b. After that, when the metal material plate 28 is cut out along an alternate long and short dash line shown in FIG. 4 (2c), the mirror member 17 is obtained. After that, the surfaces in the orthogonal groove 30 can be subjected to the mirror polish.

Also, after forming the mirror member 17 having the orthogonal groove using the glass or silicon substrate, the mirrors 15, 16 can be formed by evaporating a metal thin film in the orthogonal groove. Alternatively, mirrors 15, 16 produced separately can be attached by adhesion in the orthogonal groove of the mirror member 17 made of plastic. Also, the mirror member 17 can be formed by pasting a prism lens. Alternatively, after forming the mirror member 17 having the orthogonal groove using the glass or plastic, inner surfaces of the orthogonal groove, or an entire front face of the mirror member 17 having the orthogonal groove can be subjected to the mirror coating.

Since a specific embodiment of the actuator 18 is described later, it is simply described here. The actuator 18 is a straight-moving-type actuator comprising a stationary part 19 and a movable part 20, and the movable part 20 can reciprocate to the stationary part 19 in an arrow direction in FIG. 2.

Figure 5:
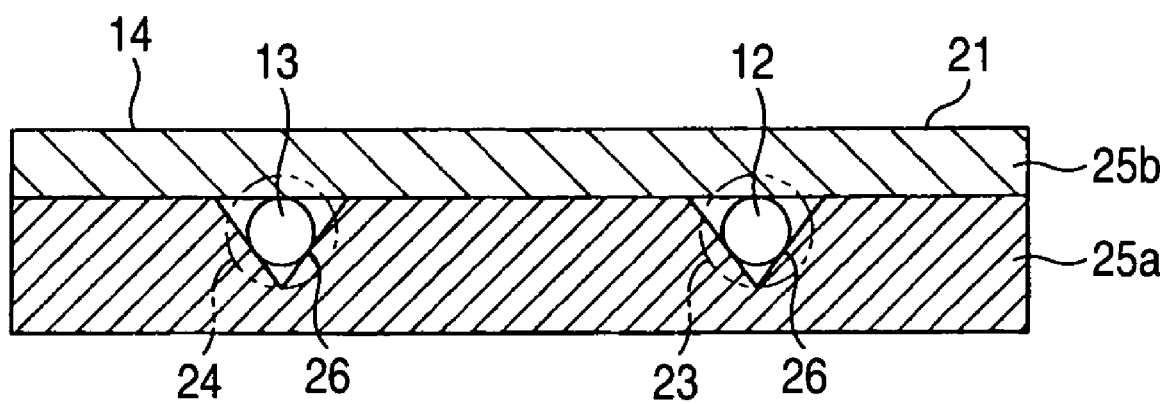
FIG. 5 is a cross section view of the fiber array in a holder position.

A fiber array 14 comprises a holder 21 that holds an optical fiber for input 12 and an optical fiber for output 13, and a lens array 22 adhered on a front face of the holder 21. As shown in FIG. 5, the holder 21 comprises a V groove array 25a and a cover 25b, and two V grooves 26 are formed on an upper surface of the V groove array 25a. A front end of the optical fiber for input 12 and a front end of the optical fiber for output 13 are received in the V grooves 26, and the cover 25b is integrally adhered on top of them. Accordingly, in the holder 21, axis centers of the optical fiber for input 12 and the optical fiber for output 13 are aligned at predetermined positions by the V grooves 26. On a front face of the lens array 22 provided on the front face of the holder 21, small emission lens 23 (aspherical lens) and injection lens 24 (aspherical lens) are formed. The lens array 22 is disposed on the front face of the holder 21, and then light emitted from both the optical fibers 12, 13 are emitted through both the lenses 23, 24, thereby both the optical fibers 12, 13 are aligned with both the lenses 23, 24 by bringing optical axes of the fibers into line with those of the lenses, and then the array 22 is adhered and fixed on the front face of the holder 21.

A lower surface of the mirror member 17 is fixed on the movable part 20 of the actuator 18 by adhesive resin and the like, and the mirror member 17 can move minutely in a lateral direction (method shown by arrows in FIG. 2) by driving the actuator 18. The fiber array 14 is disposed and fixed such that it is opposed to the front face of the mirror member 17, optical axes of the input optical fiber 12 and the emission lens 23 make an angle of 45 degrees to the mirror 15, and optical axes of the optical fiber for output 13 and the injection lens 24 make an angle of 45 degrees to the mirror 16. In a condition assembled in this way, an end face distance between the front face of the fiber array 14 and the front end face of the mirror member 17 is 500 μm, and special optical path length from emission from the emission lens 23 to injection into the injection lens 24 is 2 mm.

Figure 6:
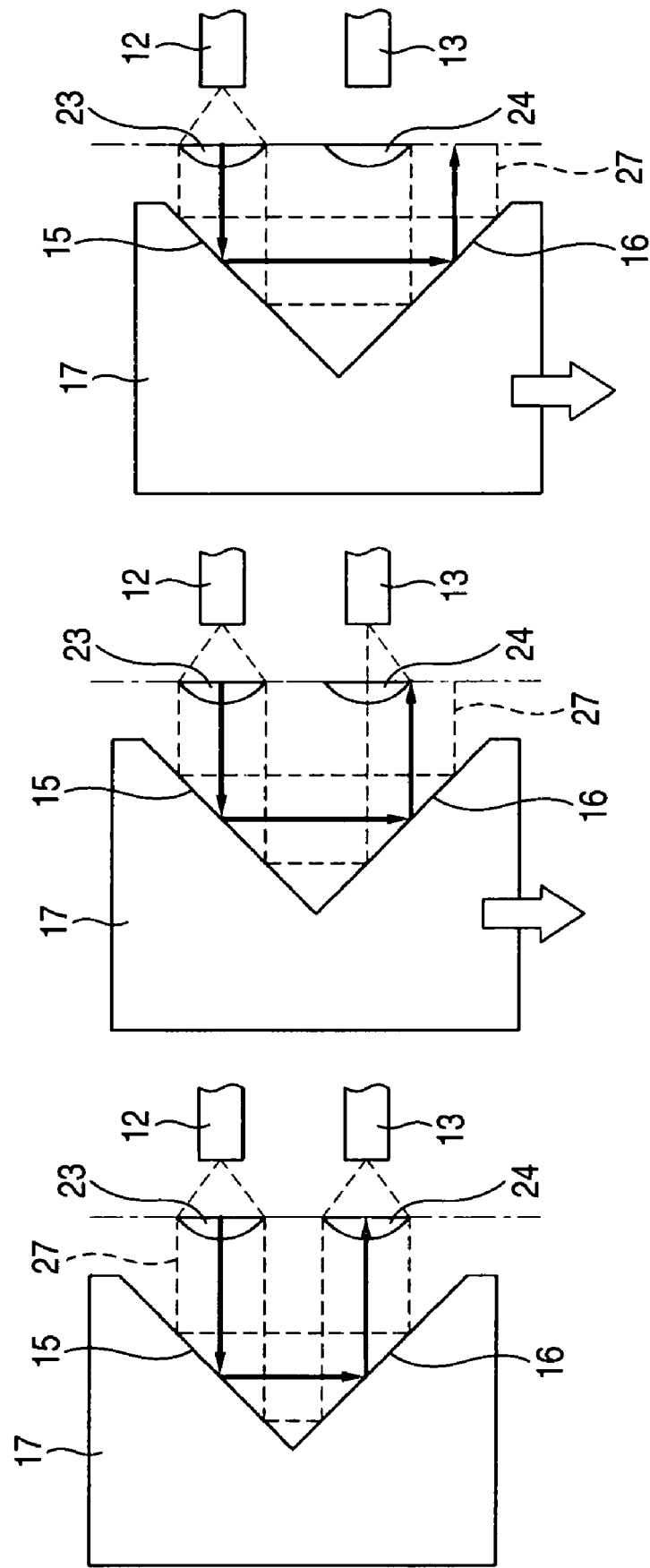
FIGS. 6(a), (b) and (c) are views for illustrating operation and a function of the variable optical attenuator shown in FIG. 2.

FIG. 6 is a view for illustrating operation and a function of the variable optical attenuator 11. FIG. 6(a) indicates a condition where a center of the mirror member 17 coincides with a center of the fiber array 14, which are opposed to each other, wherein light emitted from the input optical fiber 12 is converted into collimated light (100 μm in beam diameter) by the emission lens 23, the light 27 emitted from the emission lens 23 is reflected on the mirror 15, and further reflected on the mirror 16, and then approximately all beams are injected into the injection lens 24, and then light 27 condensed by the injection lens 24 is injected into the output optical fiber 13 and then externally transmitted. Accordingly, in this condition (condition of minimum displacement of the optical axis), the light attenuation is minimized.

FIG. 6(b) indicates a condition where the mirror member 17 is slightly moved in a direction shown in an outline arrow (lateral direction) by the actuator 18. In this condition, the light 27 emitted from the optical fiber for input 12 is reflected on the mirrors 15, 16, and then only part of the light is injected into the optical fiber for output 13. Accordingly, in this condition, the light attenuation is large.

FIG. 6(c) indicates a condition where the mirror member 17 is moved only a distance equal to a radius of the injection lens 24 in a direction shown in the outline arrow. In this condition, the light 27 emitted from the optical fiber for input 12 is reflected on the mirrors 15, 16, and then approximately all the light is irradiated outside the injection lens 24, and hardly injected into the output optical fiber 13. Accordingly, in this condition, the light attenuation is maximized.

Figure 7:
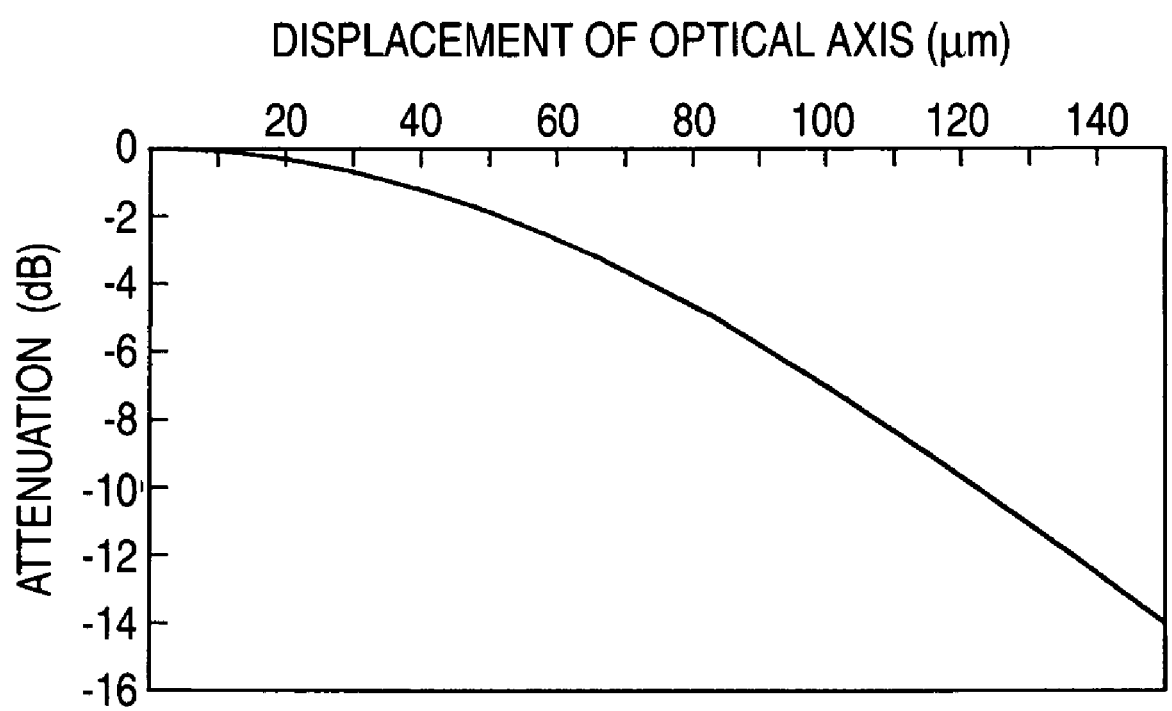
FIG. 7 is a view showing results of measuring a relation between displacement between an optical axis of light injected into an injection lens and an optical axis of the lens, and light attenuation.

In the variable optical attenuator 11 of the invention, in a movable range between FIG. 6(a) and FIG. 6(c), since the light attenuation can be increased by moving the mirror member 17 to one of the lateral direction (lower part in FIG. 6), and the light attenuation can be decreased by moving the mirror member 17 to the other of the lateral direction (upper part in FIG. 6), the mirror member 17 is moved by the actuator 18 and thus a stop position of the mirror member 17 is precisely controlled, thereby the light attenuation can be precisely adjusted. In a variable optical attenuator where distance between the optical axes of the optical fiber for input 12 and the optical fiber for output 13 is 500 µm, interval between the front face of the fiber array 14 and the front end face of the mirror member 17 is 500 µm, the beam diameter of the collimated light is 100 µm, and tilt of the mirrors 15, 16 with respect to the optical axis is 45 degrees, results of measuring a relation between the displacement between the optical axis of the light injected into the injection lens 24 and the optical axis of the injection lens 24, and the light attenuation are shown in FIG. 7. While the light attenuation is indicated in negative values in FIG. 7, it is assumed that a large absolute value of the light attenuation implies large light attenuation. As found from the measurement results, an aspect that the light entering the optical fiber for output 13 is attenuated with increase of the optical-axis displacement can be confirmed. The light attenuation with respect to the displacement of the optical axis is determined according to conditions such as the beam diameter, the optical path length, shapes of the lenses 23, 24, and the tilt of the mirrors 15, 16.

The variable optical attenuator of the invention is in a configuration where the light emitted from the optical fiber for input 12 is reflected on the mirrors 15, 16, thereby the optical path of the light beam injected into the optical fiber for output 13 is displaced by sliding the mirror member 17 in an optical path system in which light is bent at a particular angle and emitted, and thereby the quantity of light injected into the optical fiber for output 13 is attenuated, therefore it has following characteristics.

(1) A structure is simple, particularly the front end face of the mirror member 17 and the front face of the fiber array 14 can be approached without limit, unless they interfere with each other, therefore the variable optical attenuator can be easily miniaturized.

(2) It is enough only if the mirror member 17 is slid straightly by the actuator 18. Since stroke control can be easily and accurately performed compared with angle control, accuracy of moving distance of the mirror member 17 or the displacement of the optical axis of the light injected into the optical fiber for output 13 is easily obtained, and the light attenuation can be accurately controlled.

(3) The light attenuation can be varied in a continuous and stepless manner.

(4) The diffraction as in the shutter-type variable-optical-attenuator does not occur, and the problems such as wavelength dependence are prevented.

(5) Since the expensive optical elements are not used, the actuator can be manufactured at low cost.

Figure 8:
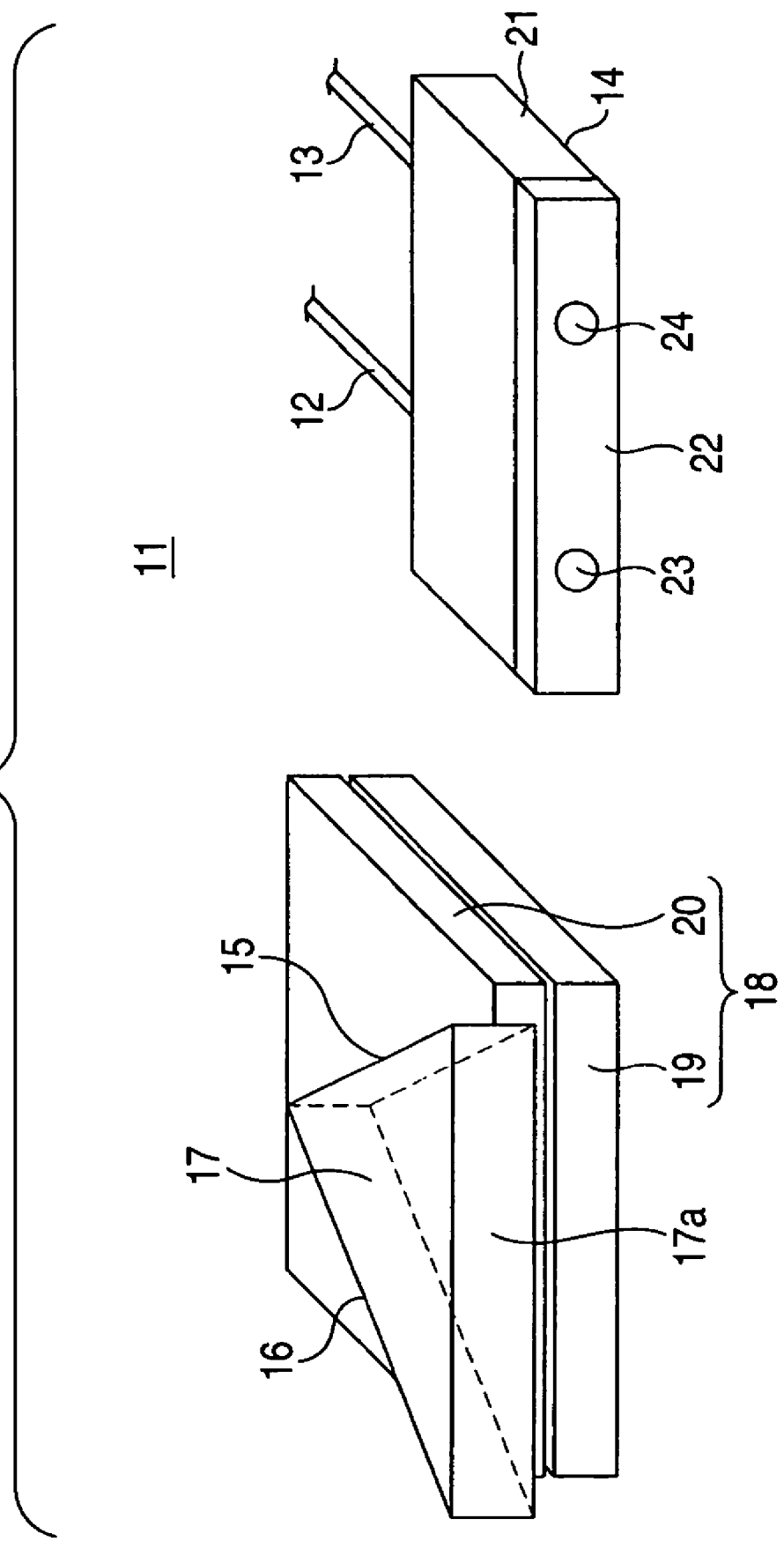
FIG. 8 is an exploded schematic view showing a modification of the variable optical attenuator shown in FIG. 2.

FIG. 8 is an exploded perspective view showing a modification of the embodiment, and similarly as FIG. 3, the mirror member 17 and the actuator 18 are shown in a condition separated from the fiber array 14. In the variable optical attenuator 11, the mirror member 17 is formed by a triangle prism made of glass or plastic having a shape of an isosceles right-angled triangle, and the mirrors 15 and 16 are formed by interfaces between side faces intersecting at an angle of 90 degrees and air. On an incline (surface opposed to the optical fiber for input 12 and the output optical fiber 13) 17a of the triangle prism, antireflection (AR) coating comprising a dielectric multilayer film is desirably applied.

Figure 9A:
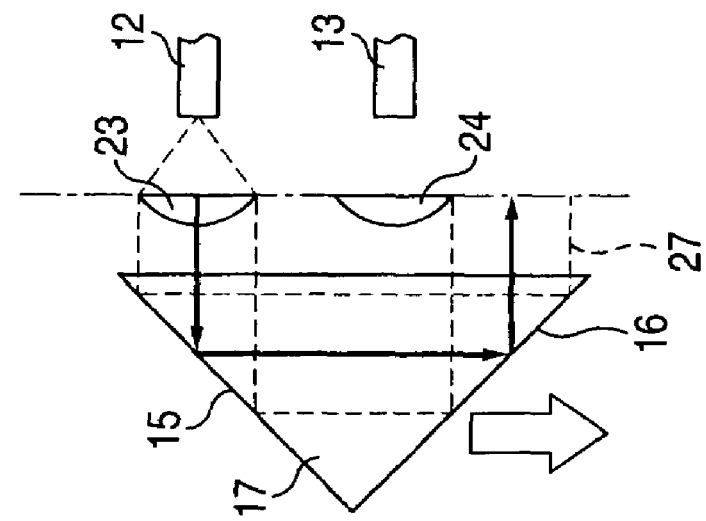
FIGS. 9(a), (b) and (c) are views for illustrating operation and a function of the modification of the variable optical attenuator shown in FIG. 8.

Thus, even in the variable optical attenuator 11 of the modification, the mirror member 17 comprising the triangle prism is straightly moved by the actuator 18, thereby the light attenuation can be adjusted as shown in FIGS. 9(a), (b) and (c). That is, as shown in FIG. 9(a), in a condition where the center of the mirror member 17 coincides with the center of the fiber array 14, light 27 emitted from the optical fiber for input 12 is converted into the collimated light (beam diameter of 100 µm) by the emission lens 23, the light 27 injected into the mirror member 17 is perfectly reflected on the mirror 15, and further perfectly reflected on the mirror 16 and then emitted outside the mirror member 17, and then approximately all beams are injected into the injection lens 24, and then the light 27 condensed by the injection lens 24 is injected into the optical fiber for output 13 and then externally transmitted. It is a condition of minimum light attenuation.

Figure 9B:
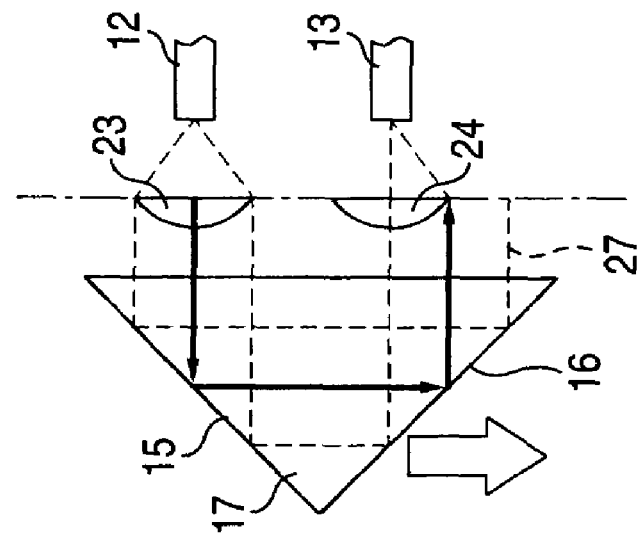

As shown in FIG. 9(b), when the mirror member 17 is slightly moved in a direction of an outline arrow (lateral direction) by the actuator 18, light 27 emitted from the optical fiber for input 12 is injected into the mirror member 17 and perfectly reflected twice by the mirrors 15, 16 in the mirror member 17, and then only part of the light is injected into the optical fiber for output 13. It is a condition of intermediate light attenuation.

Figure 9C:
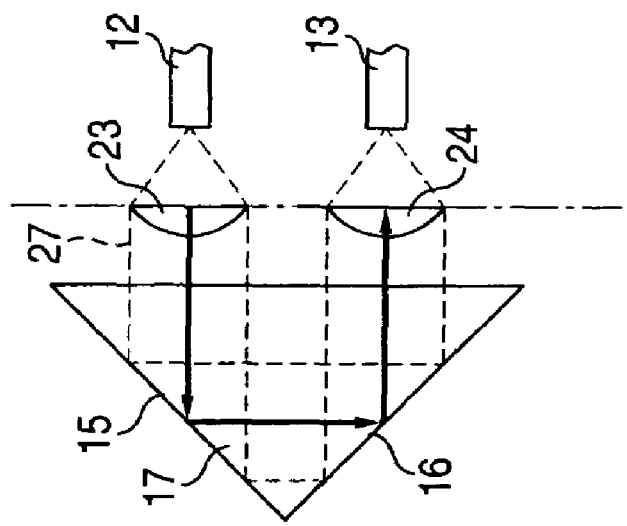

As shown in FIG. 9(c), when the mirror member 17 is moved only the distance equal to the radius of the injection lens 24 in a direction of the outline arrow, the light 27 emitted from the optical fiber for input 12 is injected into the mirror member 17 and perfectly reflected twice by the mirrors 15, 16 in the mirror member 17, and then approximately all the light is irradiated outside the injection lens 24. It is a condition of maximum light attenuation.

In this way, when the prism is used as the mirror member 17, since a commercially available prism can be used, price of parts can be reduced.

Although the actuator 18 is used to move the mirror member 17 with respect to the fiber array 14 in this embodiment, it is allowable that the mirror member 17 is made stand still and the fiber array 14 is moved by the actuator 18 conversely.

Second Embodiment

Figure 10:
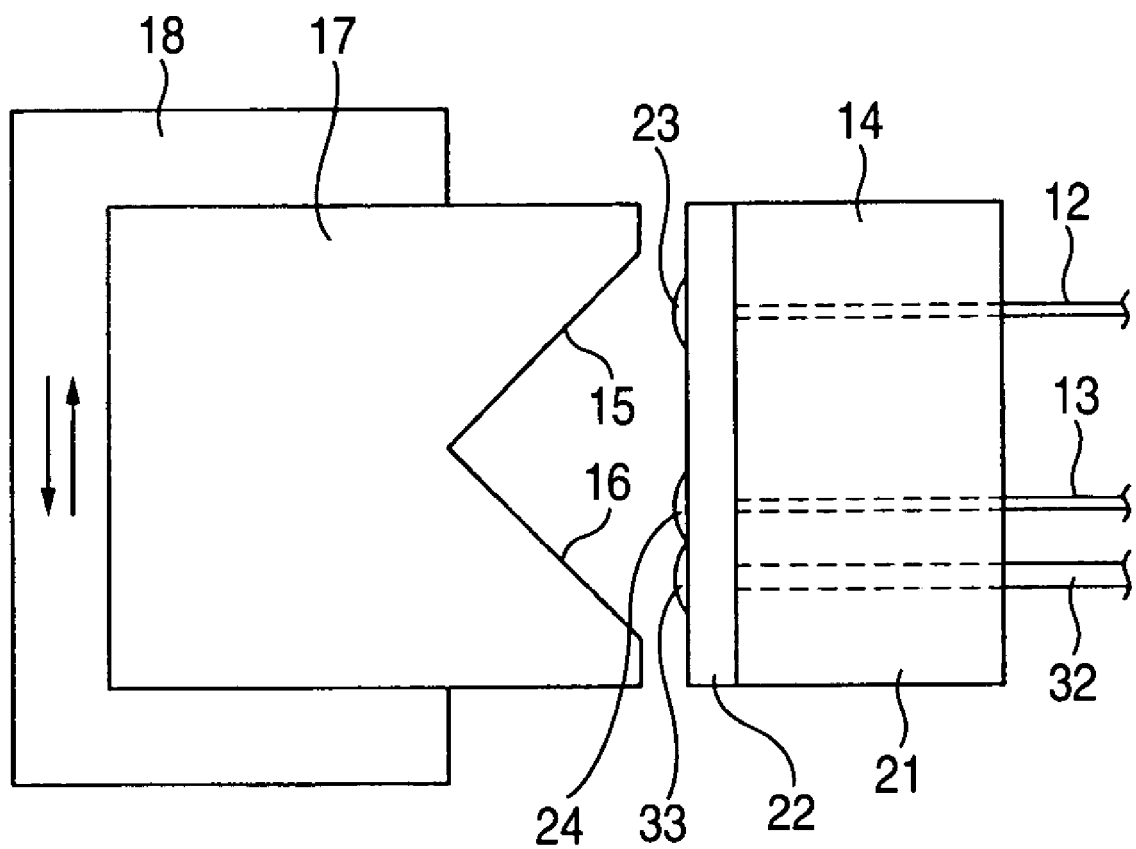
FIG. 10 is a plan view showing a variable optical attenuator according to a second embodiment of the invention.

FIG. 10 is a plan view showing a variable optical attenuator 31 according to a second embodiment of the invention. The variable optical attenuator 31 has a monitor output function. The fiber array 14 holds the optical fiber for input 12 and optical fiber for output 13 comprising the single-mode fiber (10 µm in core diameter), and a optical fiber 32 for monitoring comprising a multi-mode fiber (50 µm in core diameter), and the optical fiber for monitoring 32 is disposed near the optical fiber for output 13. A monitor lens 33 is provided on the front face of the lens array 22, and the monitor lens 33 is disposed at a position adjacent to the injection lens 24. The monitor lens 33 and the optical fiber for monitoring 32 are aligned such that their optical axes coincide with each other. Other configurations are same as the first embodiment shown in FIG. 2, therefore description is omitted.

Figure 11A:
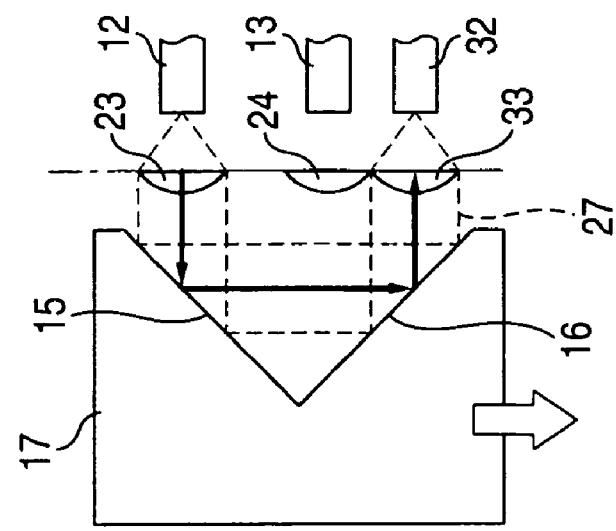
FIGS. 11(a), (b) and (c) are views for illustrating operation and a function of the same variable optical attenuator.

FIG. 11 is a view illustrating operation and a function of the variable optical attenuator 31. FIG. 11(a) indicates a condition where the center of the mirror member 17 coincides with the middle between the input optical fiber 12 and the output optical fiber 13, which are opposed to each other, wherein the light emitted from the input optical fiber 12 is converted into the collimated light by the emission lens 23, the light 27 emitted from the emission lens 23 is reflected on the mirror 15, and further reflected on the mirror 16, and then approximately all beams are injected into the injection lens 24, and then the light 27 condensed by the injection lens 24 is injected into the optical fiber for output 13. Accordingly, in this condition (condition of minimum light-axis displacement), the quantity of light received by the optical fiber for output 13 is maximized. On the other hand, since the light 27 is not injected into the monitor lens 33, the quantity of light received by the optical fiber for monitoring 32 is minimized.

Figure 11B:
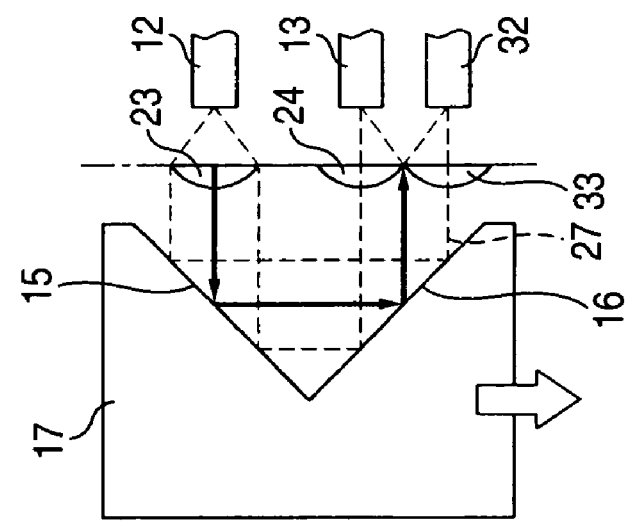

FIG. 11(b) indicates a condition where the mirror member 17 is slightly moved in a direction shown in an outline arrow (lateral direction) by the actuator 18. In this condition, the light 27 emitted from the optical fiber for input 12 is reflected on the mirrors 15, 16, and then only a part of the light is injected into the optical fiber for output 13, and a part of the light 27 is injected into the optical fiber for monitoring 32. Accordingly, in this condition, the quantity of light injected into the optical fiber for output 13 is decreased, and the quantity of light injected into the optical fiber for monitoring 32 is increased.

Figure 11C:
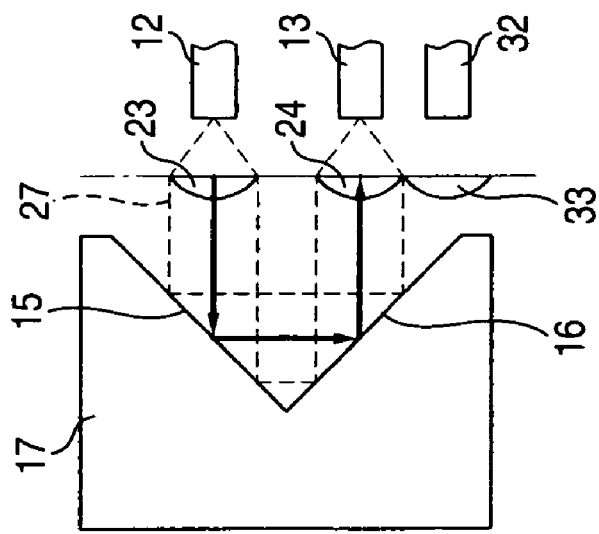

FIG. 11(c) indicates a condition where the mirror member 17 is moved only a distance equal to the radius of the injection lens 24 in a direction of the outline arrow. In this condition, the light 27 emitted from the optical fiber for input 12 is reflected on the mirrors 15, 16, and then approximately all the light is irradiated on the monitor lens 33, and hardly injected into the optical fiber for output 13. On the other hand, the quantity of light received by the optical fiber for monitoring 32 is maximized.

In the variable optical attenuator 31 of the invention, in a moving range between a condition of FIG. 11(a) and a condition of FIG. 11(c), since the light attenuation can be increased by moving the mirror member 17 to one of the lateral direction (lower part in FIG. 11), and the light attenuation can be decreased by moving the mirror member 17 to the other of the lateral direction (upper part in FIG. 11), the mirror member 17 is moved by the actuator 18 and a stop position of the mirror member 17 is precisely controlled, thereby the light attenuation can be precisely adjusted. In addition, since there is a certain relation between the quantity of light received by the optical fiber for output 13 (or light attenuation) and the quantity of light received by the optical fiber for monitoring 32, the quantity of light received by the optical fiber for monitoring 32 is outputted as a monitor signal, thereby the light attenuation by the variable optical attenuator 31 can be monitored, and accurate feedback can be performed. Accordingly, the monitor signal is fed back to the actuator 18, thereby accuracy of adjusting the light attenuation can be improved.

Figure 12:
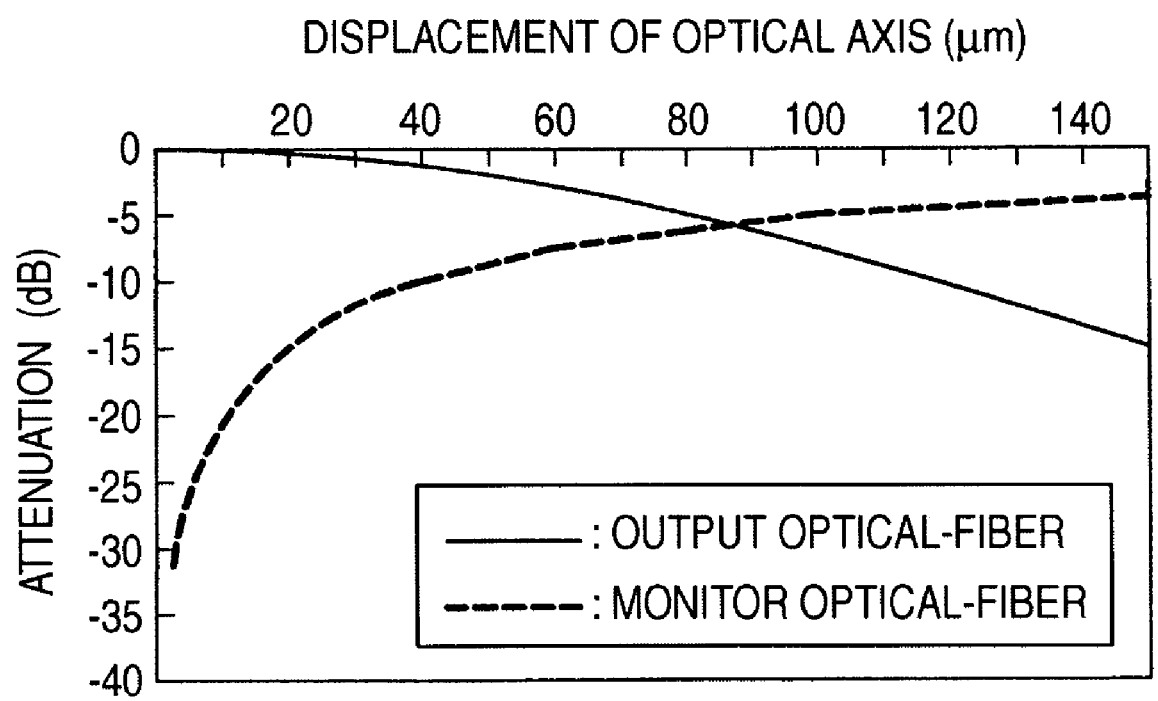
FIG. 12 is a view showing relations between displacement between an optical axis of light injected into an injection lens and an optical axis of the lens, and light attenuation in an optical fiber for output as well as light attenuation in an optical fiber for monitor.

FIG. 12 indicates a relation between the displacement between the optical axis of the light injected into the injection lens 24 and the optical axis of the injection lens 24, and the light attenuation in the optical fiber for output 13 as well as the light attenuation in the optical fiber for monitoring 32, which were measured under the same conditions as in the case of FIG. 7. The light attenuation in the optical fiber for monitoring 32 in FIG. 12 is light attenuation calculated from the quantity of light received by the optical fiber for monitoring 32 using the maximum quantity of light received by the optical fiber for output 13 as reference (therefore, the vertical axis of FIG. 12 can be considered as the quantity of received light on a log scale assuming that an upper part is a positive direction.) As seen from the measurement results, an aspect that the light entering the optical fiber for output 13 is attenuated with increase of the displacement of the optical axis, at the same time, the quantity of light received by the optical fiber for monitoring 32 increases can be confirmed, a certain relation exists between the light attenuation in the optical fiber for output 13 and the quantity of light received by the optical fiber for monitoring 32, and if the quantity of light received by the optical fiber for monitoring 32 is known, light attenuation by the variable optical attenuator 31 can be known.

Figure 13A:
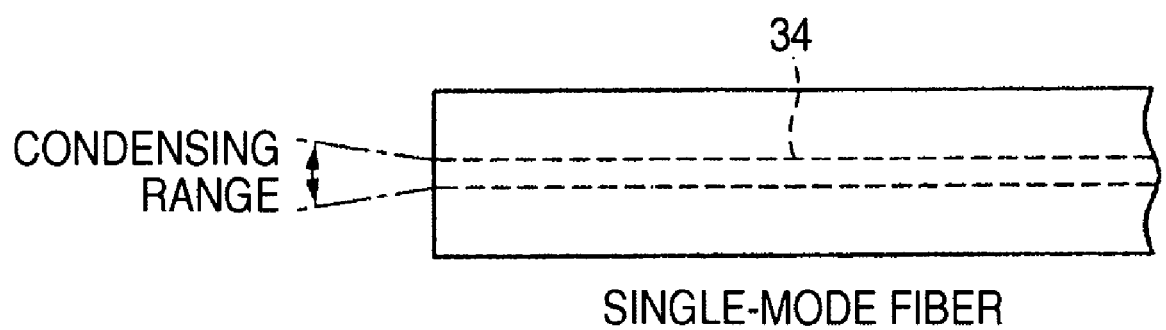
FIGS. 13(a) and (b) are views for illustrating difference between a single-mode fiber and a multi-mode fiber.
Figure 13B:
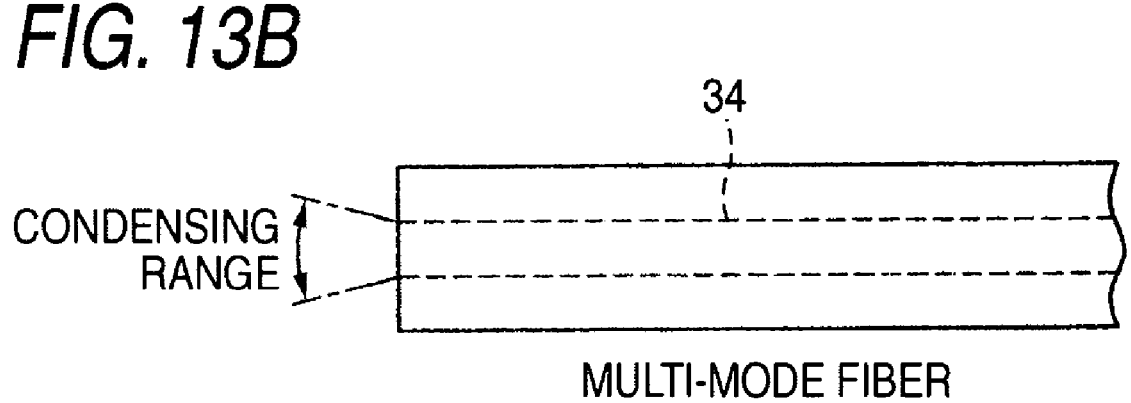

The single-mode fiber is used for the optical fiber for input 12 and the optical fiber for output 13, and the multi-mode fiber is used for the optical fiber for monitoring 32, and the fiber array 14 is formed as a mixed fiber array, which is intended to improve photosensitivity of the monitor. The single-mode fiber is typically used for an optical fiber for communication, therefore the single-mode fiber is used for the optical fiber for input 12 and the optical fiber for output 13. On the other hand, the multi-mode fiber can be used for the optical fiber for monitoring 32 without problems, because the fiber 32 is not used for communication, but used inside only for measuring the quantity of light. In addition, as shown in FIGS. 13(a) and (b), the multi-mode fiber (about 50 μm in core diameter) has a large diameter of a core 34 compared with the single-mode fiber (about 10 μm in core diameter), therefore it has an advantage that it can condense a wider range of light, and the multi-mode fiber that can improve the photosensitivity of the monitor is more effective in use for monitoring.

Although the multi-mode fiber is used for the optical fiber for monitoring 32 here, the single-mode fiber can be also used.

Third Embodiment

Figure 14:
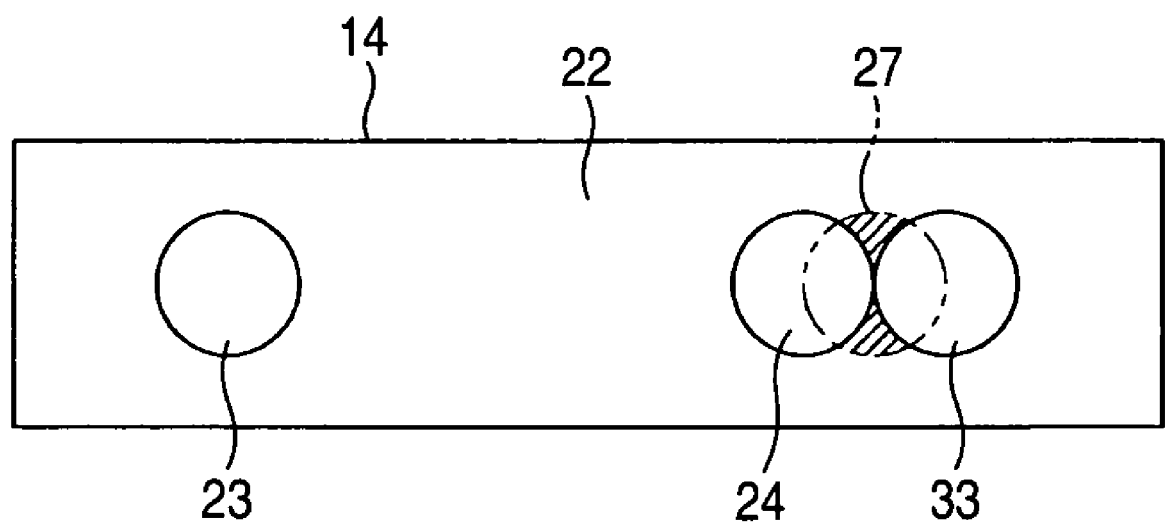
FIG. 14 is a view for illustrating light which is not injected into both the optical fiber for output and the optical fiber for monitoring and causes loss.

In the variable optical attenuator 31 according to the second embodiment, when the optical axis of the light injected into the injection lens 24 coincides with the optical axis of the injection lens 24, approximately all the light is injected into the optical fiber for output 13, and when the optical axis of the light injected into the monitor lens 33 coincides with the optical axis of the monitor lens 33, approximately all the light is injected into the optical fiber for monitoring 32. However, when the optical axis of the light 27 injected to the front face of the fiber array 14 does not coincide with both of the optical axis of the injection lens 24 and the optical axis of the monitor lens 33, as shown in FIG. 14, a part of the light 27 is injected into the optical fiber for output 13, and another part of the light is injected into the optical fiber for monitoring 32, however, the remaining part (the shadowed area in FIG. 14) is not injected into the optical fiber for monitoring 32 and deteriorates the monitoring sensitivity. In addition to the reduction in the monitoring sensitivity, a problem occurs: the light is irradiated on the front face of the fiber array, thereby temperature of the fiber array 14 increases, as a result temperature of the variable optical attenuator 31 increases.

Figure 15:
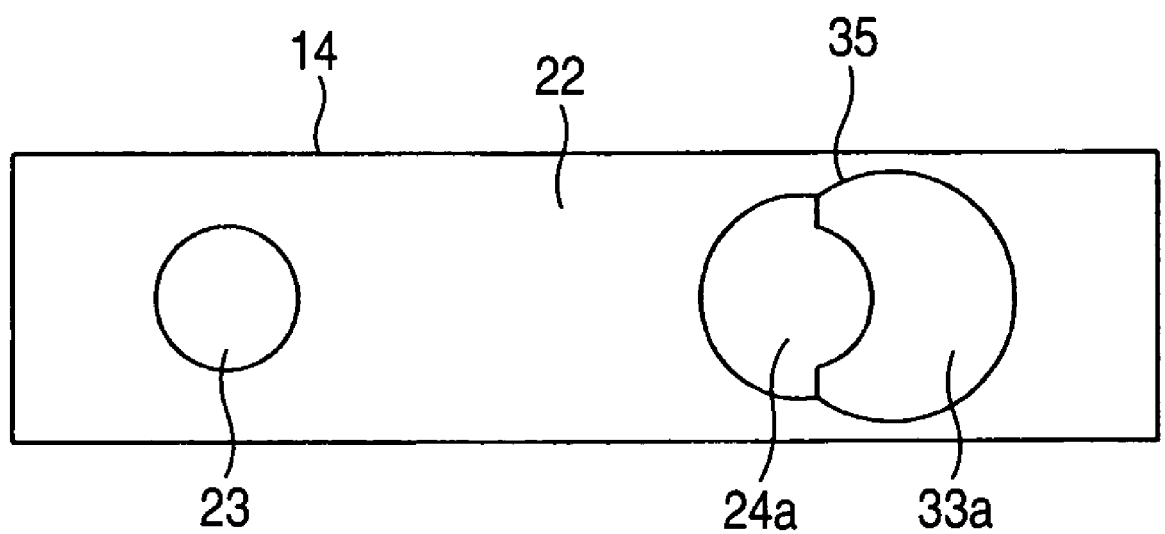
FIG. 15 is a front view of a fiber array used in a variable optical attenuator according to a third embodiment of the invention.
Figure 16A:
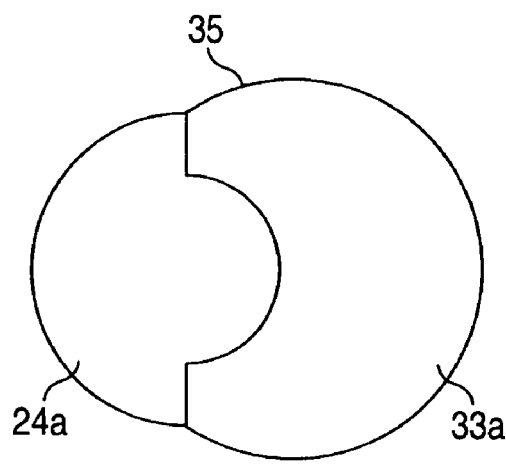
FIGS. 16(a) and (b) are a front view and a bottom view of a hybrid lens, and (c) is a view showing the hybrid lens with being separated into an injection lens and a monitor lens.
Figure 16B:
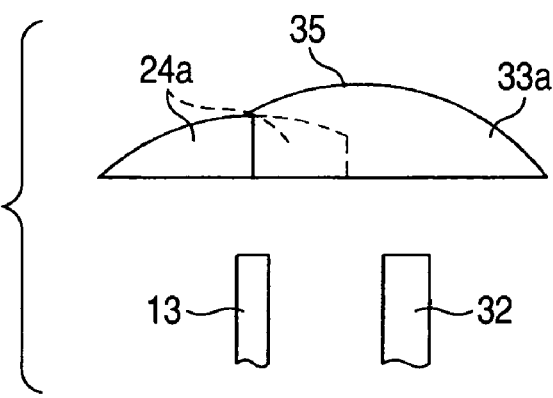
Figure 16C:
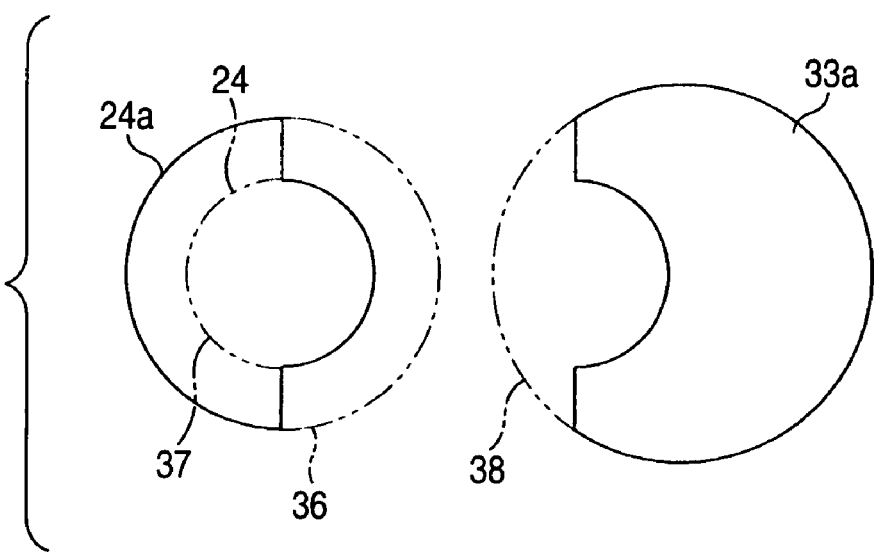

FIG. 15 is a front view of the fiber array 14 used in a variable optical attenuator according to a third embodiment of the invention. The embodiment, which is made in consideration with the problems, employs a hybrid lens 35 in which the injection lens and the monitor lens are unified. The hybrid lens 35 is formed by unifying an injection lens 24a and a monitor lens 33a having shapes shown in FIG. 16(c), and has a front pattern and a bottom pattern as shown in FIG. 16(a) and (b). First, the shape of the injection lens 24a is described. An inside profile circle 37 of the injection lens 24a shown in FIG. 16(c) indicates a circle having a radius equal to a radius of a beam section of the collimated light (it is equal to an outline of the injection lens 24 as shown in FIG. 14.) An outside profile circle 36 indicates an approximately larger circle than the circle 37, which is an outer diameter of the injection lens 24a. A center of the circle 36 coincides with a center of the circle 37, and an optical axis of the injection lens 24a also coincides with that center. The injection lens 24a is in a shape that an area outside the circle 37 is removed over a range of 180 degrees from a spherical or an aspherical lens having the circle 36 as its outline. A profile circle 38 of the monitor lens 33a shown in FIG. 16(c) can be a sufficiently large circle compared with the radius of the beam section (exactly, it is a circle larger than a condensing range for monitoring described later), and the monitor lens 33a is in a shape that an area where the injection lens 24a is overlapped is removed from a spherical or an aspherical lens having the circle 38 as its outline. The hybrid lens 35 is formed in such a shape that part of the injection lens 24a is fitted into the partially removed portion of the monitor lens 33a. As shown in FIG. 16(b), the optical fiber for output 13 is disposed such that it coincides with an optical axis of the injection lens 24a, and the optical fiber for monitoring 32 is disposed such that it coincides with an optical axis of the monitor lens 33a.

Figure 17:
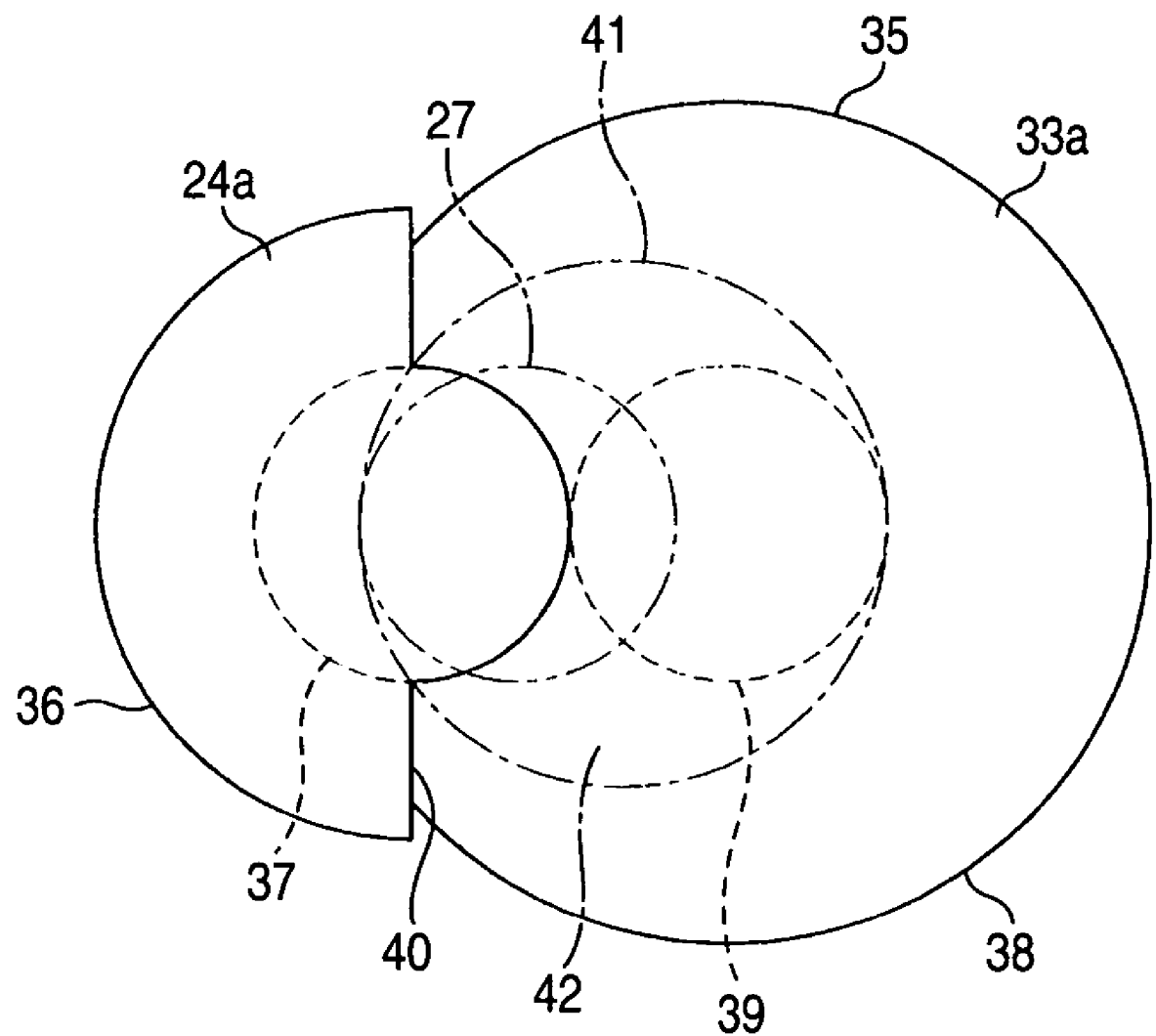
FIG. 17 is a view showing an example of more detailed design of the hybrid lens.

FIG. 17 shows an example of a further detailed design of the hybrid lens 35. First, the circle 37 having the radius equal to the beam diameter of the light beam is drawn. Then, a circle 39 having the radius equal to the beam diameter of the light beam is drawn such that it is circumscribed with the circle 37. Next, a circle 41 is drawn, which is circumscribed with the circle 39 and passes through an intersection of a perpendicular (straight line 40) passing through a center of the circle 37 and a circle 37.

Furthermore, a large circle 36 concentric with the circle 37 is drawn, and one side area with respect to the straight line 40 outside the circle 37 is removed, thereby a shape of the injection lens 24a is determined. Also, a large circle 38 concentric with the circle 39 is drawn, and an area overlapped with the injection lens 24a is removed from the circle 38, thereby a shape of the monitor lens 33a is determined. Then, a spherical or an aspherical lens having the optical axis at a center of the circle 36 is partially cut and thus the shape of the injection lens 24a as above is formed. Also, a spherical or an aspherical lens having the optical axis at a center of the circle 38 is partially cut and thus the shape of the monitor lens 33a as above is formed. An area of removing an area of the circle 37 from an area within the circle 41 is a condensing area for monitoring 42, and assuming that a diameter of the collimated light is 100 μm, the condensing area for monitoring 42 is an area about 175 μm in diameter.

The hybrid lens 35 is produced integrally by using a technique for producing the aspherical lens. Although the two lenses 24, 33 produced individually can be pasted together, since optical loss occurs at a bonded portion, integral molding is desirable.

Figure 18A:
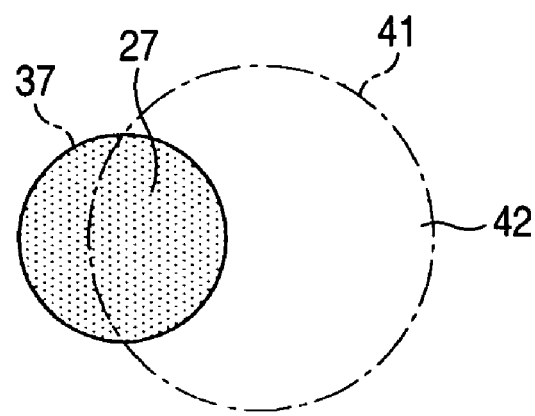
FIGS. 18(a), (b), (c) and (d) are views for illustrating an aspect of a dividing transition of collimated light by the hybrid lens.
Figure 18B:
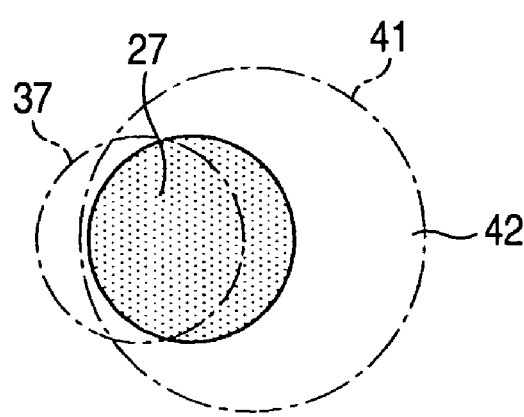
Figure 18C:
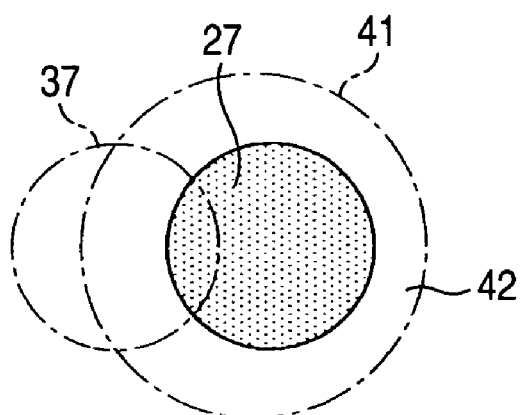
Figure 18D:
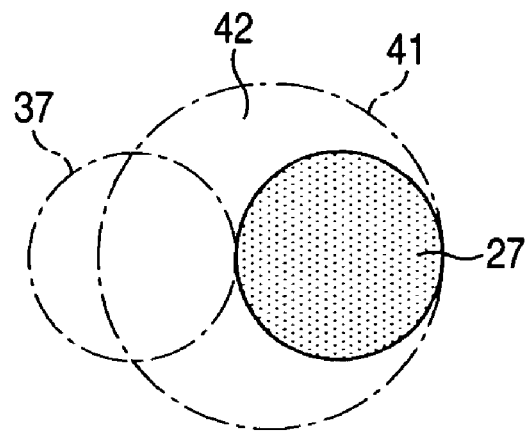

FIGS. 18(a), (b), (c) and (d) are views for illustrating an aspect of a dividing transition of the collimated light by the hybrid lens 35. As shown in FIG. 18(a), when the light 27 is injected into the circle 37, approximately all the light 27 is injected into the injection lens 24a and condensed by the injection lens 24a, and then injected into the optical fiber for output 13. On the other hand, when the light 27 slightly moves to a monitor lens 33a side, since an irradiated area by the light 27 deviates from the circle 37, while the light 27 in the circle 37 is condensed by the injection lens 24 and injected into the optical fiber for output 13, the light 27 that deviates from the circle 37 and enters a condensing area of monitoring 42 are wholly condensed by the monitor lens 33a, and then received by the optical fiber for monitoring 32. When the light 27 further moves greatly, and most of the irradiated area by the light 27 deviates from the circle 37, while small quantity of the light 27 in the circle 37 is condensed by the injection lens 24 and injected into the optical fiber for output 13, most of the light 27 that deviates from the circle 37 and enters the condensing area for monitoring 42 is condensed by the monitor lens 33a and received by the optical fiber for monitoring 32. Furthermore, when the area irradiated by the light 27 completely deviates from the circle 37, approximately all the light 27 is condensed by the monitor lens 33a, and received by the optical fiber for monitoring 32.

In any of these conditions, it is found that the light that deviates from the injection lens 24a (for example, the light 27 shown in FIG. 17) is wholly condensed by the monitor lens 33a and received by the monitoring fiber 32, and used for the monitoring. Accordingly, the light that is not received by both of the injection lens 24 and the monitor lens 33 as shown in FIG. 14 disappears, and monitoring sensitivity and monitoring accuracy are improved. Furthermore, it can be prevented that the light causes temperature rise in the variable optical attenuator 31.

As seen from the operation, while it is sufficient that the spherical or aspherical lens indicated by the circle 37 is used for the injection lens 24a, and a lens formed by removing the portion of the circle 37 from the spherical or aspherical lens indicated by the circle 41 is used for the monitor lens 33a, in the embodiment, the injection lens 24a is formed large compared with the circle 37, and the monitor lens 33a is also formed large compared with an area of the condensing area for monitoring 42. This intends that feeble light that has deviated from the circle 37 area or the condensing area for monitoring 42 is also condensed by the hybrid lens 35 and injected into the optical fiber for output 13 or the optical fiber for monitoring 32, thereby the temperature rise in the fiber array 14 and the like is decreased as much as possible.

Figure 19:
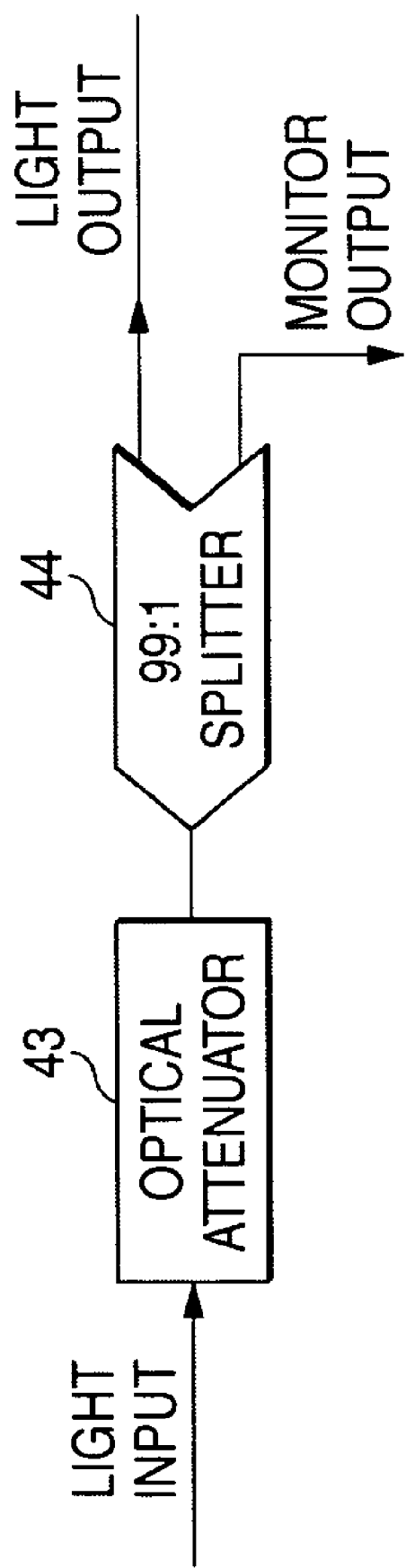
FIG. 19 is a view for illustrating a conventional method of output monitoring.

The conventional, variable optical attenuator does not have the monitoring function. Therefore, as shown in FIG. 19, a splitter 44 that branches the light outputted from the variable optical attenuator 43 in a ratio of 99/1 is connected to a subsequent stage of the variable optical attenuator 43, and 99% of the light is used as light output and 1% of the light is used as the monitoring output. However, such a configuration has problems of output loss and bad monitoring accuracy. A cause of the former problem is that in such a method, output from the variable optical attenuator 43 is divided into 99/1, therefore output from the splitter 44 is 99% of the output from the variable optical attenuator 43, or 1% of the output is necessarily lost. A cause of the latter problem is that the quantity of the light outputted for the monitoring is only 1% of the output from the variable optical attenuator 43, and the remaining 99% of the light must be calculated by using the 1% of the light, therefore the monitor accuracy is bad, and correcting accuracy of the quantity of the light output is bad even if the feedback control is performed.

On the contrary, in the second and third embodiments of the invention, since 100% of the output from the variable optical attenuator is outputted to the subsequent stage, loss of the light output is small. In addition, since difference between the input and the output to and from the variable optical attenuator is the monitoring output, the quantity of monitoring light (absolute value) is large, and the light attenuation can be accurately controlled. Particularly, in the third embodiment using the hybrid lens 35, since the optical loss is hardly generated, further accurate control is possible.

Fourth Embodiment

Figure 20:
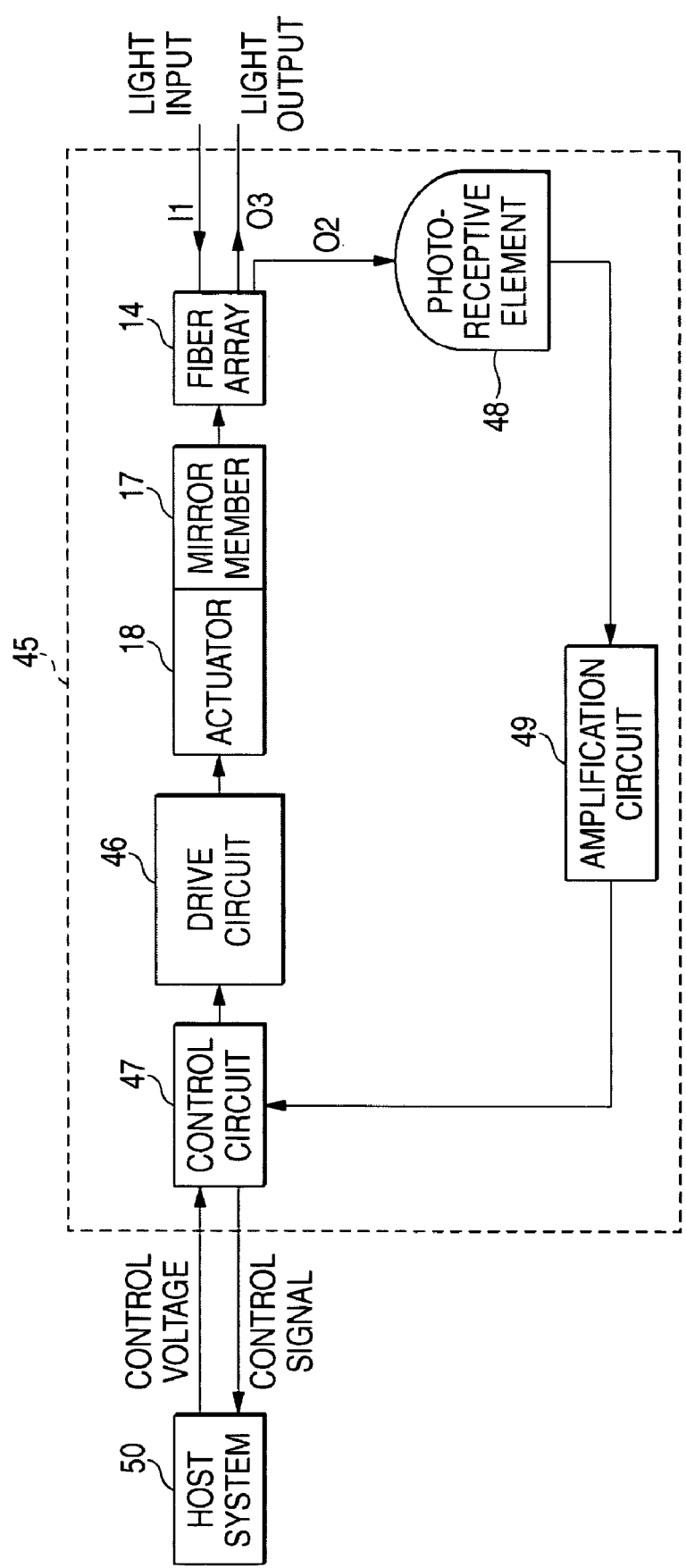
FIG. 20 is a schematic block diagram showing a fourth embodiment of the invention.

FIG. 20 is a schematic block diagram showing a fourth embodiment of the invention, and indicates a variable attenuator incorporating a control circuit 45. The variable attenuator incorporating the control circuit 45 has the actuator 18, mirror member 17, and fiber array 14, which form a variable optical attenuator with the monitoring function as the third embodiment. The variable attenuator incorporating the control circuit 45 further has a drive circuit 46 for driving the actuator 18, a control circuit 47 that controls the actuator 18 through the drive circuit 46 and controls displacement of the optical axis of the collimated light that returns to the fiber array 14, a photo detector 48 such as photodiode (PD) that receives the monitoring light outputted from the optical fiber for monitoring 32 in the fiber array 14, and an amplification circuit 49 that amplifies an output signal from the photo detector 48 and inputs a feedback signal into the control circuit 47. The control circuit 47 communicates with a host system 50 through control voltage or a control signal.

Figure 21A:
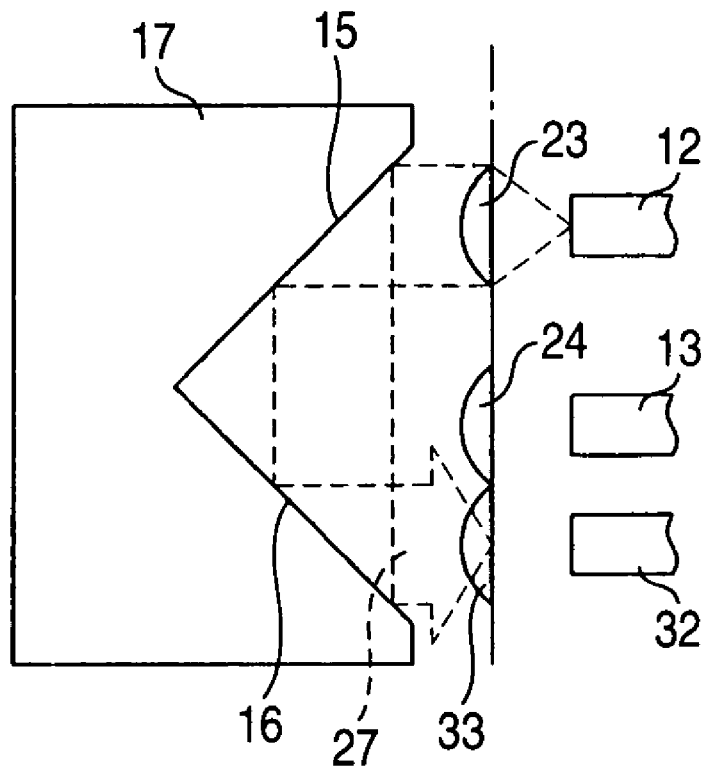
FIGS. 21(a) and (b) are views for illustrating a method for adjusting light attenuation in the same variable attenuator incorporating a control circuit.
Figure 22:
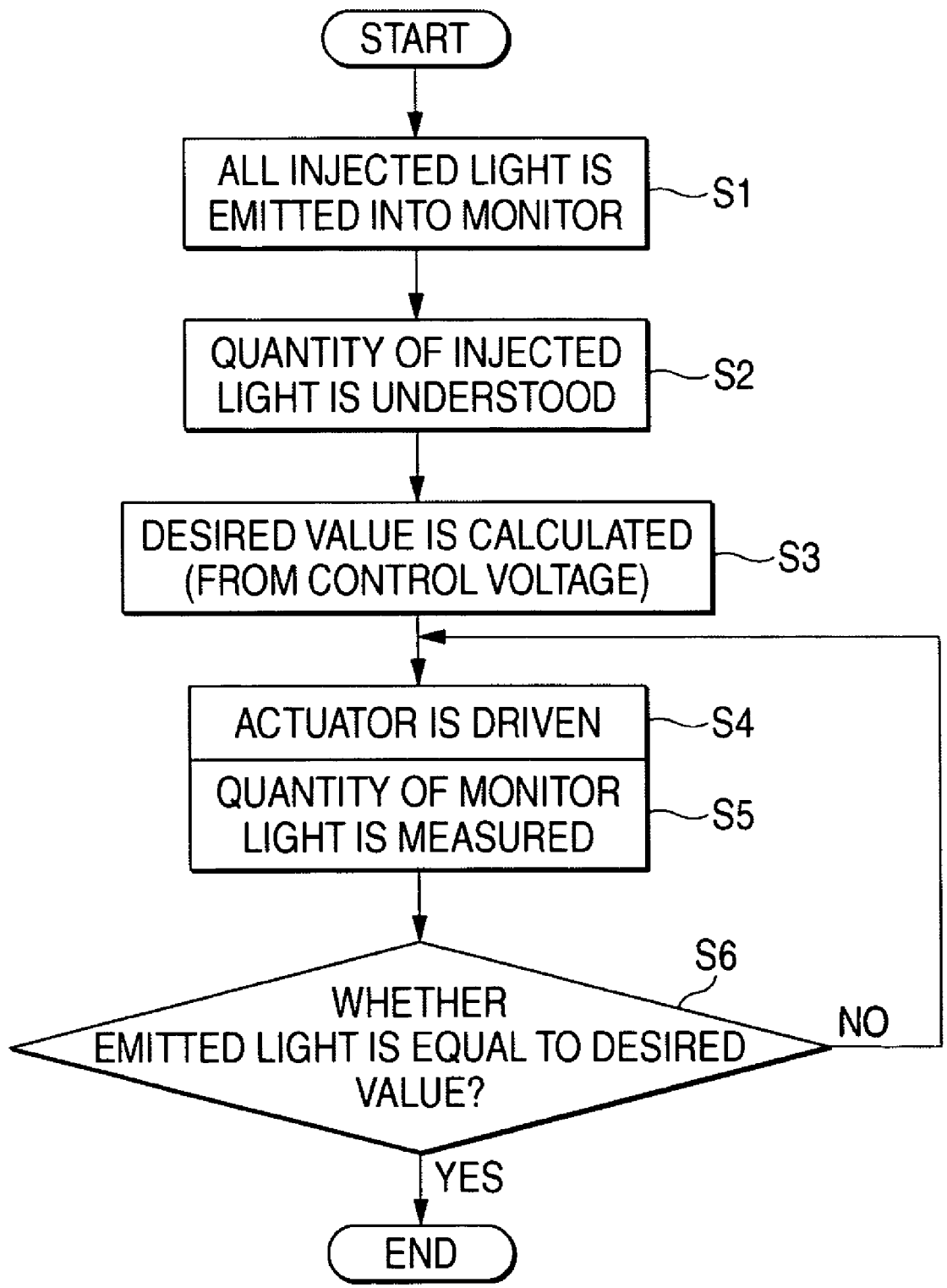
FIG. 22 is a flow diagram indicating a control operation of the variable attenuator incorporating the control circuit shown in FIG. 20.

Next, control operation for adjusting the light attenuation by the variable attenuator incorporating the control circuit 45 is described. FIG. 22 is a flow diagram indicating the control operation. When the light attenuation is adjusted or readjusted, first the control circuit 47 outputs a control signal to the drive circuit 46 to drive the actuator 18, and as shown in FIG. 21(a), stops the mirror member 17 at a position where all the light that returns to the fiber array 14 is injected into the monitor lens 33 (or at a position where the quantity of monitoring light is maximized while monitoring the monitoring light received by the photo detector 48) (step S1). The quantity of light received by the optical fiber for monitoring 32 at that time is assumed as the quantity of injected light I1 in light input and stored in a memory (step S2). Then, the light attenuation at which light output can be maintained at a standard value O1 is calculated from the value of the quantity of injected light I1.

Figure 21B:
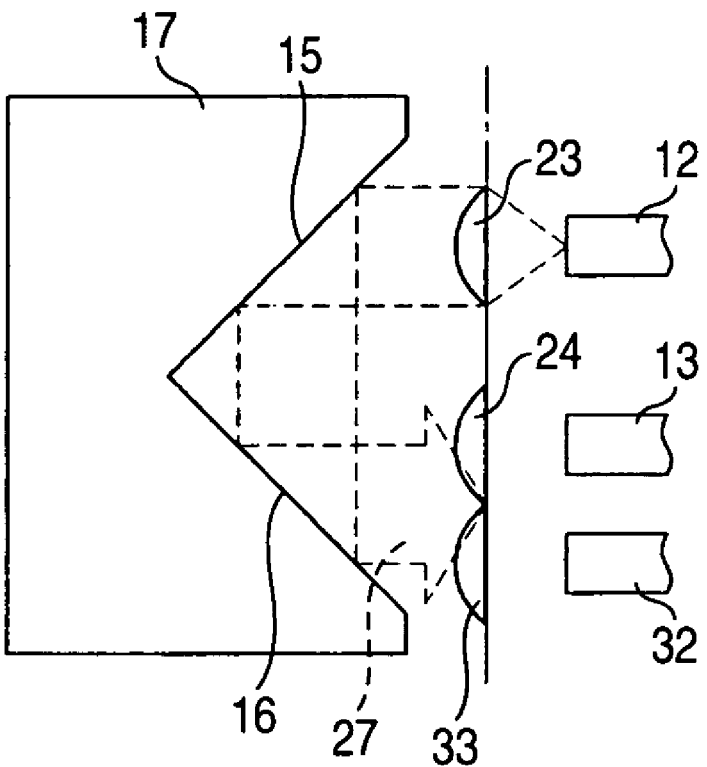

Next, the control circuit 47 outputs the control signal (control voltage) to the drive circuit 46 such that light attenuation becomes the operated light attenuation (step S3), and returns the mirror member 17 by the actuator 18 through the drive circuit 46 (step S4). As shown in FIG. 21(b), when the mirror member 17 stops at a position where the light attenuation becomes the light attenuation calculated in this way, the quantity of light deviated from the optical fiber for output 13 and injected into the optical fiber for monitoring 32 is measured by the photo detector 48 (step S5), and a signal outputted from the photo detector 48 is amplified by the amplification circuit 49 and fed back to the control circuit 47 as the monitoring signal. The control circuit 47 calculates the quantity of monitoring light O2 from the monitoring signal, and further calculates the quantity of light, O3=I1−O2, emitted from the optical fiber for output 13.

Whether the calculated value O3 of the quantity of injected light is equal to the standard value O1 is determined (step S6), and when it is not equal, the control circuit 47 compares the quantity of injected light O3 calculated from the quantity of monitoring light O2 to the standard value O1, and performs the feedback control on a position of the mirror member 17 such that the quantity of injected light approaches the standard value O1, and corrects the quantity of injected light.

In a region of small displacement of the optical axis, since the quantity of light received by the optical fiber for monitoring 32 is small, it is difficult to find a position where the displacement of the optical axis is zero, or a position where the quantity of the light received by the optical fiber for monitoring 32 is zero. In such a case, the position where the quantity of the monitoring light is zero can be predicted based on change of the quantity of monitoring light before the quantity of light received by the optical fiber for monitoring 32 approaches zero and based on previously stored data.

Fifth Embodiment

Figure 23:
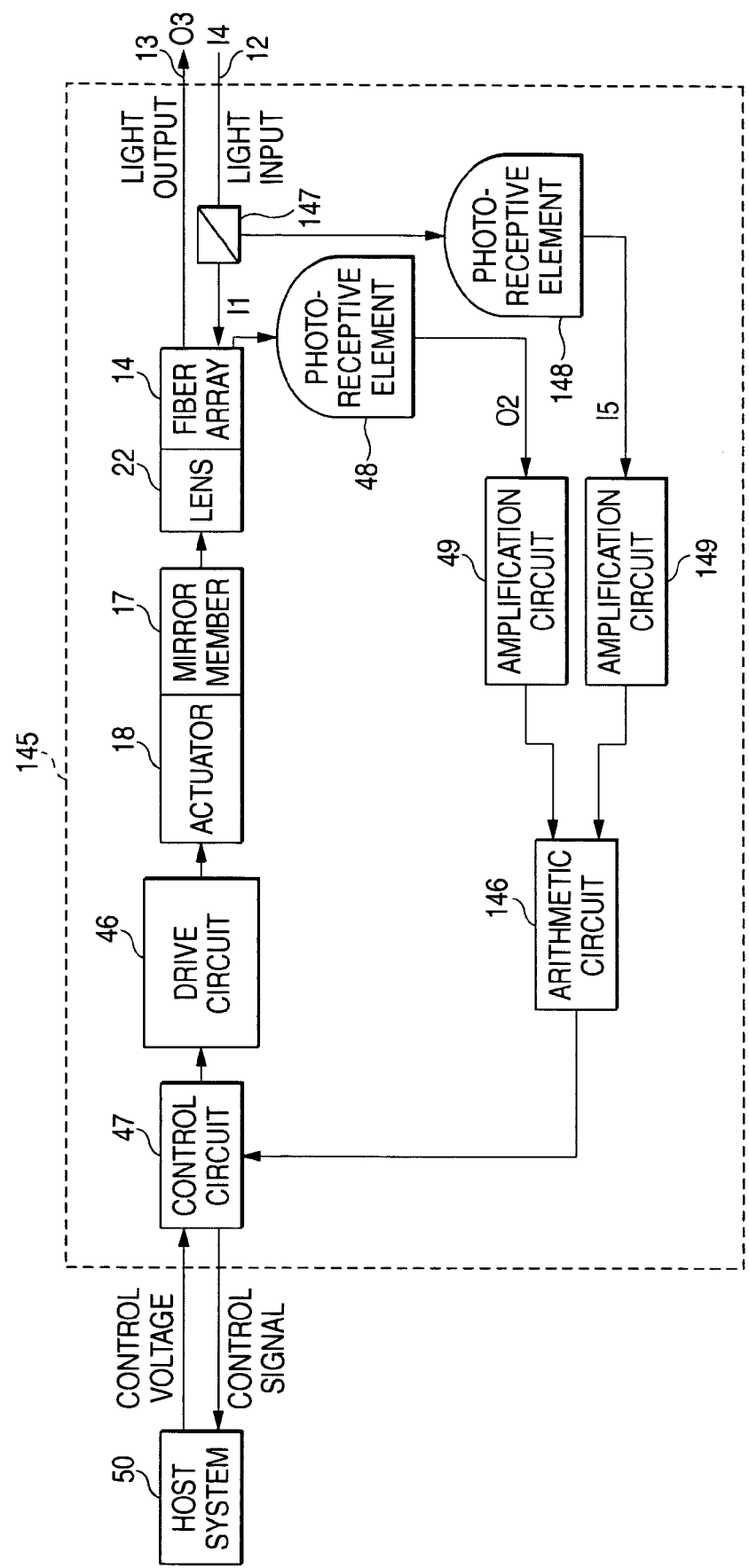
FIG. 23 is a schematic block diagram showing a variable attenuator incorporating a control circuit according to a fifth embodiment of the invention.

FIG. 23 is a schematic block diagram showing a fifth embodiment of the invention, and indicates a variable attenuator incorporating a control circuit 145. The variable attenuator incorporating the control circuit 145 has the actuator 18, mirror member 17, lens array 22, and fiber array 14, which form the variable optical attenuator with the monitoring function as the third embodiment. The variable attenuator incorporating the control circuit 145 further has the drive circuit 46 for driving the actuator 18, and the control circuit 47 that controls the actuator 18 through the drive circuit 46 and controls the displacement of the optical axis of the collimated light that returns to the fiber array 14. The control circuit 47 communicates with the host system 50 through the control voltage or the control signal. The variable attenuator incorporating the control circuit 145 further has the photo detector 48 such as photodiode (PD) that receives the monitoring light outputted from the optical fiber for monitoring 32 in the fiber array 14; an optical branch filter 147 that branches part of the light injected into the fiber array 14 from the optical fiber for input 12 and extracts it; a photo detector 148 such as photodiode (PD) that receives the light branched in the optical branch filter 147; amplification circuits 49 and 149 that amplify monitoring signals from the photo detectors 48, 148; and an arithmetic circuit 146. The optical branch filter 147 comprises a half mirror, splitter and the like.

Figure 24:
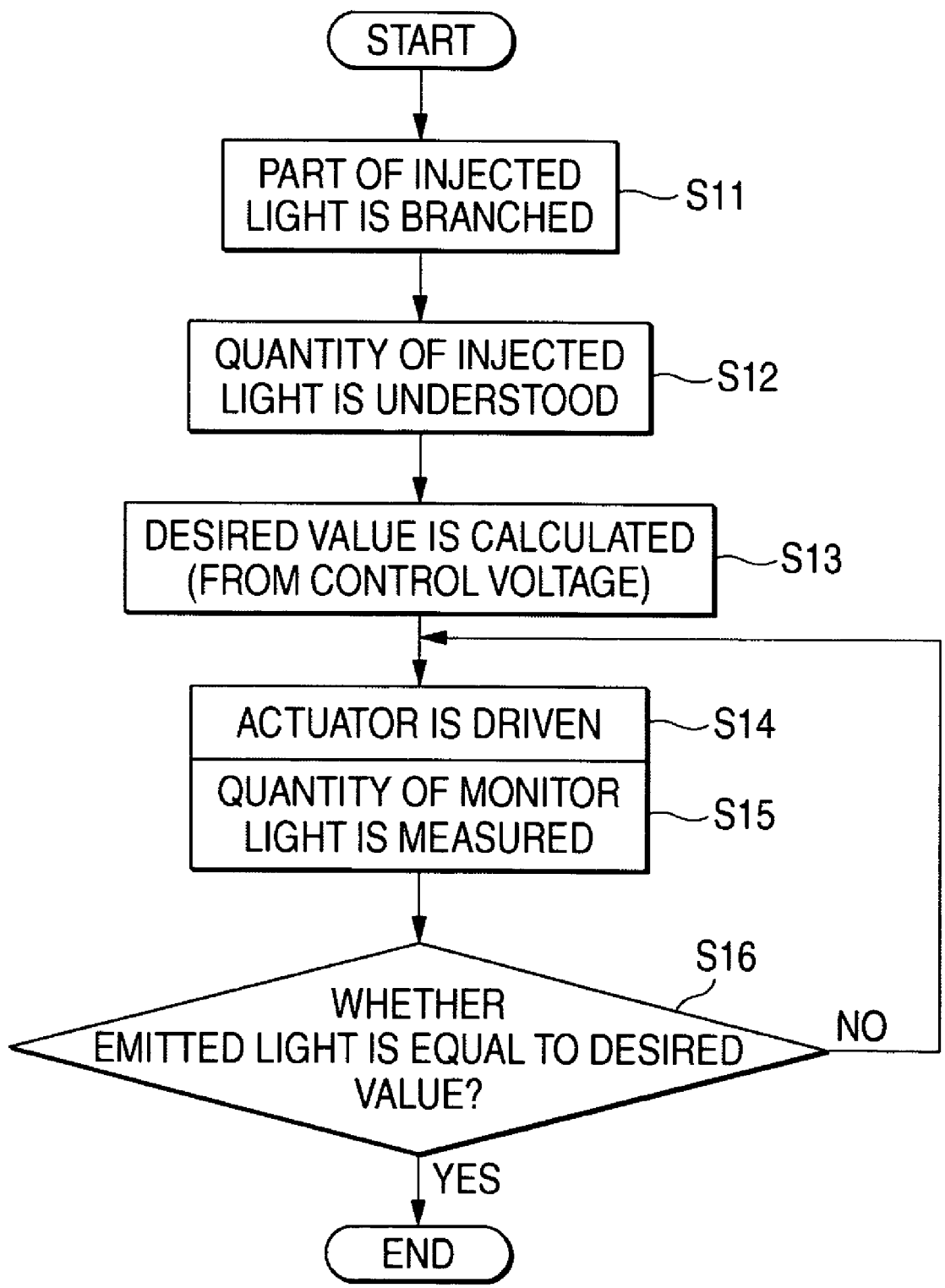
FIG. 24 is a flow diagram showing control operation of the same variable attenuator incorporating the control circuit.

Next, control operation for adjusting the light attenuation by the variable attenuator incorporating the control circuit 145 is described. FIG. 24 is a flow diagram indicating the control operation. The optical branch filter 147 is assumed to branch the injected light to a fiber array 14 side and a photo detector 148 side in a ratio of m to n respectively. In this case, when the quantity of the injected light injected into the optical fiber for input 12 is assumed to be I4, the quantity of light I5 branched from the optical branch filter 147 to the photo detector 148 is, $$I5=n\cdot I4/(m+n);$$

and the quantity of light I1 that is sent to the fiber array 14 side and emitted from the front end of the optical fiber for input 12 is, $$I1=m\cdot I4/(m+n)=(m/n)I5.$$

Therefore, in the variable attenuator incorporating the control circuit 145, if part of the injected light injected from the optical fiber for input 12 is branched to a photo detector 148 side by the optical branch filter 147 (S11), and the quantity of the branched light 15 is measured by the photo detector 148, the quantity of the injected light I1 of the injected light injected into the mirror member 17 is obtained as I1=(m/n)I5 by the arithmetic circuit 146, and a value of the obtained quantity of the injected light I1 is sent to the control circuit 47 (S12).

Then, optical attenuation at which the light output can be maintained to the standard value O1 is calculated from the value of the quantity of the injected light I1 by the control circuit 47. The control circuit 47 outputs the control signal (control voltage) to the drive circuit 46 such that light attenuation becomes the calculated light attenuation (step S13), and moves the mirror member 17 by the actuator 18 through the drive circuit 46 (step S14). When the mirror member 17 stops at a position where light attenuation becomes the light attenuation calculated in this manner, the quantity of the light O2 injected into the optical fiber for monitoring 32 is measured by the photo detector 48 (step S15), and the monitoring signal outputted from the photo detector 48 is fed back to the arithmetic circuit 146. The arithmetic circuit calculates the quantity of the injected light I1=(m/n)I5 from the quantity of the monitoring light I5 at an injection side, which is received from the photo detector 148, and calculates the quantity of the emitted light O3=I1−O2 by the optical fiber for output 13 from the quantity of the monitoring light O2 at an emission side, which is received from the photo detector 48.

Whether the calculated value O3 of the quantity of the emitted light is equal to the standard value O1 is determined (step S16), and when it is not equal, the control circuit 47 compares the quantity of the emitted light O3 calculated from the quantity of the monitoring light O2 to the standard value O1, and performs the feedback control on the position of the mirror member 17 such that the quantity of the emitted light approaches the standard value O1, thereby corrects the quantity of the emitted light.

According to the embodiment, since the quantity of the injected light I1 can be always monitored, the quantity of the injected light I1 can be obtained on real time even in the case that the quantity of the injected light varies, thereby the quantity of the emitted light can be controlled such that it is exactly equal to the standard value O1.

Sixth Embodiment

Figure 25:
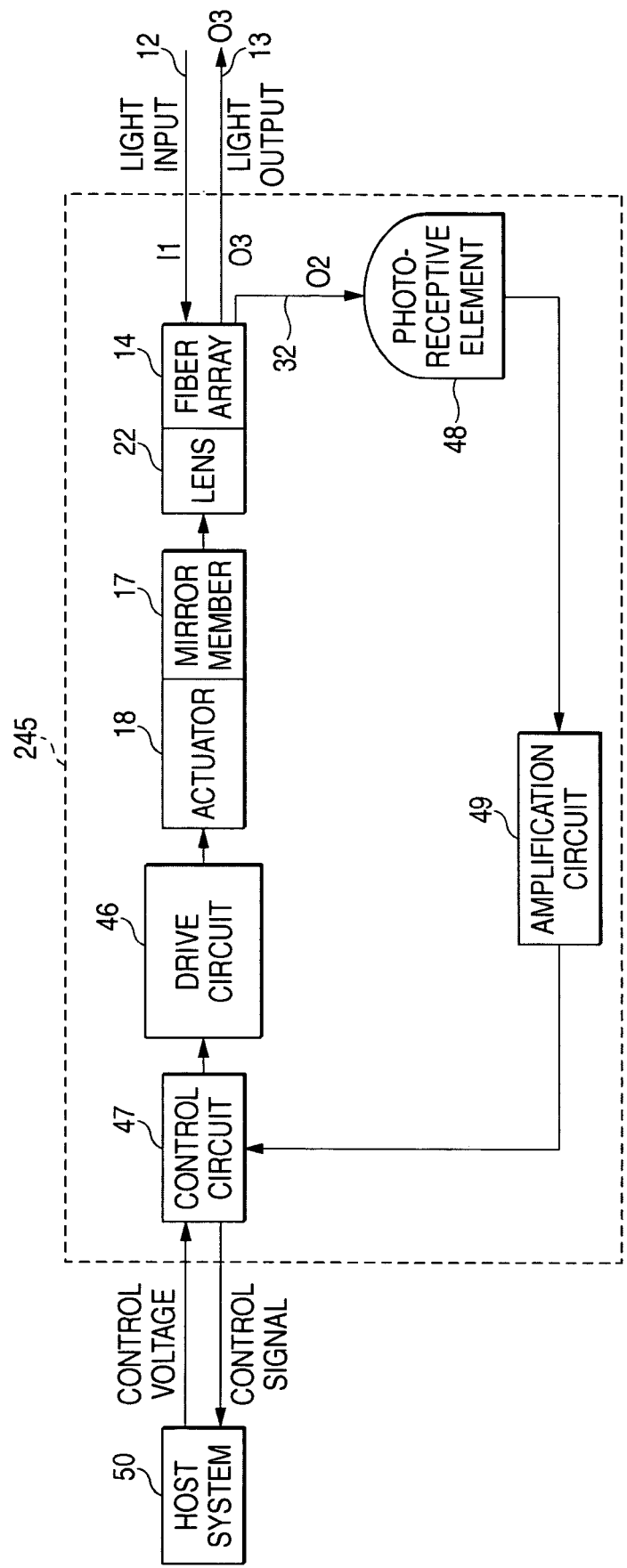
FIG. 25 is a schematic block diagram showing a variable attenuator incorporating a control circuit according to a sixth embodiment of the invention.

FIG. 25 is a schematic block diagram showing a sixth embodiment of the invention, and indicates a variable attenuator incorporating a control circuit 245 for realizing constant attenuation control. The variable attenuator incorporating the control circuit 245 also has the variable optical attenuator with the monitoring function as the third embodiment, which comprises the actuator 18, mirror member 17, and fiber array 14. The variable attenuator incorporating the control circuit 245 further has the drive circuit 46 for driving the actuator 18, the control circuit 47 that controls the actuator 18 and controls the displacement of the optical axis of the collimated light that returns to the fiber array 14, the photo detector 48 that receives the monitoring light outputted from the optical fiber for monitoring 32 in the fiber array 14, and the amplification circuit 49 that amplifies the output signal from the photo detector 48 and inputs the feedback signal into the control circuit 47.

Figure 26B:
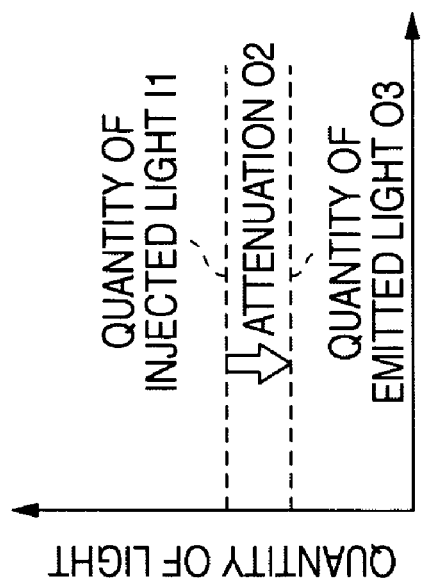
FIG. 26 is a view for illustrating the principles of constant attenuation control by the same variable attenuator incorporating the control circuit.
Figure 26A:
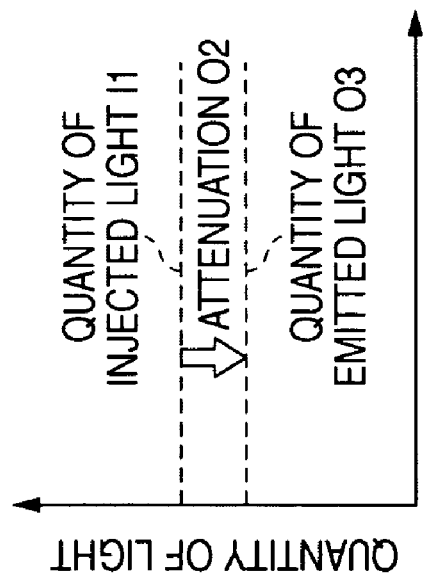

Next, control operation for maintaining the light attenuation to be constant by the variable attenuator incorporating the control circuit 45 is described. FIG. 26(a) and (b) are views for illustrating the principles for the constant attenuation control by the variable attenuator incorporating the control circuit 245 of the embodiment. When the hybrid lens 35 as above is used, there is a relation of, quantity of injected light I1=[quantity of emitted light O3]+[quantity of monitoring light O2], among the quantity of the injected light I1 injected from the optical fiber for input 12 to the mirror member 17, the quantity of the emitted light O3 emitted into the optical fiber for output 13, and the quantity of the monitoring light O2 received by the optical fiber for monitoring 32, therefore if the variable attenuator incorporating the control circuit 245 is controlled such that a value of the quantity of monitoring light 02 is constant,

[quantity of injected light I1]−[quantity of emitted light O3]=constant value [quantity of monitoring light O2], is given. Accordingly, if the variable attenuator incorporating the control circuit 245 as shown in FIG. 25 is controlled such that the quantity of the monitoring light O2 received by the photo detector 48 is constant, quantity of emitted light O3=[quantity of injected light I1]−[constant attenuation], is given. That is, even if the quantity of the injected light varies as change from a condition of FIG. 26(a) to a condition of FIG. 26(b), the quantity of the emitted light with attenuation that is constant at any time without regard to the variation of the quantity of the injected light can be outputted from the optical fiber for output 13.

Figure 27:
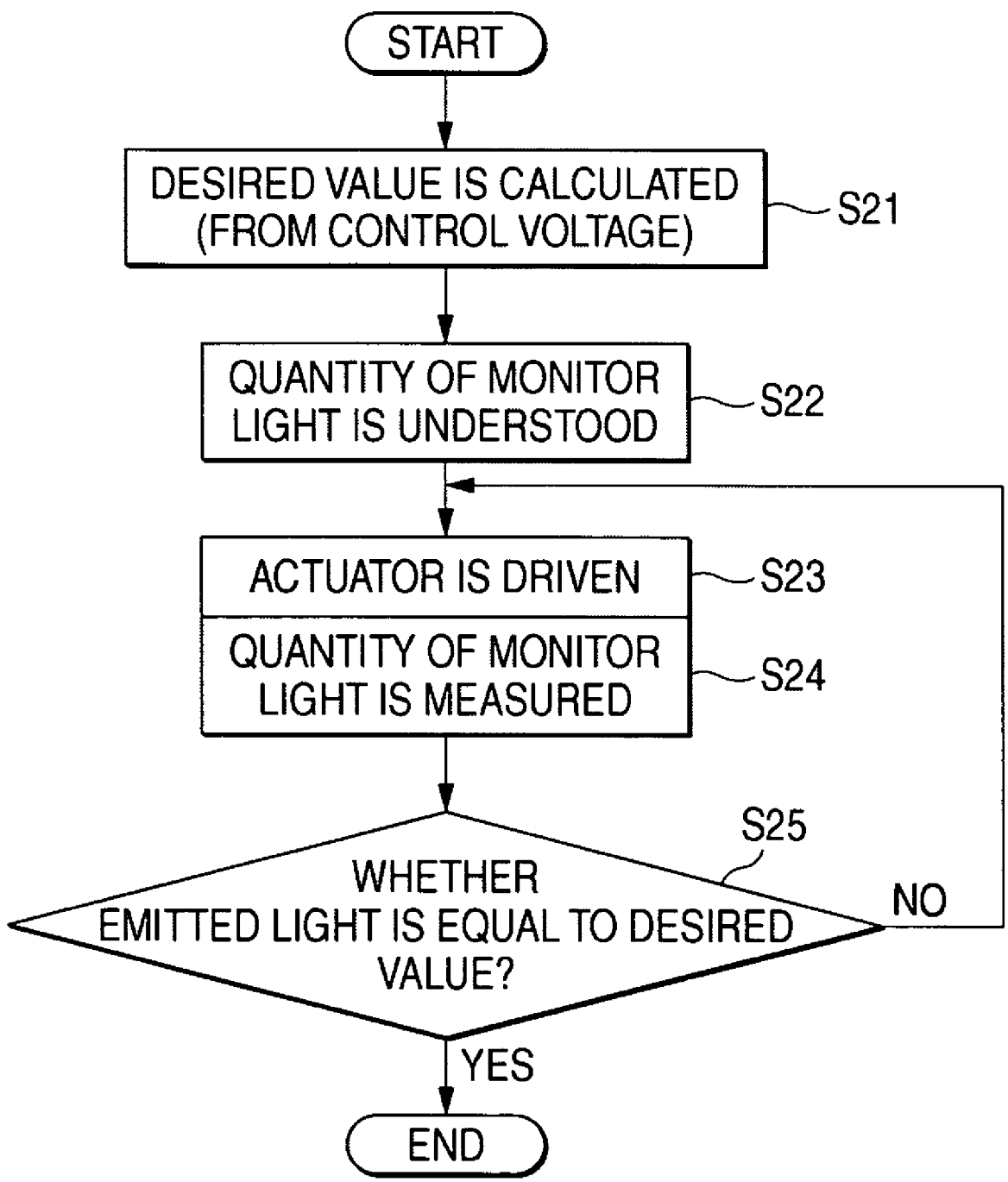
FIG. 27 is a flow diagram showing control operation of the variable attenuator incorporating the control circuit shown in FIG. 25.

FIG. 27 is a flow diagram illustrating a procedure for the constant attenuation control in the variable attenuator incorporating the control circuit 245 in FIG. 25. when the constant attenuation control is described according to the flow diagram, first the control circuit 47 is inputted with a desired value of attenuation ΔD from the host system 50. When the desired value of attenuation ΔD is designated, the control circuit 47 stores the desired value as a desired value for the quantity of monitoring light O2 (step S21). Then, the current quantity of monitoring light O2 is measured by the photo detector 48 (step S22), and a signal outputted from the photo detector 48 is amplified by the amplification circuit 49 and fed back to the control circuit 47 as a monitoring signal. When the control circuit 47 knows the current quantity of monitoring light O2, the circuit moves the mirror member 17 by the actuator 18 through the drive circuit 46 such that the quantity of monitoring light O2 is equal to the desired value ΔD (step S23).

In this way, the mirror member 17 is controlled such that the quantity of monitoring light O2 is equal to the calculated desired value ΔD, and then the quantity of monitoring light O2 injected into the optical fiber for monitoring 32 is further measured (S24). Then, whether the measured quantity of monitoring light O2 is equal to the desired value ΔD is determined (step S25), and if it is not equal, the control circuit 47 compares the measured quantity of monitoring light O2 to the desired value ΔD, and performs the feedback control on the position of the mirror member 17 such that the quantity of monitoring light O2 approaches the desired value ΔD, thereby corrects the quantity of monitoring light O2.

Figure 28:
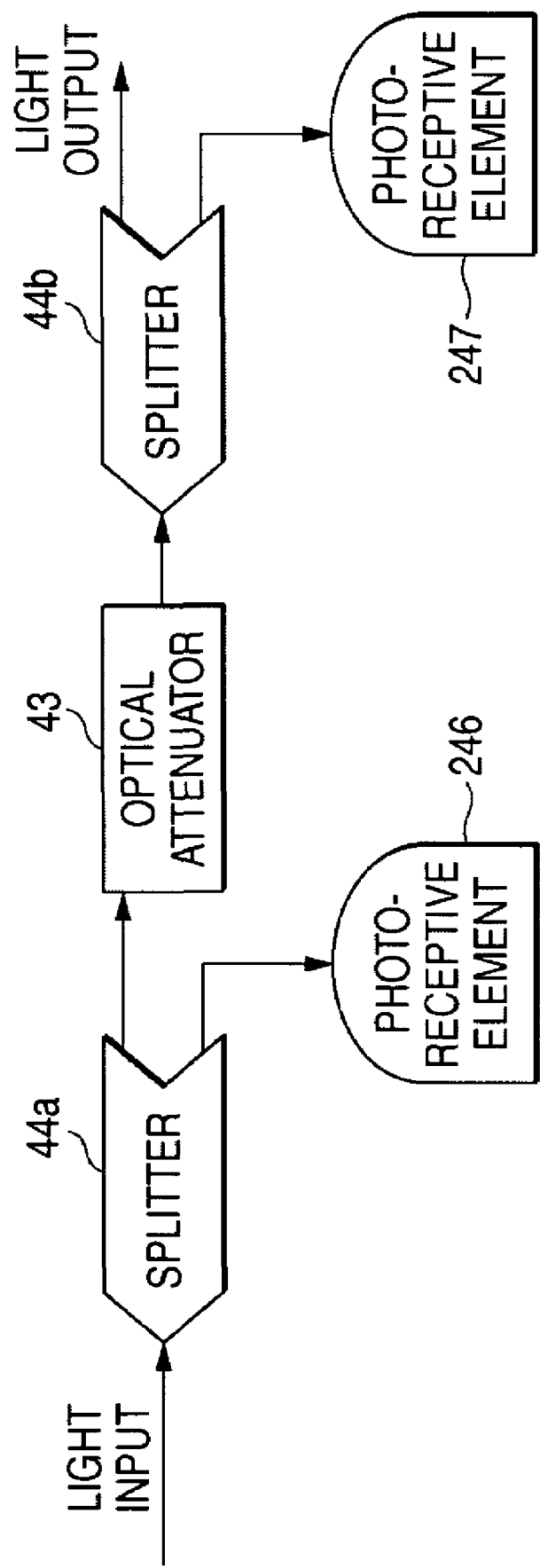
FIG. 28 is a view for illustrating a conventional method of constant attenuation control.

FIG. 28 is a view showing a conventional configuration for the constant attenuation control using the variable optical attenuator 43. In the conventional method, splitters 44a, 44b are connected before and after the variable optical attenuator 43 respectively, part of the light injected into the variable optical attenuator 43 is extracted from the splitter 44a and monitored by a photo detector 246, and part of the light emitted from the variable optical attenuator 43 is extracted from the splitter 44b and monitored by a photo detector 247. Then, the quantity of injected light injected into the variable optical attenuator 43 is obtained from the quantity of monitoring light measured by the photo detector 246, the quantity of the light emitted from the variable optical attenuator 43 is obtained from the quantity of monitoring light measured by the photo detector 247, and a difference value that the quantity of emitted light is subtracted from the quantity of injected light is compared to the desired value of attenuation ΔD, and when the difference value between the quantity of injected light and the quantity of emitted light is not equal to the desired value of attenuation ΔD, the quantity of emitted light is subjected to the feedback control such that the difference between the quantity of injected light and the quantity of emitted light is equal to the desired value of attenuation ΔD.

Therefore, similarly to the case described in the conventional example of FIG. 19, the conventional method has problems of loss of light output and bad monitoring accuracy. According to the embodiment of the invention described here, such problems can be solved.

Seventh Embodiment

Figure 30A:
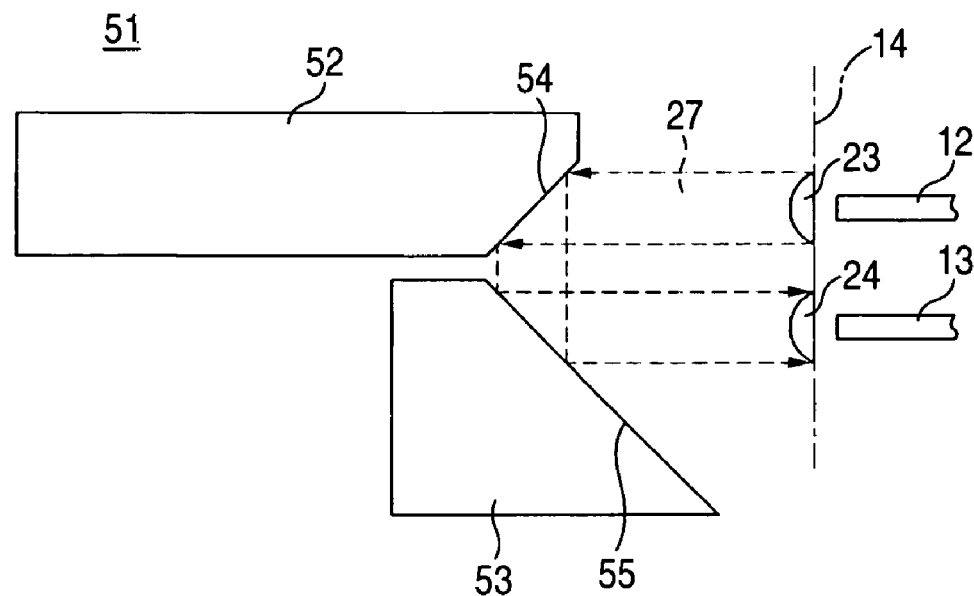
FIGS. 30(a) and (b) are schematic plan views showing a different configuration of the variable optical attenuator according to the seventh embodiment.
Figure 30B:
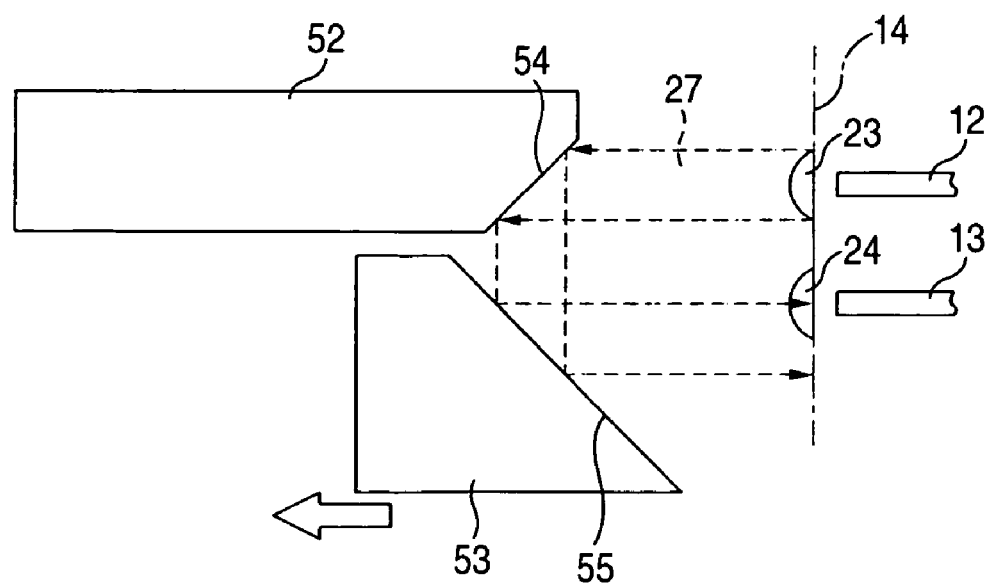
Figure 31A:
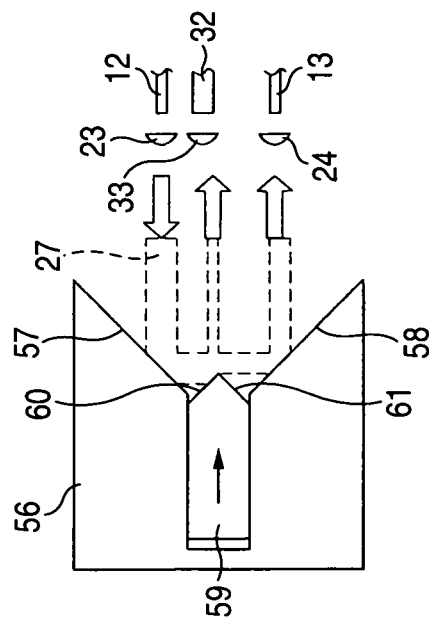
FIGS. 31(a), (b), (c) and (d) are schematic plan views showing a configuration and operation of a variable optical attenuator according to an eighth embodiment of the invention.
Figure 31B:
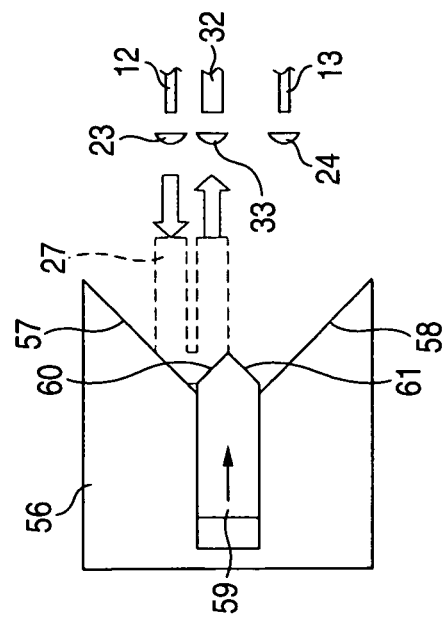
Figure 31C:
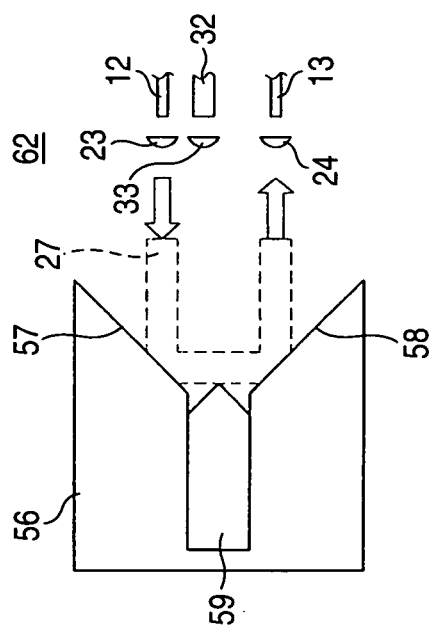
Figure 31D:
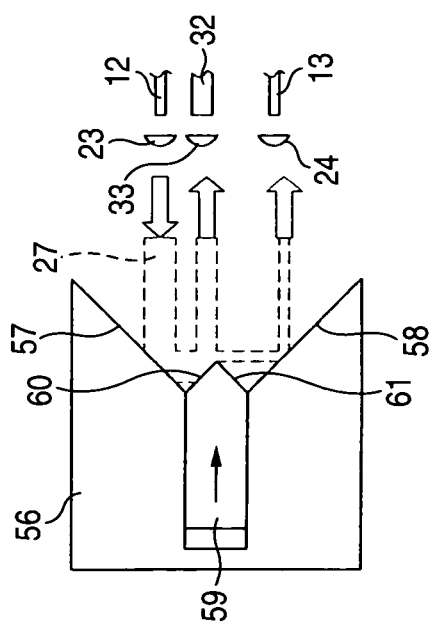

FIG. 29 or FIG. 30 is a schematic plan view showing a configuration of a variable optical attenuation 51 according to a seventh embodiment of the invention. In the variable optical attenuator 51, the mirror member comprises a fixed mirror member 52 and a movable mirror member 53, on the fixed mirror member 52, a mirror 54 inclined 45° with respect to the optical axis of the light emitted from the optical fiber for input 12 is formed and on the movable mirror member 53, a mirror 55 inclined such that it makes an angle of 90 degrees with respect to the mirror 54 is formed. While the fixed mirror member 52 stands still with respect to the fiber array 14, the movable mirror member 53 can straightly move in a direction parallel or perpendicular to the optical axis with respect to the fiber array 14 by the actuator.

FIGS. 29(*a*) and (*b*) show the movable mirror member 53 which is slid in a direction perpendicular to the optical axis of the fiber array 14. FIG. 29(*a*) indicates an aspect that the light 27 emitted from the optical fiber for input 12 is converted into the collimated light by the emission lens 23, and then reflected on the mirror 54 and the mirror 55, and then all beams are condensed by the injection lens 24 and injected into the optical fiber for output 13. As shown by an outline arrow in FIG. 29(*b*), when the movable mirror member 53 is moved in a lateral direction, the light 27 emitted from the optical fiber for input 12 is reflected on the mirrors 54, 55, and then only part of the light is condensed by the injection lens 24 and injected into the optical fiber for output 13. Accordingly, in this condition, the quantity of the light injected into the optical fiber for output 13 is decreased.

FIGS. 30(*a*) and (*b*) show the movable mirror member 53 which is slid in a direction parallel to the optical axis of the fiber array 14. FIG. 30(*a*) indicates an aspect that the light 27 emitted from the optical fiber for input 12 is converted into the collimated light by the emission lens 23, and then reflected on the mirror 54 and the mirror 55, and then all beams are condensed by the injection lens 24 and injected into the optical fiber for output 13. As shown by an outline arrow in FIG. 30 (*b*), when the movable mirror member 53 is moved in a back and forth direction, the light 27 emitted from the optical fiber for input 12 is reflected on the mirrors 54, 55, and then only part of the light is condensed by the injection lens 24 and injected into the optical fiber for output 13. Accordingly, again in this condition, the quantity of the light injected into the optical fiber for output 13 is decreased.

As known from these embodiments, since the fixed mirror member only acts to bend a light direction, if the two optical fibers are held by the fiber array such that they make an angle of 90 degrees to each other, it is sufficient that only one mirror is provided (that is, the fixed mirror member can be omitted).

Eighth Embodiment

FIG. 31 is a schematic plan view showing a configuration of a variable optical attenuator 62 according to an eighth embodiment of the invention. The variable optical attenuator 62 comprises a fixed mirror member 56 having two mirrors 57, 58 opposed in a valley-like pattern with making an angle of 90 degrees to each other, and a movable mirror member 59 having two mirrors 60, 61 disposed in a mountain-like pattern with making an angle of 90 degrees to each other, and the movable mirror member 59 straightly moves in and out from back of a valley portion between the mirrors 57 and 58.

Thus, when the movable mirror member 59 is retracted as FIG. 31(*a*), the light 27 which is emitted from the optical fiber for input 12 and collimated by the emission lens 23 is reflected on the mirrors 57 and 58, and then wholly condensed by the injection lens 24 and injected into the optical fiber for output 13. As shown in FIG. 31(*b*), when the movable mirror member 59 is slid by the actuator and slightly protruded into the optical cannel of the light 27, part of the light reflected by the mirror 57 is shaded by the mirror 60, and the light 27 reflected on the mirror 60 is condensed by the optical fiber for monitoring 32 and injected into the optical fiber for monitoring 32. On the other hand, the quantity of light injected into the optical fiber for output 13 is decreased. When the movable mirror member 59 is further protruded, the quantity of light injected into the optical fiber for output 13 is further decreased, and the quantity of light injected into the optical fiber for monitoring 32 is further increased. When the movable mirror member 59 is largely protruded by the actuator and the optical channel of the light 27 reflected on the mirror 57 is perfectly shaded, the light 27 is not injected into the optical fiber for output 13, and approximately all the light is injected into the optical fiber for monitoring 32.

Therefore, the variable optical attenuator with the monitoring function can be also realized by the variable optical attenuator 62 having such a structure.

Although the mirrors 60, 61 are formed on both sides of the movable mirror member 59 in the embodiment, the mirror 61 can be omitted. That is, a surface on which the mirror 61 is formed can not be always a mirror, or an incline itself, on which the mirror 61 is formed, can not be necessarily provided.

(Structure of Actuator)

Figure 32:
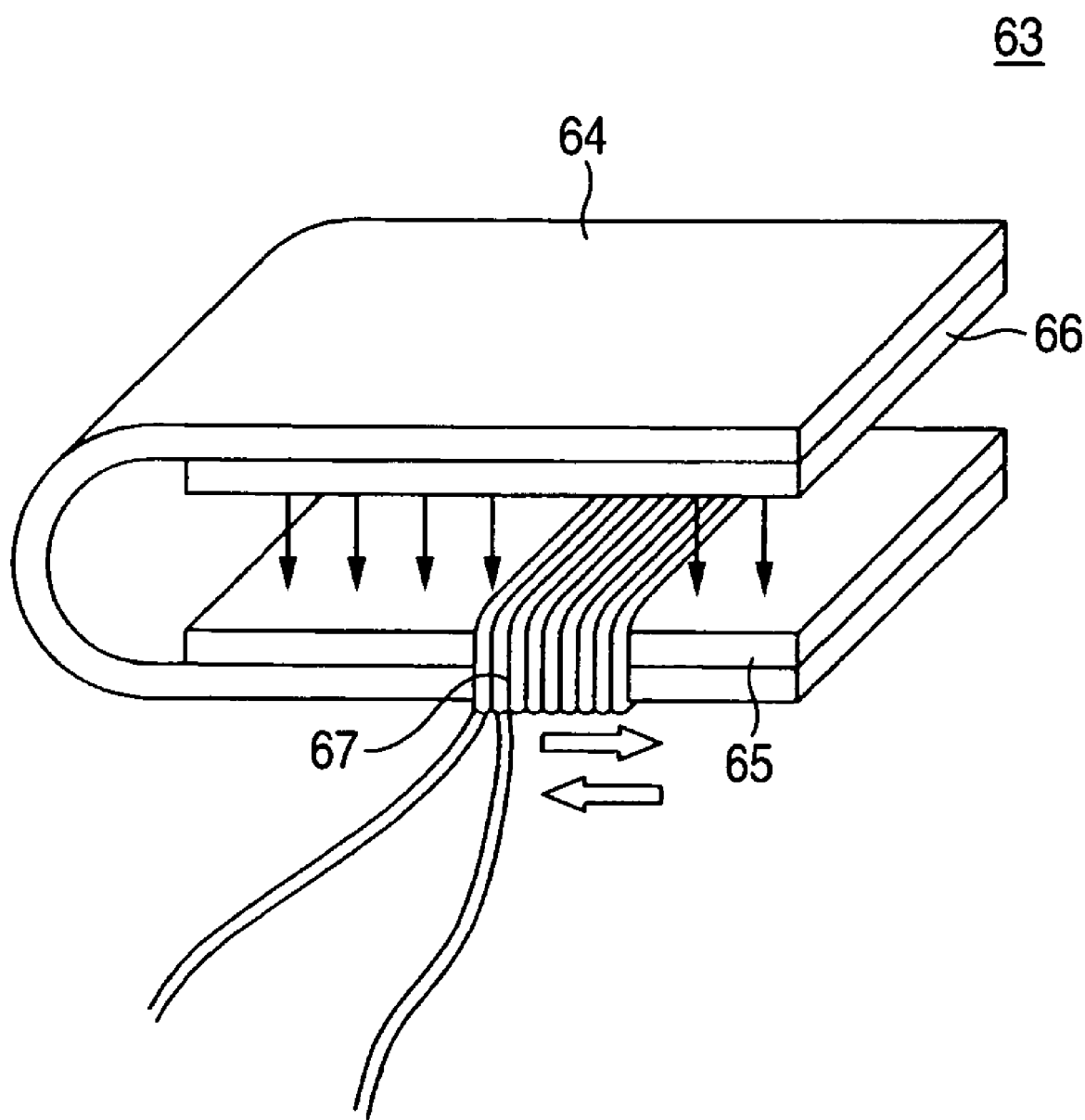
FIG. 32 is a perspective view of an actuator using a subminiature voice-coil-motor (VCM)

Next, a specific configuration of the actuator 18, particularly an actuator having a self-holding function is described. FIG. 32 shows an actuator using a subminiature voice-coil-motor (VCM) 63. Magnets 65, 66 are attached on upper and lower insides of a yoke 64 which is bent in a tuning folk pattern respectively, and a magnetic field is generated between the magnets 65 and 66. A voice coil 67 is formed by annularly winding a coil and fastening it, one magnet 65 and the yoke 64 are inserted into the voice coil 67, and the voice coil 67 is moved smoothly along the magnet 65 by applying a weak force. Thus, when the voice coil 67 is applied with electric current, the voice coil 67 moves in either direction depending on a direction of the electric current due to the Fleming's force generated in the voice coil 67. Therefore, if the voice coil 67 is connected with the mirror member 17 using a certain connecting member, the mirror member 17 can be straightly slid by the voice coil motor 63.

Such a subminiature voice-coil-motor is used for an optical pickup, and produced compactly and precisely utilizing a voice-coil-motor technique used for applications such as CD or MD. The voice coil motor is effective as the actuator because of its compact size, excellent response, and fine feed (μm order) capability. However, the voice coil motor is biased in an original direction by a return spring, and thrust is exerted for the displacement only while the electric current is applied, therefore a latch mechanism is desirably added so that a condition can be maintained even if the electric current is cut off.

Figure 33A:
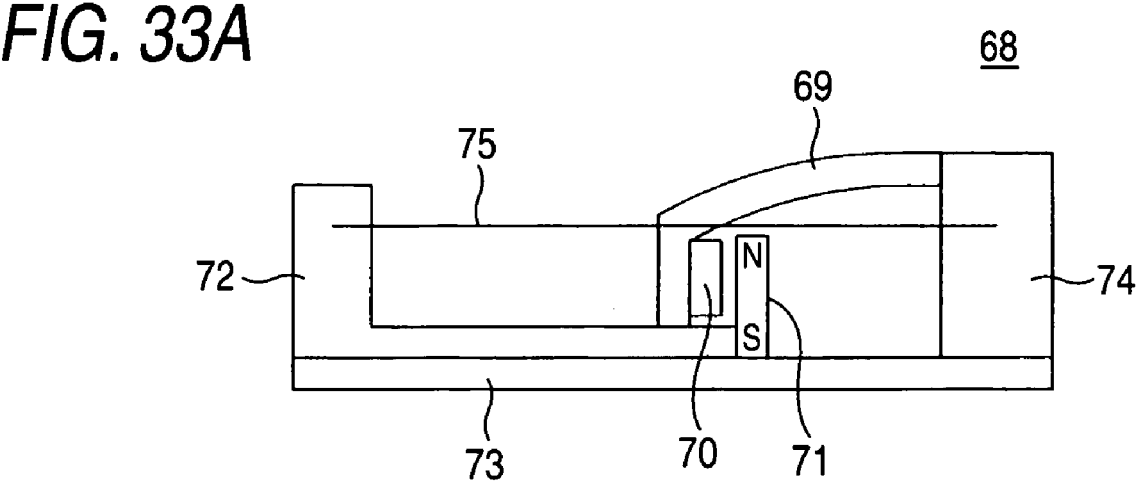
FIGS. 33(a) and (b) are side views for illustrating operation of a latch mechanism.
Figure 33B:
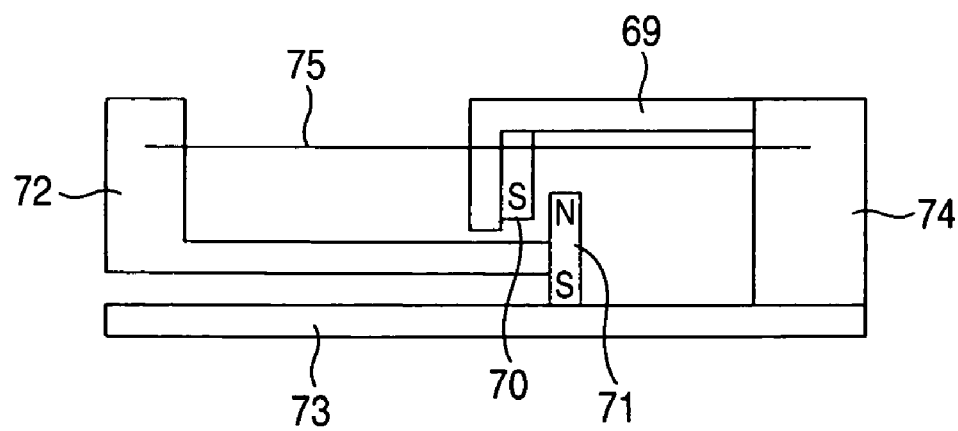
Figure 34A:
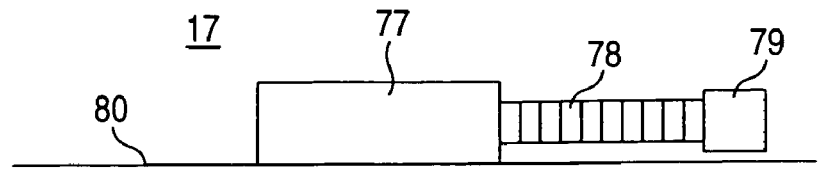
FIGS. 34(a), (b), (c) and (d) are schematic views for illustrating an actuator having another structure.
Figure 34B:
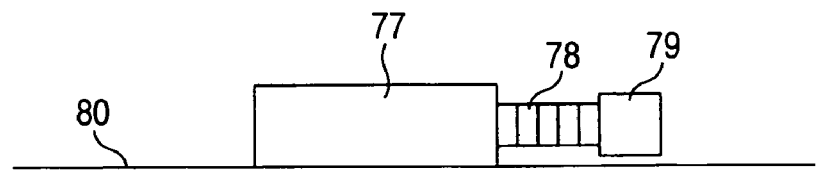
Figure 34C:
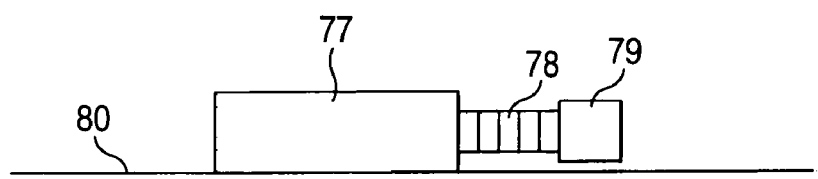
Figure 34D:
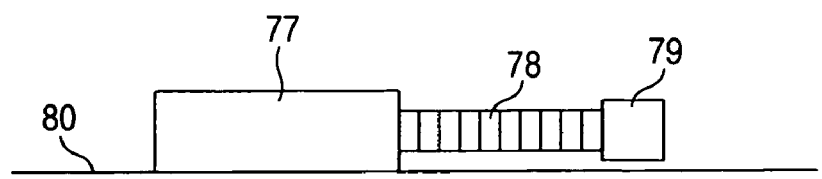

The latch mechanism can be formed by a typical magnetic circuit. For example, a latch mechanism 68 as shown in FIG. 33 (see FIG. 51 together) can be used. The latch mechanism 68 comprises a flat spring 69, coil 70, and magnet 71, and a rear anchor of the curved flat spring 69 is fixed to a holding part 74. An inside of a front end of the flat spring 69 is attached with the coil 70, and the coil 70 is opposed to the magnet 71. A movable part 72 is located below the front end of the flat spring 69, and the movable part 72 is pressed down at its front end by spring stress of the flat spring 69. On the other hand, the holding part 74 stood on an upper surface of a base 73 is fixed with one end of an elastic wire 75, and the other end of the wire 75 is connected with the movable part 72. Although the movable part 72 is biased by the elasticity of the wire 75 such that it rises from the base 73, the pressing force by the flat spring 69 is stronger than the biasing force.

Therefore, when the coil 70 is not applied with electric current, the movable part 72 is pressed against the base 73 by the front end of the flat spring 69 and fixed so that it does not move. When latch is desired to be released, the coil 70 is applied with electric current to generate electromagnetic attraction between the coil 70 and the magnet 71. When the coil 70 is attracted to an upper part of the magnet 71 by the electromagnetic attraction, the front end of the flat spring 69 is raised, and the movable part 72 rises from the base 73, thereby the movable part 72 can be moved. Accordingly, the movable part 72 is connected with the voice coil 67 of the voice coil motor 63, thereby the voice coil 67 can be added with the latch mechanism.

If a silicone sheet is inserted between the flat spring 69 and the movable part 72 or between the movable part 72 and the base 73, or if each of contacting portions is formed from the silicone sheet, holding force by friction can be improved with shock being relaxed.

For the latch mechanism, in addition to this, any method such as method using a cam roller, method using oil pressure, and method using shape memory alloys can be used. The method can be preferably selected in consideration of holding force, power consumption, a mounting space, and the like.

(Structure of Another Actuator)

A type of the actuator is not limited as long as it is compact and can be linearly driven. For example, a piezoelectric actuator using rapid deformation of a piezoelectric element can be used. The actuator 76 is formed by connecting a moving object 77 and a weight part 79 via a piezoelectric element 78 as shown in FIG. 34. When the actuator 76 is retracted, the piezoelectric element 78 is slowly contracted as shown in FIGS. 34(*a*) to FIG. 34(*b*). Since the piezoelectric element 78 is slowly contracted, the moving object 77 does not move, remaining at rest due to friction between the object and a floor 80, and only the weight part 79 moves backward. Then, the contraction of the piezoelectric element 78 is suddenly stopped as FIG. 34(*c*), the actuator 76 as a whole moves backward due to inertia of the weight part 79 having large mass. Then, the piezoelectric element 78 is rapidly extended, since the weight part 79 having the large mass can not move due to the inertia, the moving object 77 is moved backward. Such actions as FIG. 34(*a*) to (*d*) are repeated many times, thereby the actuator 76 moves backward by small distances. Similarly, the actuator 76 can be moved forward. In addition, such an actuator 76 can be stood at an optional position when the piezoelectric element 78 is not driven, and can perform the similarly function as the latch mechanism.

(Structure of Still Another Actuator)

Figure 35:
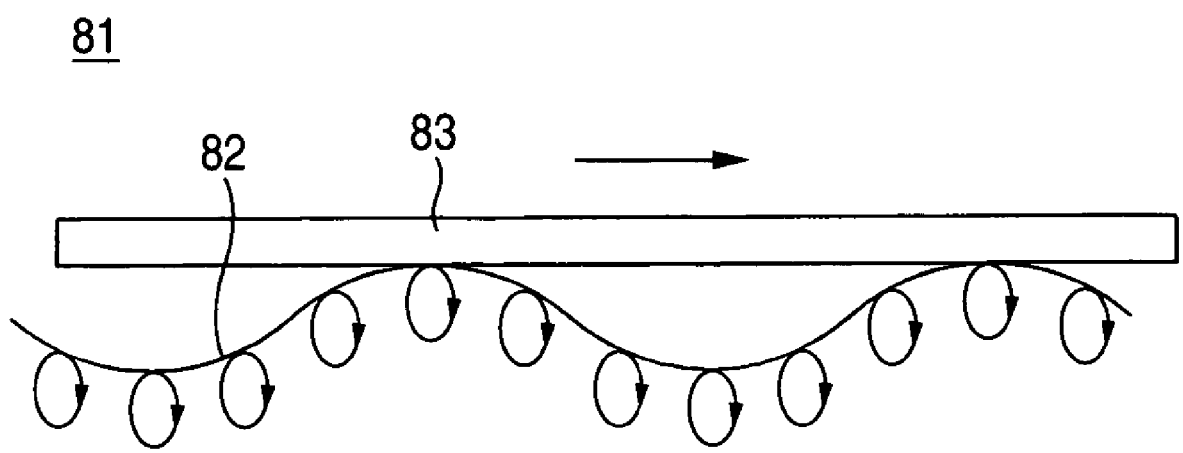
FIG. 35 is a view showing a part of an ultrasonic linear motor used as the actuator in an expanded scale.

An ultrasonic linear motor 81 can be used as the actuator. FIG. 35 shows a part of the ultrasonic linear motor 81 in an enlarged scale. The ultrasonic linear motor 81 comprises a stator 82 comprising an elastic material and a slider 83 contacting to a surface of the stator 82. When the ultrasonic linear motor 81 is driven, surface grains of the stator 82 perform an elliptical motion as shown in the figure, accordingly the Rayleigh wave is transmitted over the surface of the stator 82, and the slider 83 is moved along the surface of the stator 82 due to friction between the stator 82 and the slider 83. Accordingly, the slider 83 is better to be fixed with the mirror member 17. When the ultrasonic linear motor 81 is not driven, since the slider 83 does not move due to the friction between the stator 82 and the slider 83, the ultrasonic linear motor 81 has the same function as the latch mechanism.

(Structure of Still Another Actuator)

Figure 36:
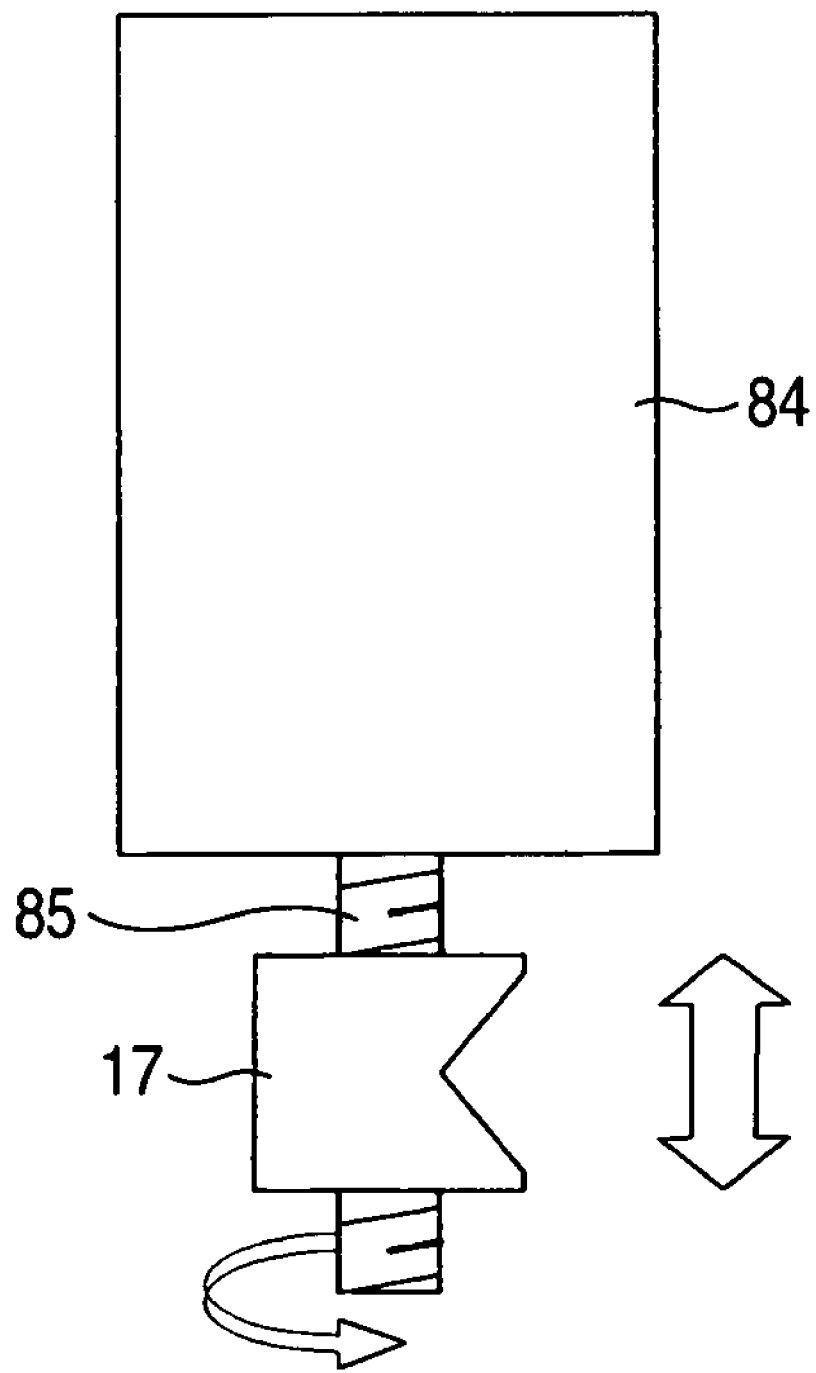
FIG. 36 is a plan view showing an actuator having still another structure.

A micro-stepping motor technique used for a miniature camera or a miniature movie camera can be used as the actuator. An actuator shown in FIG. 36 is formed by inserting a lead screw 85 provided on a rotation axis of a stepping motor 84 into a nut (female screw hole; not shown) provided in the mirror member 17. If the mirror member 17 is set such that it does not rotate, the lead screw 85 is rotated by the stepping motor 84, thereby the mirror member 17 can be moved along an axial direction of the stepping motor 84.

Figure 37:
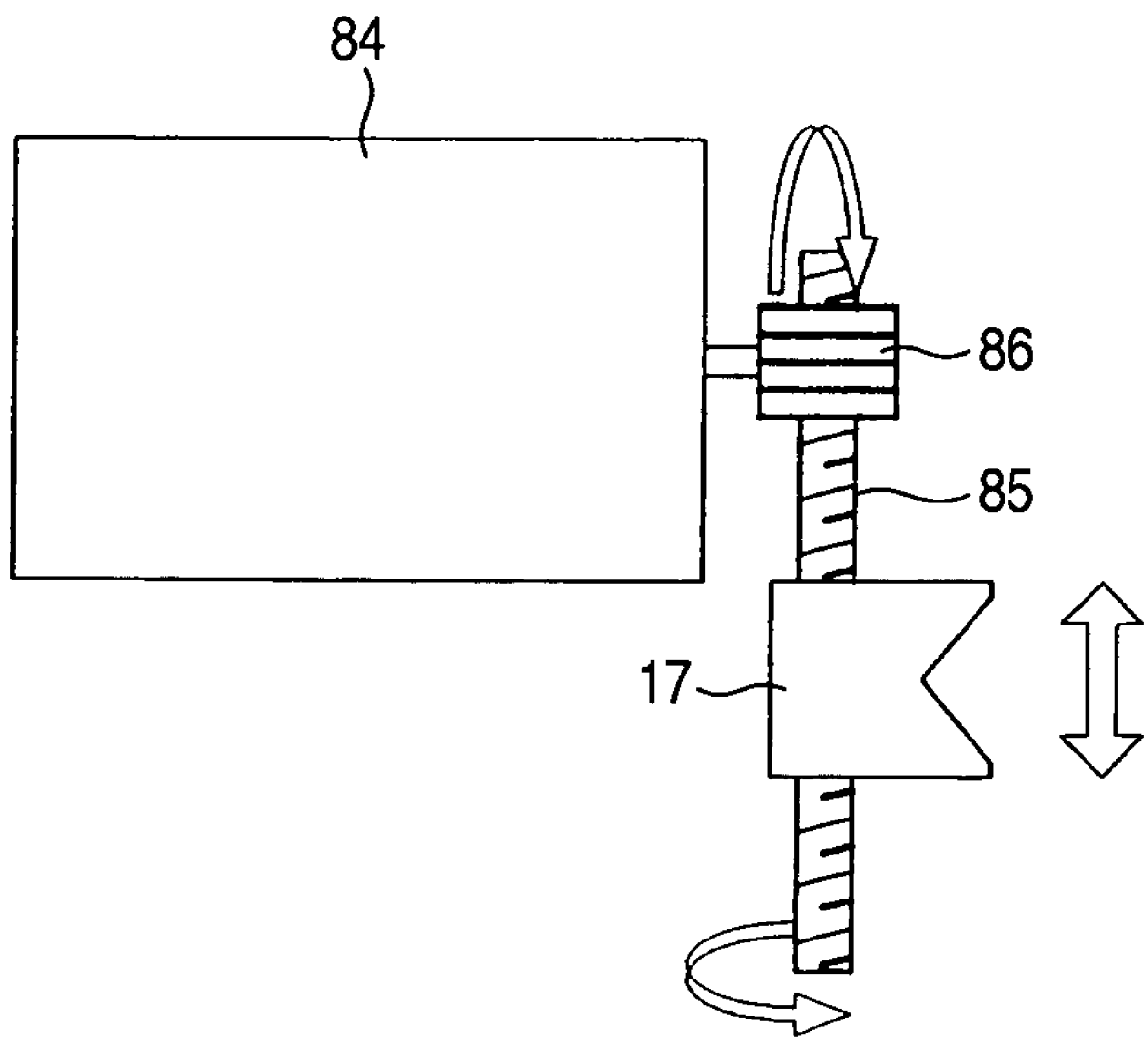
FIG. 37 is a plan view showing an actuator having still another structure.

An actuator shown in FIG. 37 is formed by engaging a worm gear 86 mounted on a rotation axis of the stepping motor 84 with a lead screw which is disposed such that it intersects at right angle with the rotation axis of the stepping motor 84 and pivoted by the axis. According to the actuator, the lead screw 85 is rotated by the stepping motor 84 via the worm gear 86, thereby the mirror member 17 can be moved in a direction perpendicular to the axial direction of the stepping motor 84.

(Structure of Another Latch Mechanism)

Next, another embodiment of the latch mechanism 68 is described, which is provided for that even if power of the actuator is turned off after moving the mirror member 17 by the actuator such as voice coil motor, the mirror member 17 is held a at that position.

Figure 38:
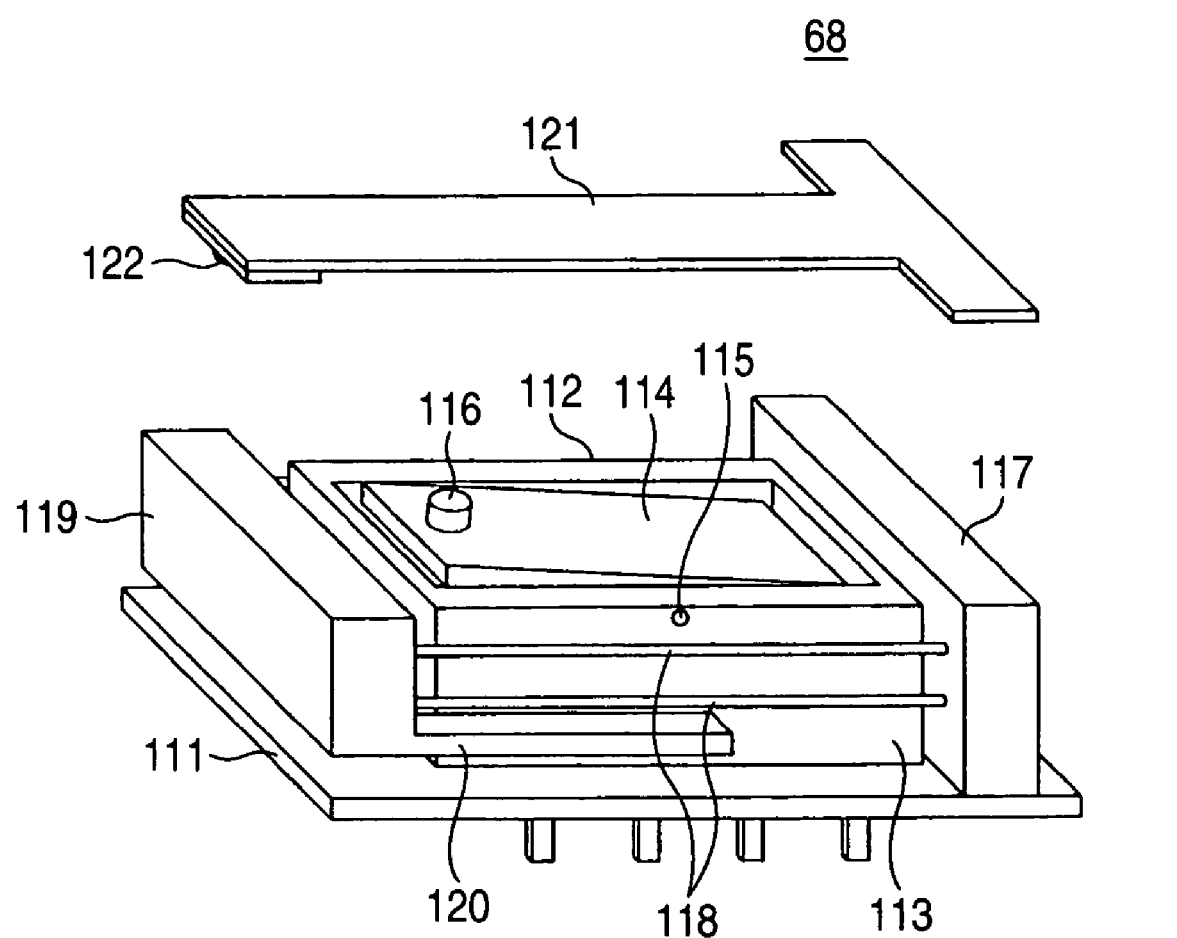
FIG. 38 is an exploded perspective view showing a latch mechanism having another structure.
Figure 39A:
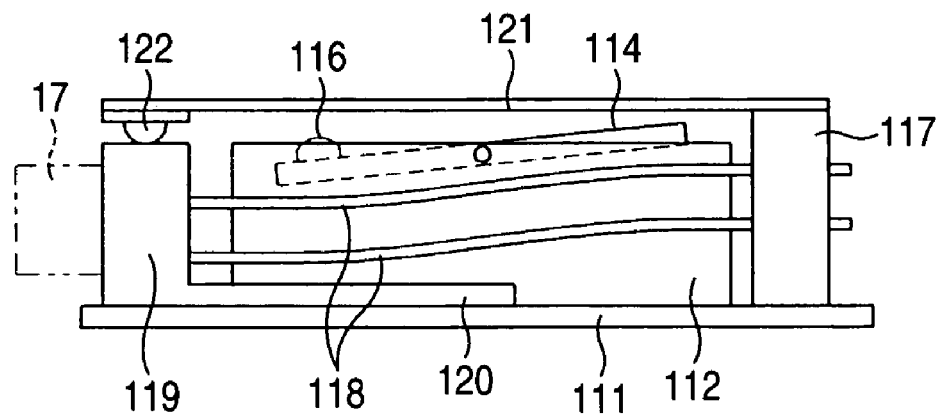
FIGS. 39(a) is a side view of the same latch mechanism in a condition that a movable part is lowered, and (b) is a plan view thereof.
Figure 39B:
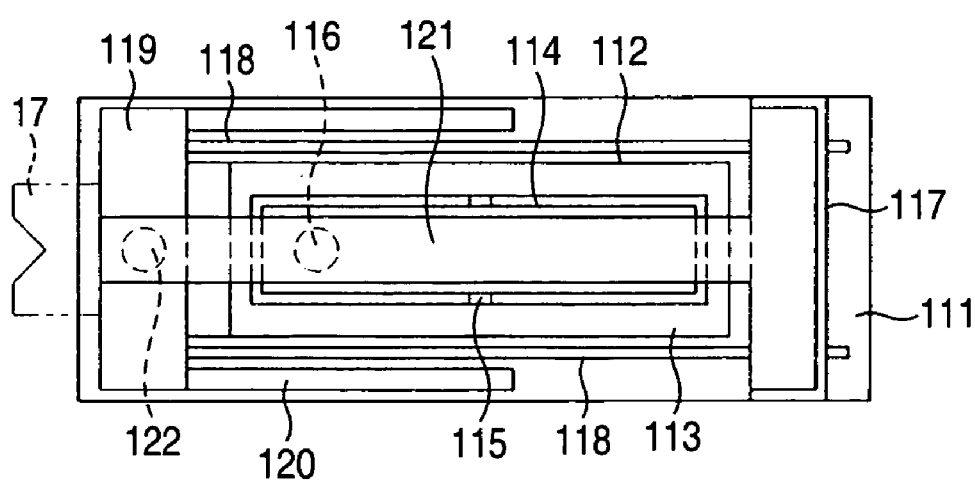
Figure 40:
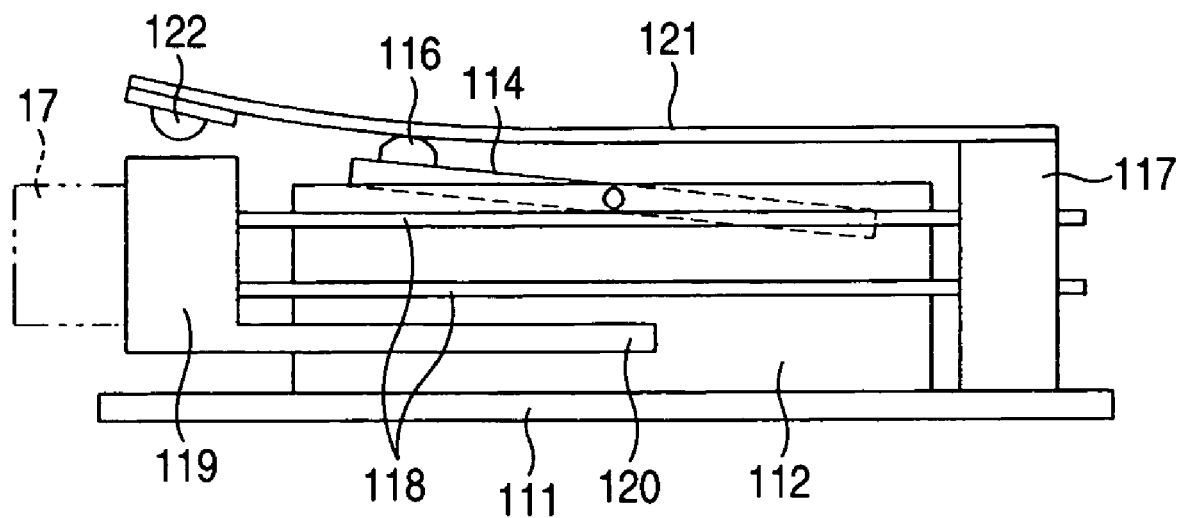
FIG. 40 is a side view of the latch mechanism of FIG. 38 in a condition that the movable part is raised.

FIG. 38 is an exploded perspective view showing another latch mechanism 68, FIGS. 39(*a*) and (*b*) are a side view and a plan view when the movable part is lowered, and FIG. 40 is a side view when the movable part is raised. In the latch mechanism 68, a drive part 112 is arranged at a center of an upper surface of a substrate 111. In the drive part 112, an armature 114 is rotatably supported by an axis 115 at an upper part in a casing 113, and the armature 114 is exposed from an upper surface of the casing 113. On an upper surface of one end of the armature 114, a projection 116 is provided. The drive 112 can rotate the armature 114 using an electric signal to switch an inclined direction of the armature 114.

In the drive part 112, the armature 114 is inclined such that the projection 116 protrudes upward during power-on, and inclined such that the projection 116 retracts downward during power-off. Alternatively, the drive part 112 can be a self-holding type, and in this case, while power is necessary when the armature 114 is moved, after the armature 114 is moved to a predetermined angle, the armature 114 is held by itself and fixed as it is even if the power is turned off. As such a self-holding-type drive part 112, a mechanism used for driving a contact spring in, for example, a self-holding-type electromagnetic relay (latching relay) can be used, wherein an electromagnet that is excited by current application to move the armature, and a latch mechanism for locking the armature to its angle when current is not applied are internally incorporated. However, in the following description, it is assumed that the drive part 112 is not the self-holding type.

A spring support part 117 is vertically arranged on the upper surface of the substrate 111 at a rear of the drive part 112, and rear anchors of a plurality of linear springs 118 are fixed to both side portions of a front face of the spring support part 117 respectively. A movable part 119 is disposed at a front of the drive part 112, and the movable part 119 is connected with front ends of the plurality of linear springs 118 and elastically supported by the linear springs 118. When the movable part 119 is not applied with external force, the part is maintained at a predetermined height above the substrate 111 due to elasticity of the linear springs 118. The mirror member 17 is fixed on a front of the movable part 119.

The drive part 112 can be moved laterally using the actuator such as voice coil motor in the condition that it is supported above the substrate 111 by the linear springs 118. Stoppers 120 protrude from both side portions of the movable part 119 toward both side faces of the drive part 112; and the stoppers 120 contact to the drive part 112, thereby a range of lateral movement of the movable part 119 is restricted.

An elastic member 121 is fixed on an upper surface of the spring support part 117. The elastic member 121 is formed into an approximately T pattern using a flat spring, and a portion of its rear anchor having a large width is fixed to the upper surface of the spring support part 117. A projection 122 is provided on a lower surface at a front end of the elastic member 121, and the front end of the elastic member 121 and the projection 122 are opposed to an upper surface of the movable part 119. The projection 116 provided on the front end of the armature 114 is opposed to a lower surface of a front portion of the elastic member 121. The force that the elastic member 121 presses down the movable part 119 is larger than the force that the linear springs 118 raises the movable part 119, and in a condition that the elastic member 121 is not applied with force from the armature 114, the elastic member 121 presses down the movable part 119 using the projection 122, and presses the movable part 119 against the substrate 111 and locks the part so that it can not move.

Thus, as shown in FIG. 39(*a*), when the movable part 112 is in a power-off state and the armature 114 is lowered at a side provided with the projection 116, the movable part 119 is pressed down by the elastic member 121, and pressed against the substrate 111 and thus locked.

On the other hand, as shown in FIG. 40, when power of the drive part 112 is turned on to drive the armature 114, and the side provided with the projection 116 is protruded upward, the elastic member 121 is raised by the projection 116 and thus curved, the projection 122 on the elastic member 121 is separated from the movable part 119, and the movable part 119 is raised from the substrate 111 by elastic force of the linear springs 118. In this condition, since the movable part 119 can be moved laterally by the actuator, the movable part 119 attached with the mirror member 17 is moved by the actuator, thereby the light attenuation can be freely adjusted.

After the light attenuation is adjusted to a desired value, when the power of the drive part 112 is turned off, the armature turns around again, and the projection 116 is lowered. As a result, the movable part 119 is pressed down by the elastic force of the elastic member 121 and pressed against the substrate 111, and thus locked again. Accordingly, if such a latch mechanism 68 is used, it is enough that the drive part 112 is applied with electric current only when the mirror member 17 is moved by the actuator, the drive part 112 needs not be applied with electric current after the position of the mirror member 17 is adjusted and thus the movable part 119 is locked, and as a result power saving of the latch mechanism 68 can be achieved.

(Structure of Still Another Latch Mechanism)

Figure 41A:
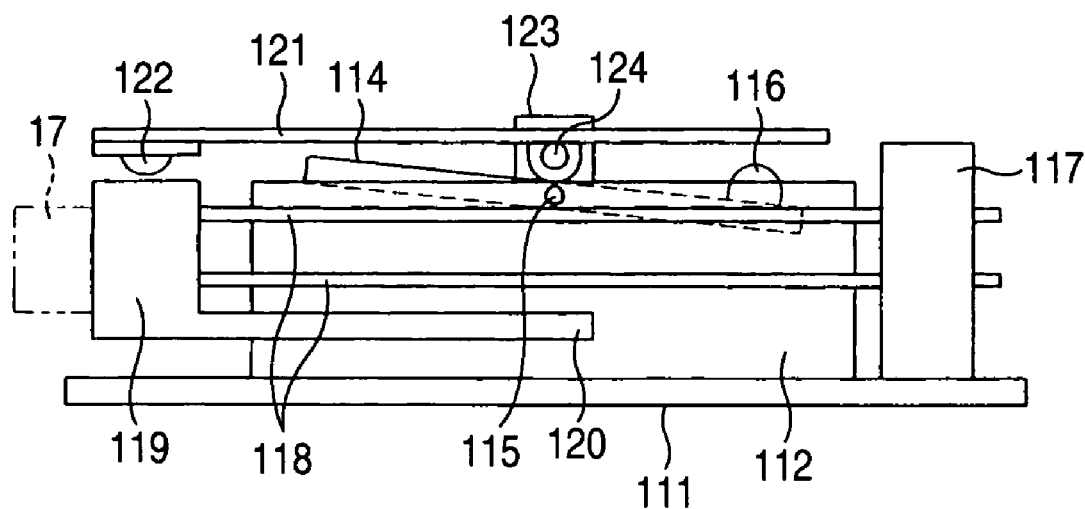
FIGS. 41(a) is a side view showing a latch mechanism having a still another structure, and (b) is a plan view thereof.
Figure 41B:
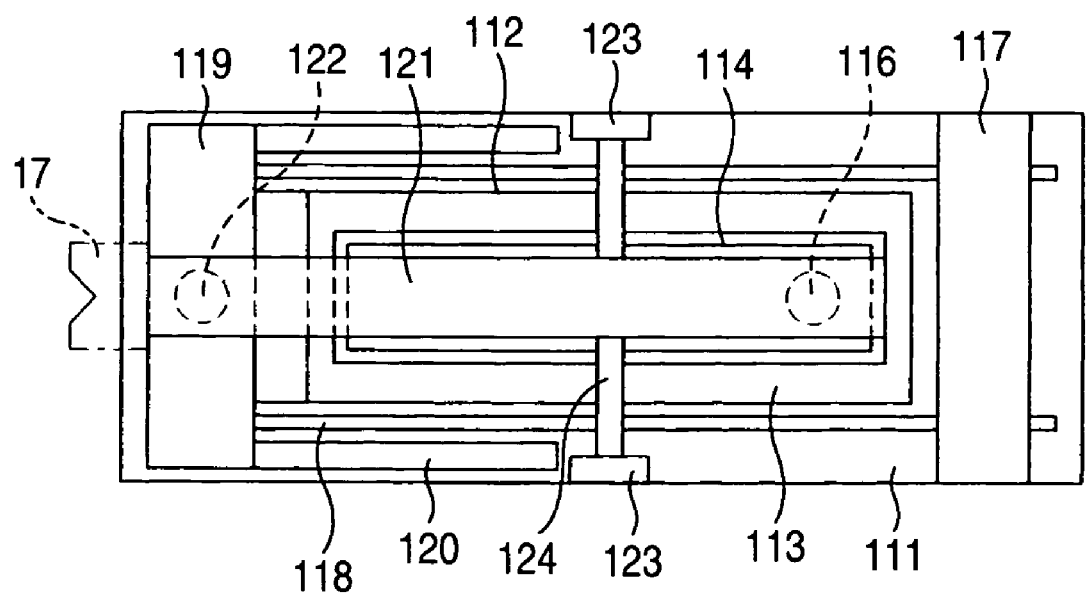

FIGS. 41(*a*) and (*b*) are a side view and a plan view of a still another latch mechanism 68 when the movable part 119 is raised, and FIG. 40 is a side view of the mechanism when the movable part 119 is lowered. Although the latch mechanism 68 according to the embodiment has an approximately similar structure as in the embodiment shown in FIG. 38, structures of the armatures 114 and the elastic member 121 are different from those in FIG. 38. In the embodiment, a pair of posts 123 is stood on both side edges of the substrate 111, and both ends of a rotational axis 124 fixed to a lower surface at a center of the elastic member 121 are rotatably supported by the posts 123. Accordingly, the elastic member 121 rotates about the rotational axis 124. The projection 116 is provided on a rear end of the armature 114 exposed from the upper surface of the drive part 112, and the projection 116 is opposed to the lower surface at the rear (backside from the rotational axis) of the elastic member 121. In the drive part 112, the armature 114 is inclined such that the projection 116 protrudes upward during power-off, and inclined such that the projection 116 is retracted downward during power-on.

Figure 42:
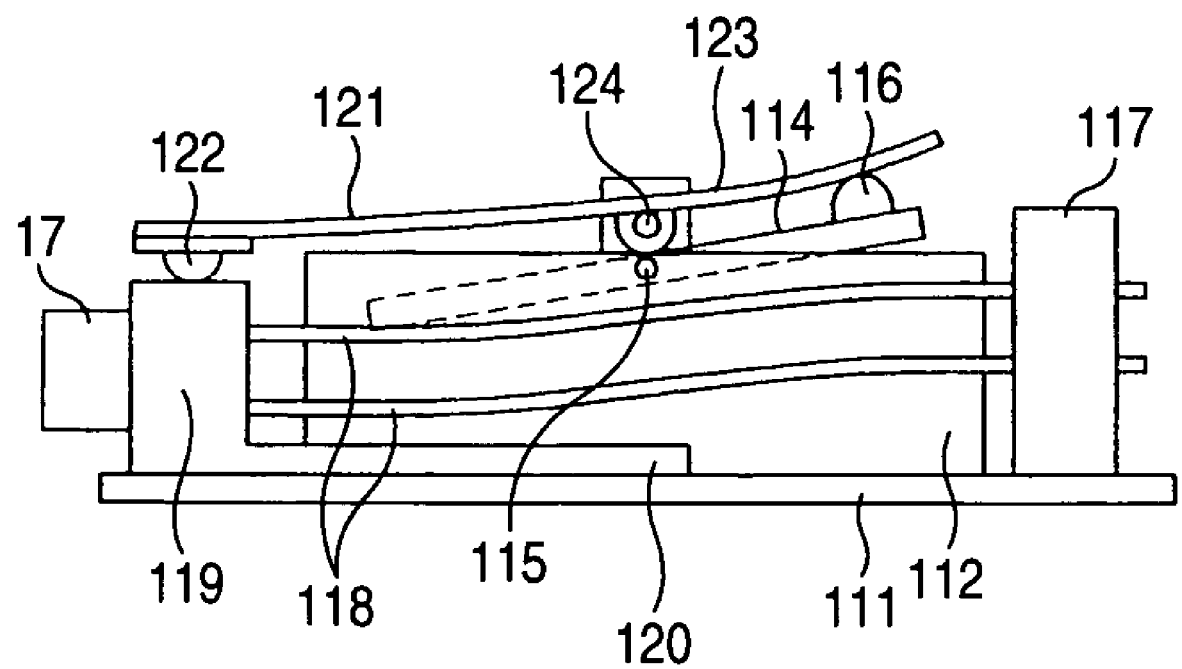
FIG. 42 is a side view of the same latch mechanism in a condition that a movable part is lowered.

Thus, when the drive part 112 is in the power-off state, as shown in FIG. 42, since the armature 114 is inclined and its rear provided with the projection 116 is protruded upward, a rear of the elastic member 121 is pressed upward by the projection 116, and the projection 122 provided on a front of the elastic member 121 elastically presses down the movable part 119 as a reaction. As a result, the movable part 119 is pressed against the substrate 111, and locked so that it can not move laterally.

On the contrary, when the movable part 112 is in the power-on state, as shown in FIG. 41(*a*), since the armature 114 is turned around and its rear provided with the projection 116 is lowered and removed from the elastic member 121, the movable part 119 attached with the mirror member 17 is raised by the linear springs 118 and thus can be moved laterally by the actuator.

In this way, the movable part 119 is moved by the actuator, thereby the position of the mirror member 17 is adjusted. After that, when the power of the drive part 112 is turned off again, the projection 116 is raised upward and pressed up the rear of the elastic member 121, and the movable part 119 is pressed against the substrate 111. Accordingly, the movable part 119 is locked so that it does not move in a condition that the position of the mirror member 17 is adjusted.

(Structure of Still Another Latch Mechanism)

Figure 43A:
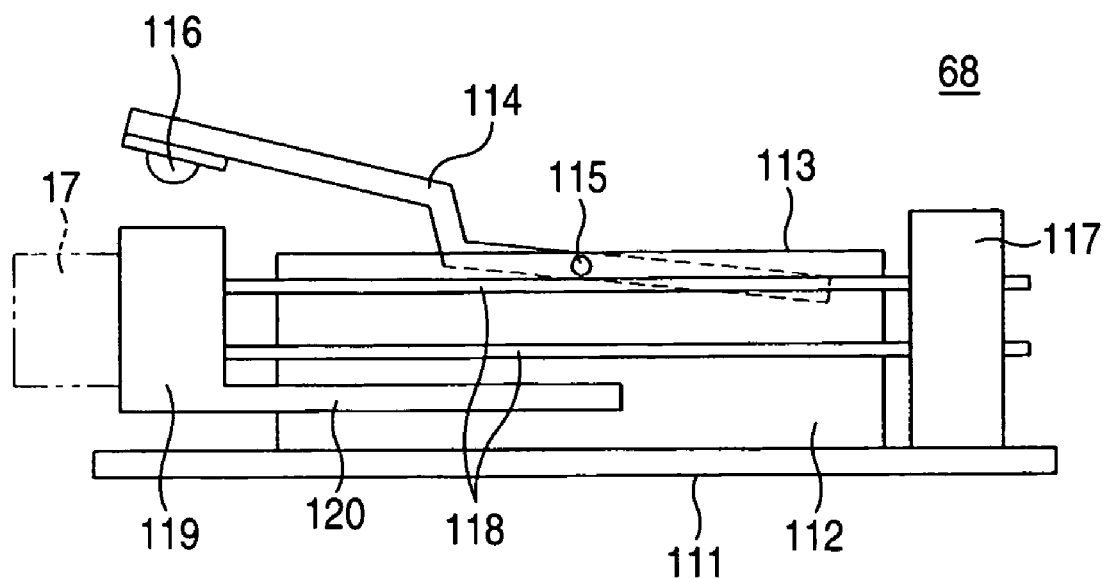
FIGS. 43(a) and (b) are side views showing a latch mechanism having still another mechanism.

FIGS. 43(a) and (b) are side views for illustrating a structure and operation of still another latch mechanism 68. In the embodiment, as described below, the armature 114 of the drive part 112 is formed from an elastic material such as a flat spring, thereby the armature 114 has a function as an elastic member. In the drive part 112 used in the embodiment, the front of the armature 114 is extended externally to the casing 113, in addition, the front of the armature 114 is bent stepwise such that the armature 114 is not hit with the casing 113 when the armature 114 is rotated. Then, the projection 116 is provided on the lower surface at the front end of the armature 114, and the projection 116 is opposed to the upper surface of the movable part 119. In the drive part 112, the front provided with the projection 116 is lowered during power-off, and the armature 114 rotates and the front provided with the projection 116 is raised upward during power-on.

Figure 43B:
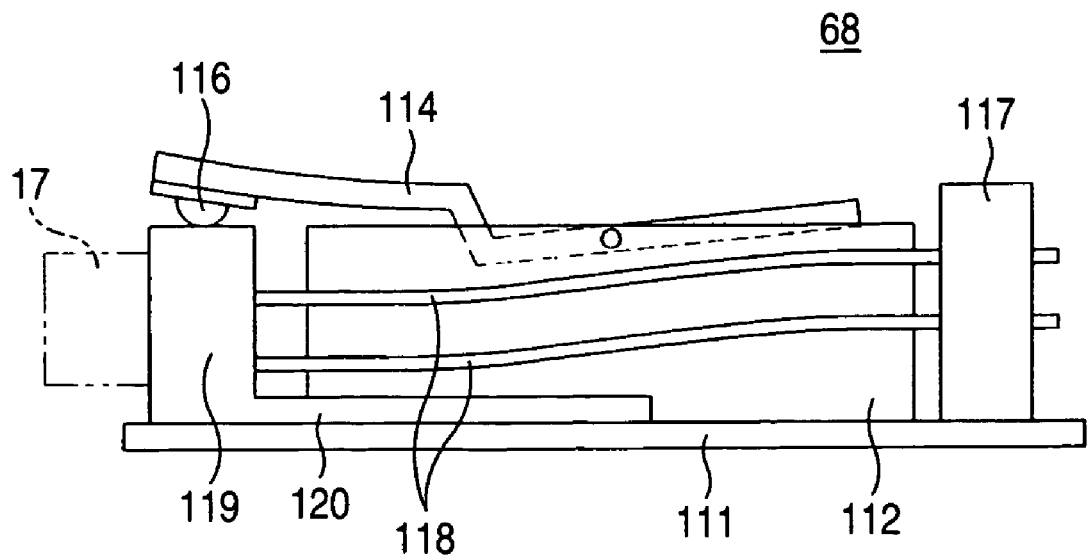

Thus, when the drive part 112 is in the power-off state, as shown in FIG. 43(b), the front of the armature 114 provided with the projection 116 is lowered, and the movable part 119 is pressed against the substrate 111 by the projection 116 and locked. On the contrary, when the power of the drive part 112 is turned on, as shown in FIG. 43(a), the armature 114 is inclined and the front provided with the projection 116 rises above the upper surface of the movable part 119, and the movable part 119 is raised by the linear springs 118. In this condition, the movable part 119 is moved laterally by the actuator, thereby the light attenuation can be adjusted by the mirror member 17. After it has been adjusted, when the power of the drive part 112 is turned off, the condition in FIG. 43(b) is returned, and the movable part 119 adjusted is locked.

(Structure of Still Another Latch Mechanism)

Figure 44A:
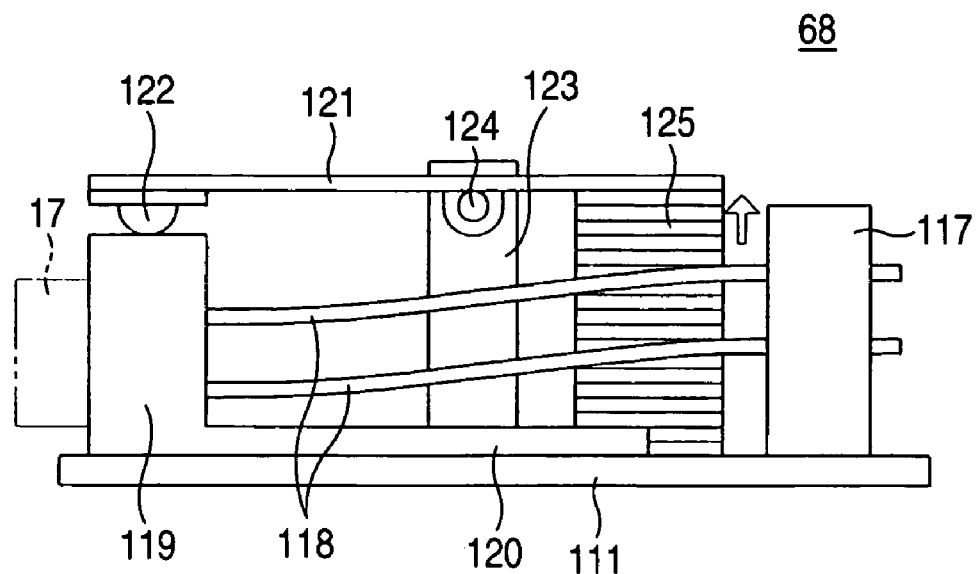
FIGS. 44(a) and (b) are side views showing a latch mechanism having still another mechanism.

FIGS. 44(a) and (b) are side views for illustrating a structure and operation of a still another latch mechanism 68. In the latch mechanism 68 according to the embodiment, a piezoelectric actuator 125 is used instead of using the movable part. That is, in the embodiment, a pair of posts 123 are stood on both side edges of the substrate 111, and both ends of the rotational axis 124 fixed to the lower surface at the center of the elastic member 121 are rotatably supported by the posts 123. The projection 122 provided on the lower surface at the front end of the elastic member 121 is opposed to the upper surface of the movable part 119 supported by the linear springs 118. On the upper surface at the rear of the substrate 111, a piezoelectric actuator 125 that vertically expands and contracts is stood; and the lower surface at the rear of the elastic member 121 is bonded to the upper surface of the piezoelectric actuator 125.

Figure 44B:
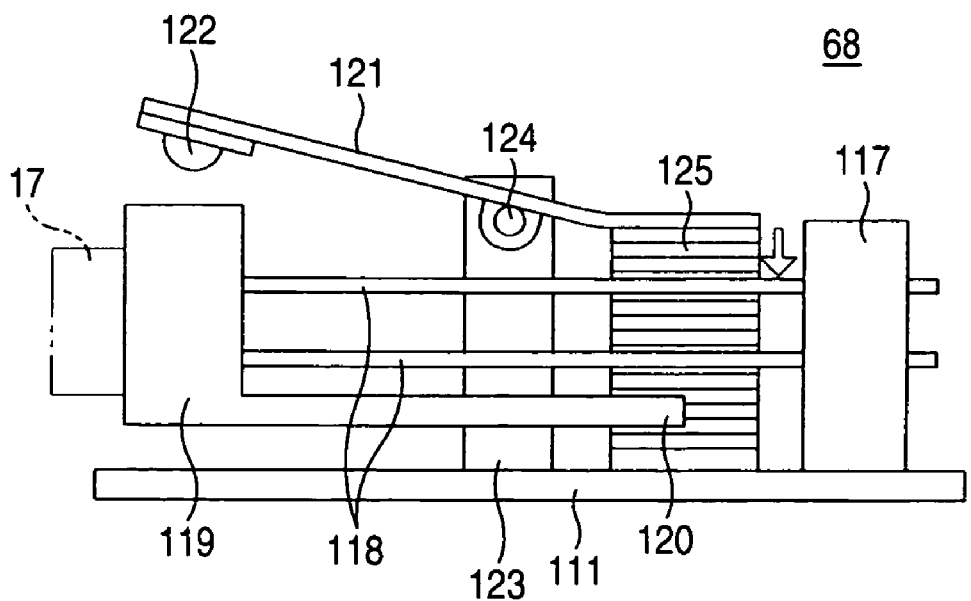

Thus, in a condition that the piezoelectric actuator 125 is not applied with voltage, as shown in FIG. 44(a), the rear of the elastic member 121 is pressed up, and the front of the elastic member 121 is rotated downward due to the principles of the lever, thereby the projection 122 is elastically pressed against the upper surface of the movable part 119. As a result, the movable part 119 is lowered and pressed against the substrate 111 and thus locked. On the contrary, when the piezoelectric actuator 125 is applied with voltage and thus the piezoelectric actuator 125 is contracted, as shown in FIG. 44(b), the rear of the elastic member 121 is pulled down, and the front of the elastic member 121 is raised upward due to the principles of the lever, thereby the projection 122 is separated from the upper surface of the movable part 119. As a result, the movable part 119 is raised upward by the linear springs 118, and the movable part 119 is moved laterally, thereby the light attenuation can be adjusted by the mirror member 17.

(Structure of Still Another Latch Mechanism)

Figure 45A:
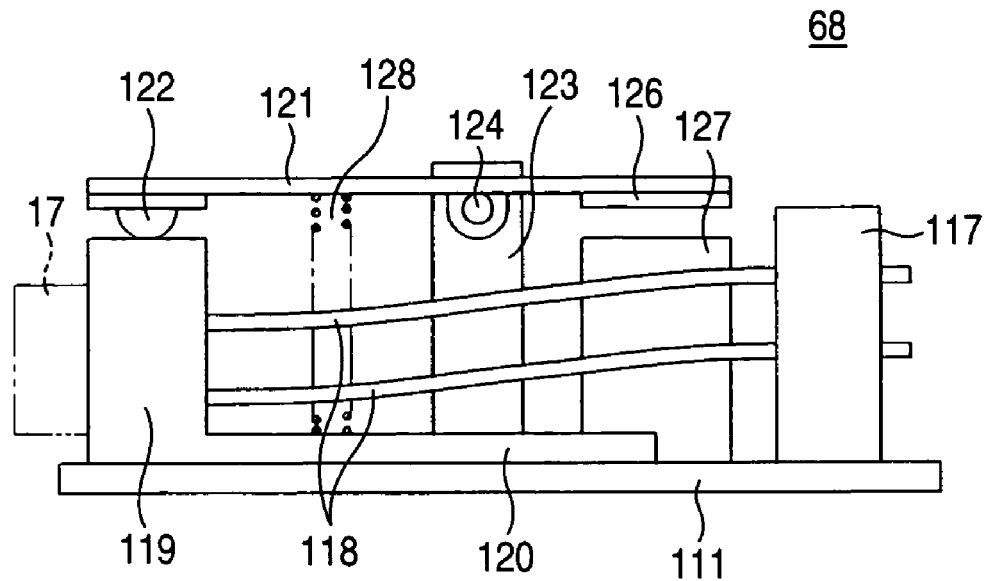
FIGS. 45(a) and (b) are side views showing a latch mechanism having still another mechanism.

FIGS. 45(a) and (b) are side views for illustrating a structure and operation of a still another latch mechanism 68. In the latch mechanism 68 according to the embodiment, an electromagnet 127 is used instead of using the movable part. That is, again in the embodiment, a pair of posts 123 are stood on both side edges of the substrate 111, and both ends of the rotational axis 124 fixed to the lower surface at the center of the elastic member 121 are rotatably supported by the posts 123. The projection 122 provided on the lower surface at the front end of the elastic member 121 is opposed to the upper surface of the movable part 119, and the lower surface at the rear end of the elastic member 121 is bound with a magnetic adsorption strip 126 such as iron strip. An electromagnet (electromagnetic coil) is stood on the upper surface at the rear of the substrate 111; and the magnetic adsorption strip 126 provided on the lower surface at the rear of the elastic member 121 is opposed to the electromagnet 127. Compression springs 128 are stretched between the lower surface at the front of the elastic member 121 and the upper surface of the substrate 111, and the front of the elastic member 121 is biased by the compression springs 128 such that it is pulled downward.

Figure 45B:
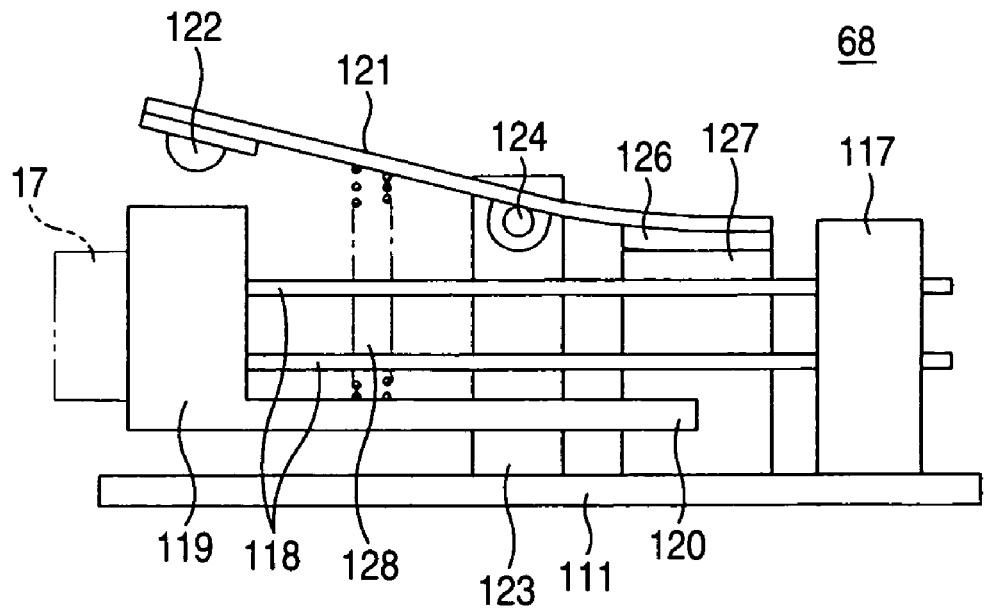

Thus, as shown in FIG. 45(a), when the electromagnet 127 is demagnetized, since the front of the elastic member 121 is pulled downward by the elastic force of the compression spring 128, the projection 122 is pressed against the upper surface of the movable part 119. As a result, the movable part 119 is lowered and pressed against the substrate 111 and thus locked. On the contrary, as shown in FIG. 45(b), when the electromagnet 127 is excited, since the magnetic adsorption strip 126 provided on the rear end face of the elastic member 121 is adsorbed by the electromagnet 127 against the elastic force of the compression spring 128, the front of the elastic member 121 is raised upward due to the principles of the lever, thereby the projection 122 is separated from the upper surface of the movable part 119. As a result, the movable part 119 is raised upward by the linear springs 118. Accordingly, the movable part 119 is moved laterally by the actuator, thereby the light attenuation can be adjusted by the mirror member 17.

(Specific Products)

Figure 46:
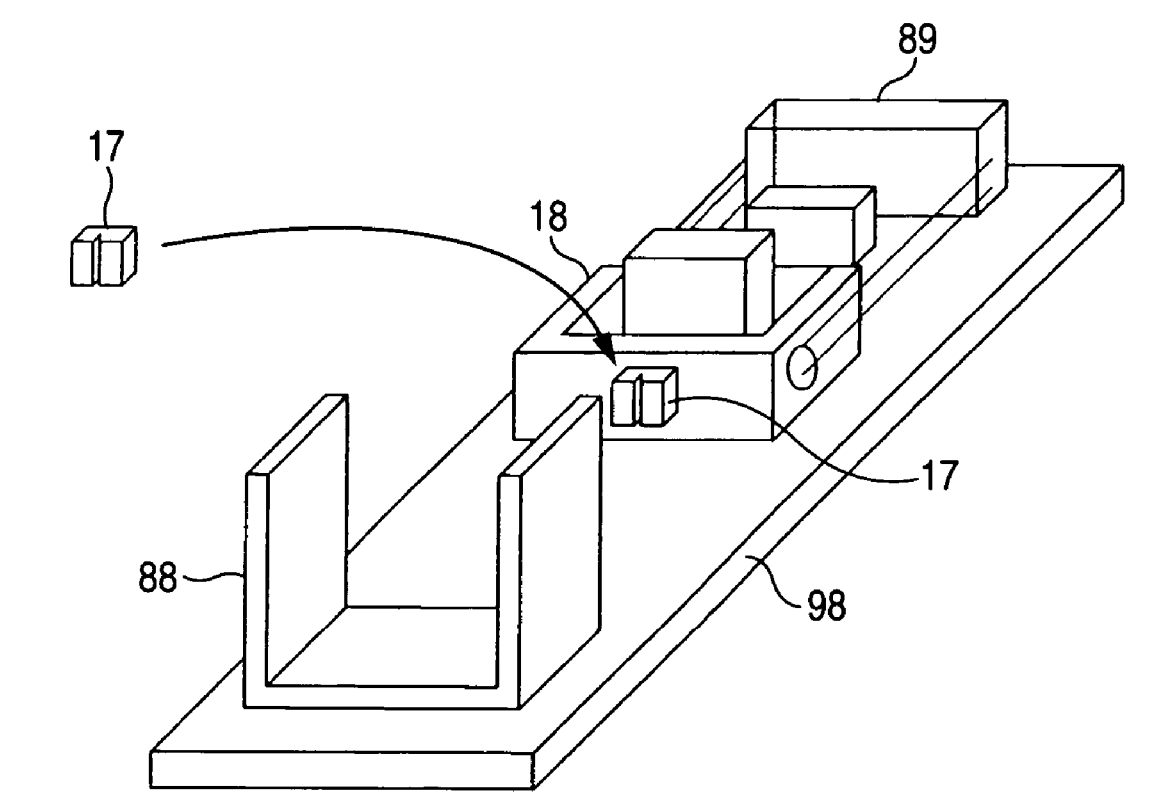
FIG. 46 is a view showing an assembling procedure of a specific product of the variable optical attenuator.
Figure 47:
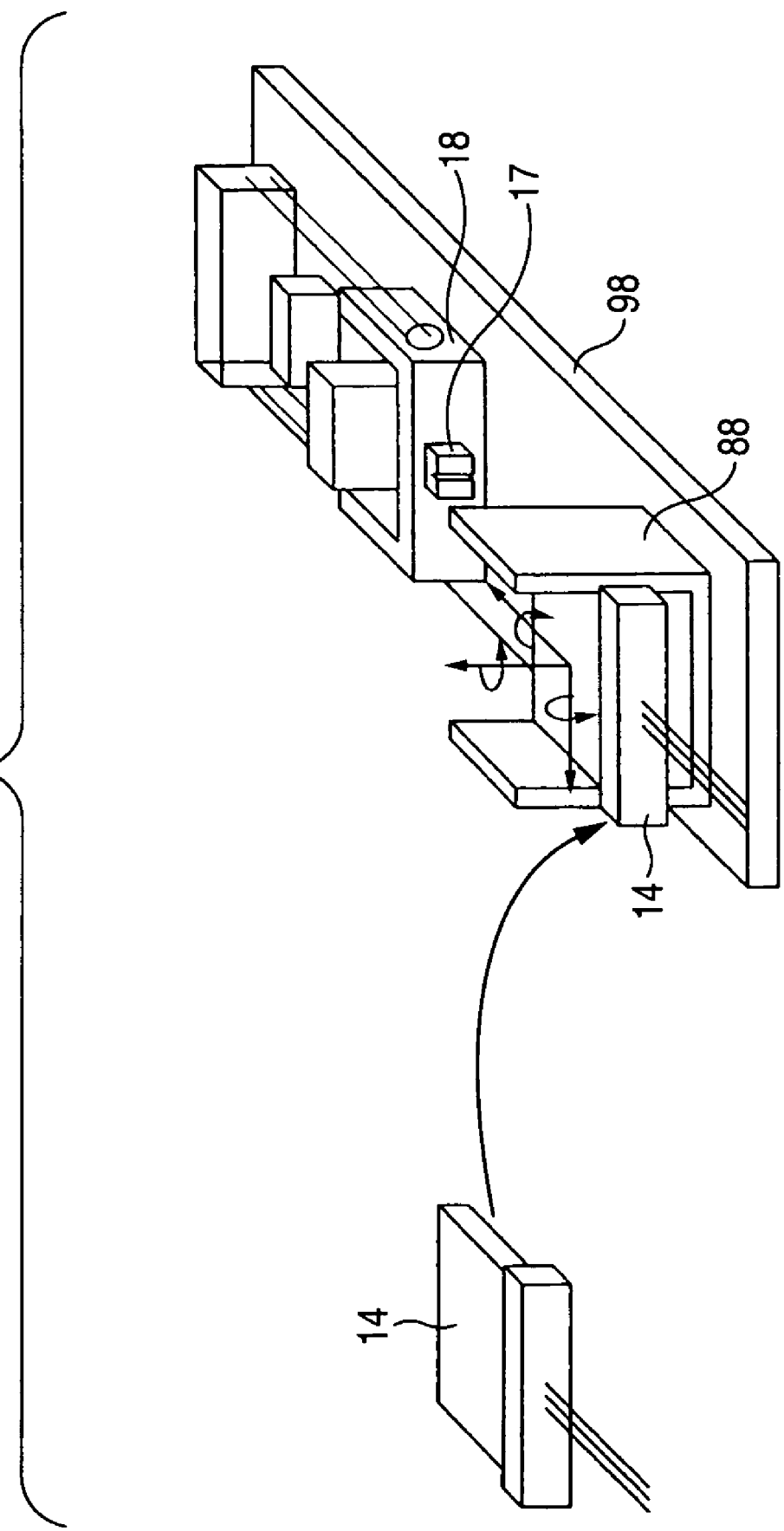
FIG. 47 is a continuance view of FIG. 46.
Figure 48:
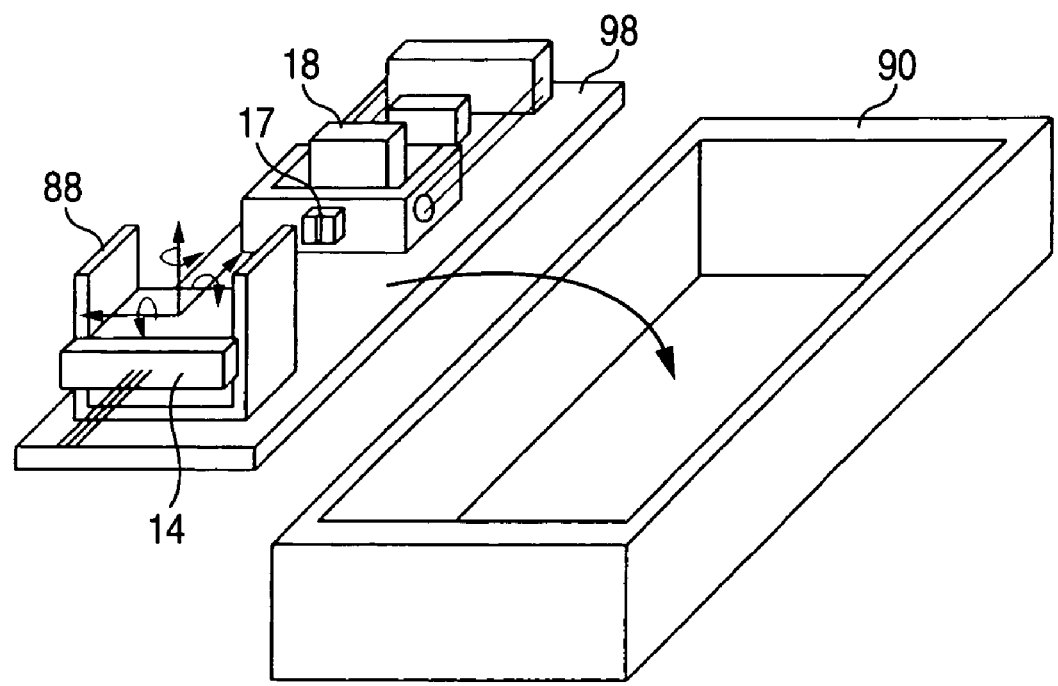
FIG. 48 is a continuance view of FIG. 47.

FIG. 46 to FIG. 48 show an assembling procedure of a specific product of the variable optical attenuator. In the assembling, a fiber-array holding part 88, the actuator 18, and a latch mechanism 89 as required have been previously mounted. Then, as shown in FIG. 46, the mirror member 17 is attached and fixed to the actuator 18. Then, as shown in FIG. 47, a fiber array 14 is mounted in the fiber-array holding part 88, and aligned while light is emitted from the optical fiber for input 12, and after a position of the fiber array 14 is determined, the fiber array 14 is fixed to the fiber-array holding part 88. Then, as shown in FIG. 48, the substrate 98 mounted with the fiber array 14, mirror member 17, and actuator 18 is contained in a package 90.

Figure 49:
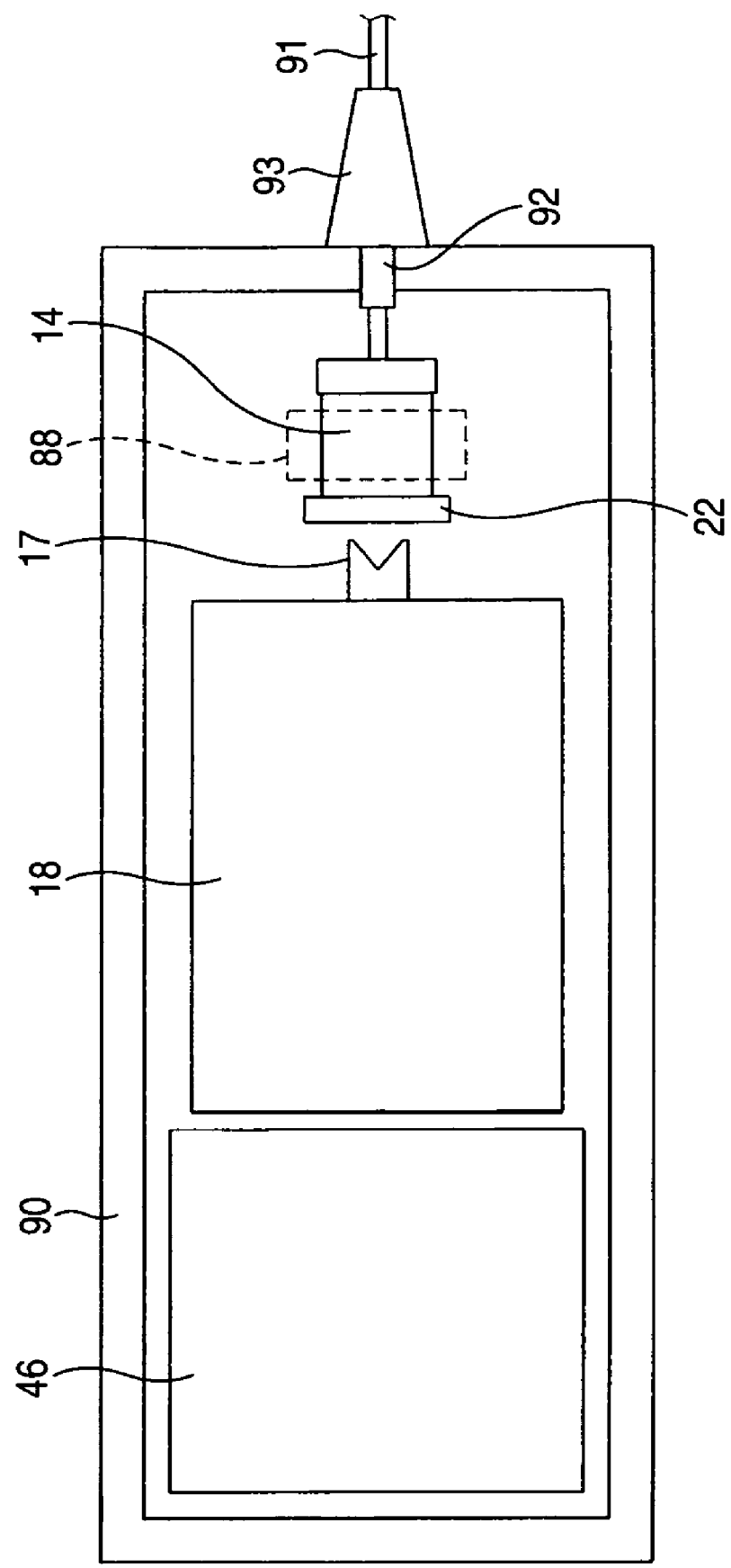
FIG. 49 is a view indicating an example of a specific product configuration of the variable optical attenuator.

FIG. 49 indicates an example of a specific product configuration. It is an example of a configuration without the control circuit. The actuator 18 is fixed in the package 90, and the mirror member 17 is attached to the actuator 18. The fiber array 14 is mounted in the fiber-array holding part 88, opposing to the mirror member 17. Optical fibers 91 (such as the optical fiber for input 12 and the optical fiber for output 13) in the fiber array 14 are led out externally to the package 90 through a connector 92 and a cover 93. The drive circuit 46 of the actuator 18 is also contained in the package 90.

Figure 50:
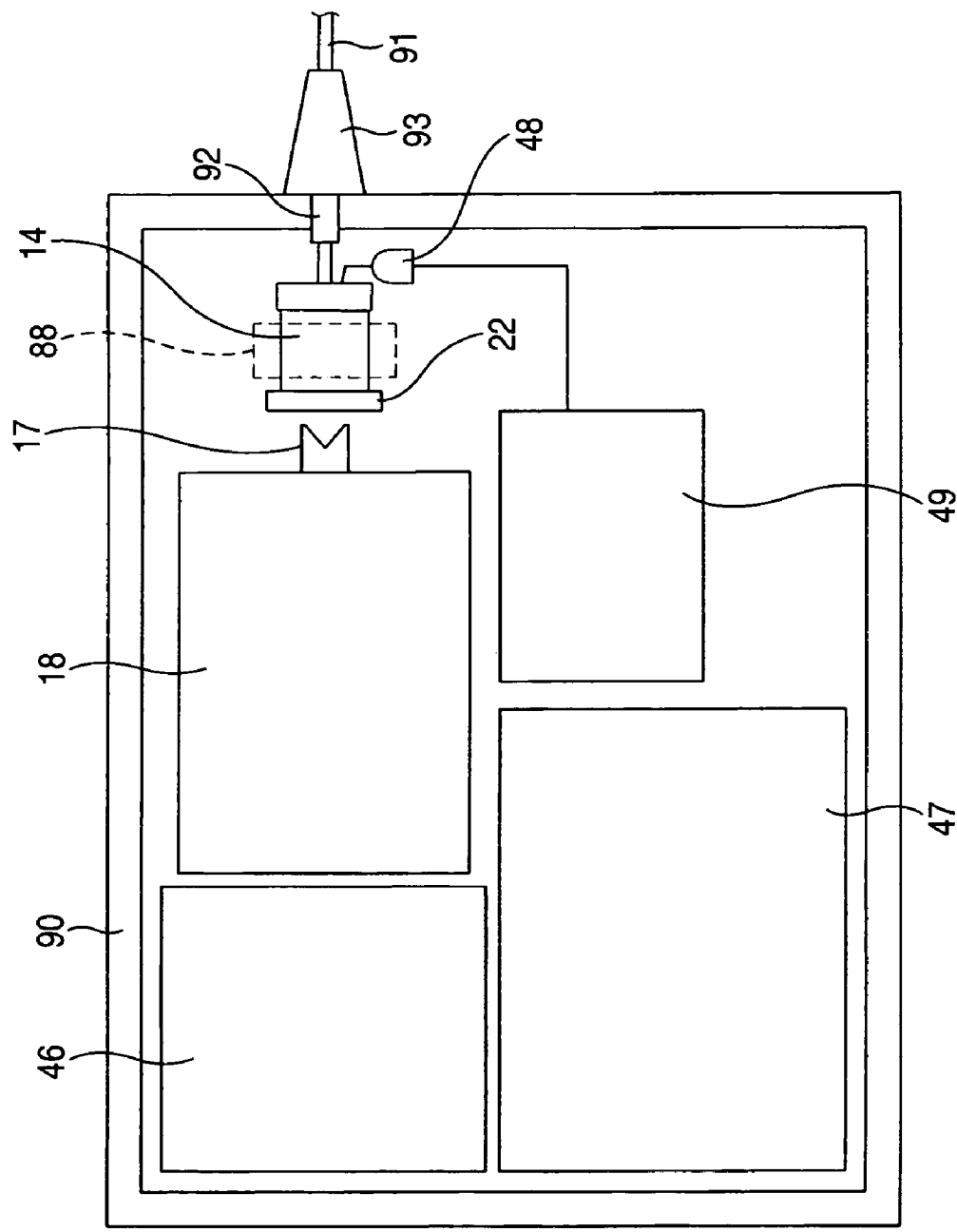
FIG. 50 is a view showing an example of a specific product configuration of the variable optical attenuator.

FIG. 50 is an example of a specific configuration with the control circuit. In the example, in addition to the components in FIG. 49, the photo detector for monitoring 48, amplification circuit 49, and control circuit 47 are contained in the package 90.

Figure 51:
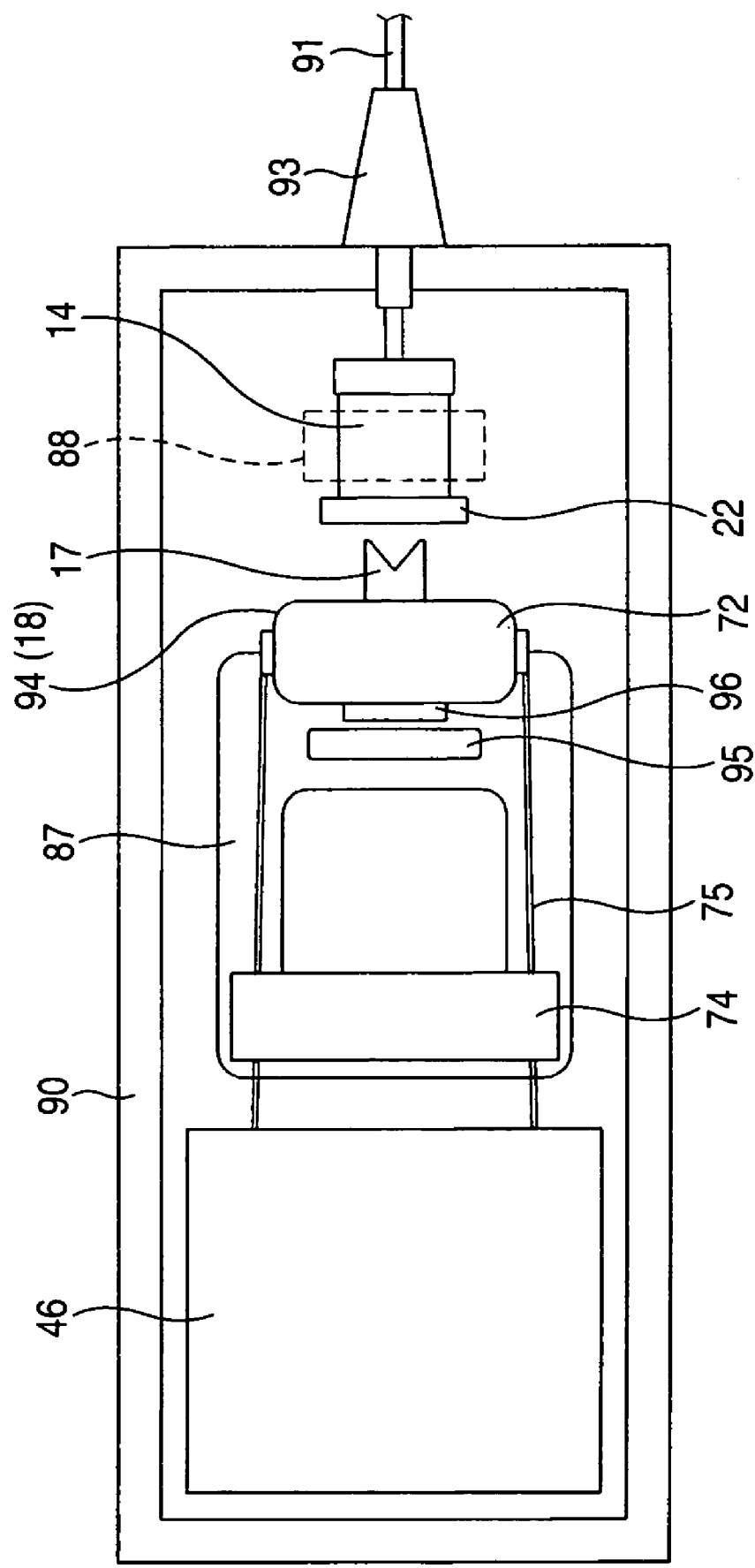
FIG. 51 is a view showing an example of a specific product configuration of the variable optical attenuator.

FIG. 51 shows a more specified configuration of the configuration in FIG. 49. That is, the voice coil motor 94 is used as the actuator 18. That is, the voice coil 96 is opposed to the magnet 95 fixed to the base 87, and the voice coil 96 is fixed to the movable part 72. The mirror member 17 is also fixed to the movable part 72. While the latch mechanism 68 having a structure as shown in FIG. 33 is used as the latch mechanism, only the holding part 74, wire 75, and movable part 72 are shown in FIG. 51, and the flat spring 69, coil 70, and magnet 71 are omitted. The wire 75 the rear anchor of which is held by the holding part 74 has elasticity, and raise the movable part 72 attached to its front end upward. The movable part 72 is slidable along the wire 75.

Thus, when the mirror member 17 is latched so that it does not move, the flat spring 69 presses the movable part 72 against the base 87. In the case that the mirror member 17 is moved, when the coil 70 is excited to raise the front end of the flat spring 69 (see FIG. 33), the movable part 72 is raised from the base 87 by the wire 75, and the voice coil 96 is opposed to the magnet 95. Then, when the voice coil 96 is excited, the voice coil 96 slides together with the movable part 72, and the position of the mirror member 17 is adjusted.

Figure 52:
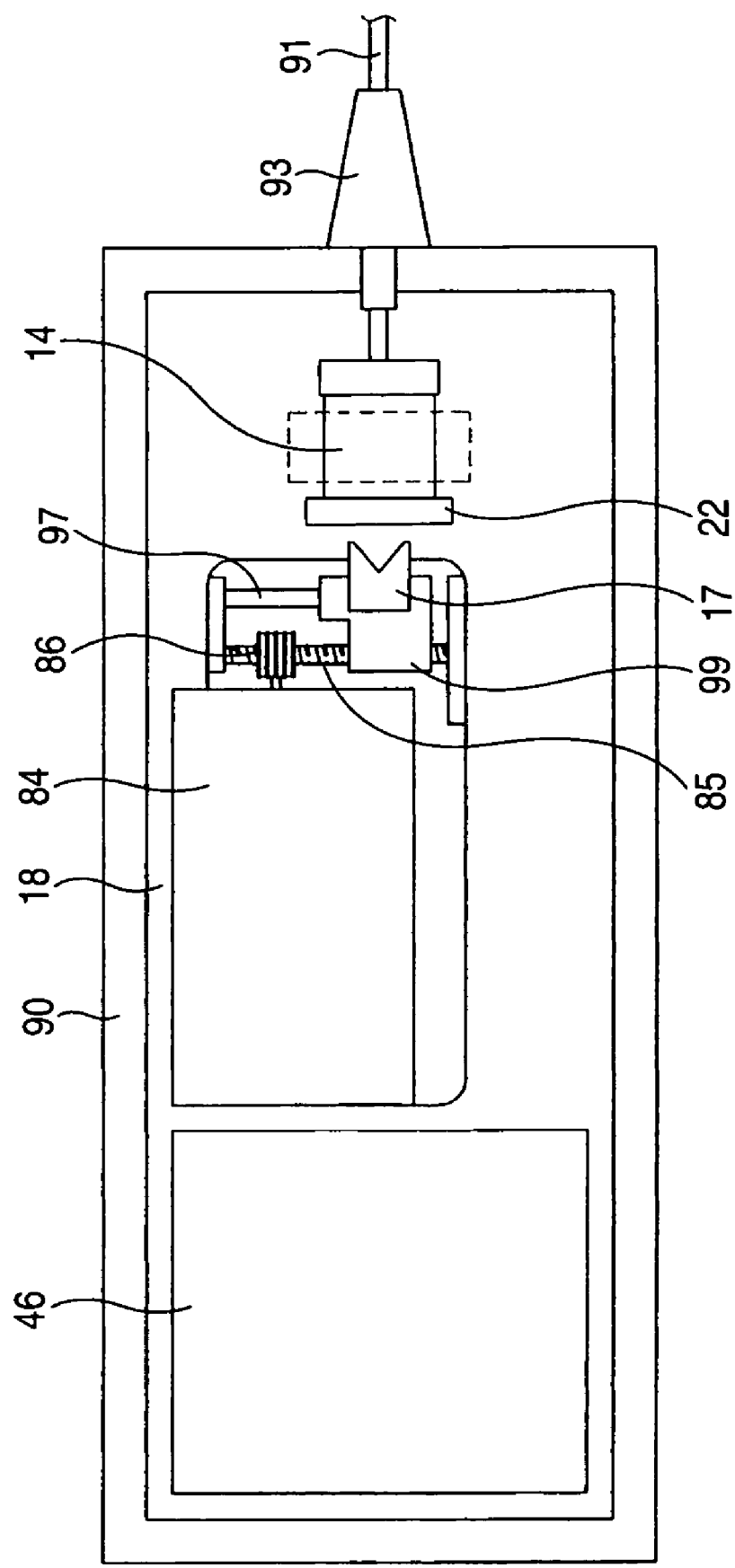
FIG. 52 is a view showing an example of a specific product configuration of the variable optical attenuator.

FIG. 52 also shows a more specified configuration of the configuration in FIG. 49, which employs the actuator having a structure as in FIG. 37 that comprises the stepping motor 84, lead screw 85, and worm gear 86. However, the lead screw 85 is rotated via the worm gear 86, thereby the stage 99 is moved along the lead screw 85, and the mirror member 17 is fixed on the stage 99. In addition, the guide pin 97 is inserted into the stage 99, thereby the stage 99 is guided and can be smoothly moved.

Next, a special use of the variable optical attenuator is described. FIG. 53 shows a variable optical attenuator 100 that can be used as an on/off switch by making the light attenuation by the attenuator to be binary, that is, 0% and 100%. While the variable optical attenuator 100 has the same structure as the variable optical attenuator 11 according to the first embodiment shown in FIG. 3 and the like, the mirror member 17 quickly moves by the actuator 18 between a condition where all the beams are injected into the injection lens 24 as shown in FIG. 53(a) and a condition where all the beams deviates from the injection lens 24 as shown in FIG. 53(b), and it does not stop at an intermediate state. For example, a mechanism such as reversing spring can be added. Such a variable optical attenuator 100 can be considered as a special variable optical attenuator 100 in which the light attenuation is set to be binary, and can be used as the on/off switch.

Figure 54A:
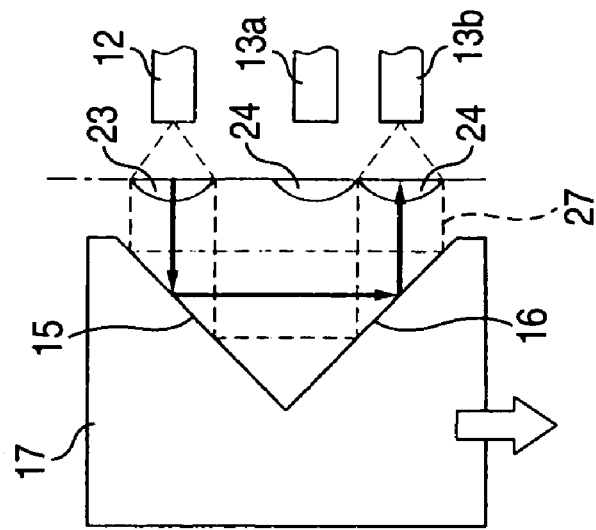
FIGS. 54(a), (b) and (c) are schematic plan views showing a configuration of a variable optical attenuator according to still another embodiment of the invention.
Figure 54B:
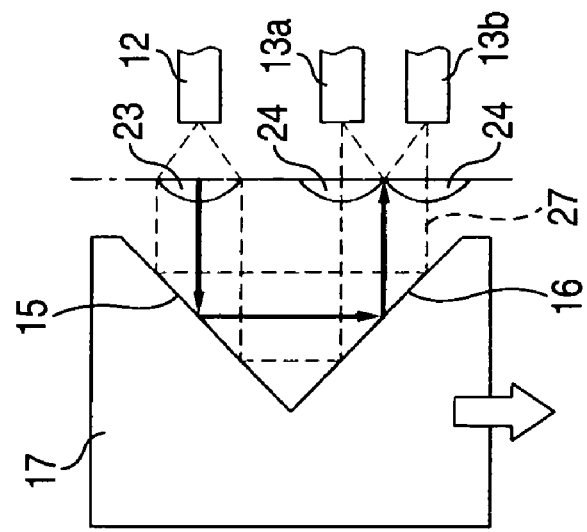
Figure 54C:
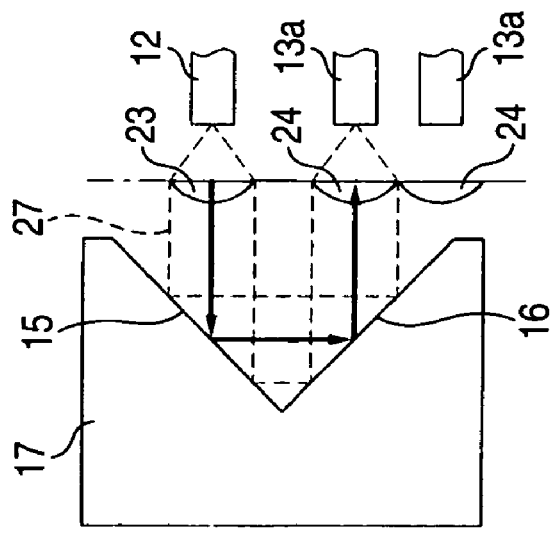

FIG. 54 shows a variable optical attenuator 101 in which two optical fibers for output are provided parallel and, which can be used as a variable splitter. That is, two optical fibers for output 13a, 13b are held parallel to each other at an output side of the fiber array 14, and injection lenses 24 are provided opposing to end faces of both the optical fibers for output 13a, 13b respectively. Thus, when the mirror member 17 is located at a position in FIG. 54(a), 100% of the light emitted from the optical fiber for input 12 is injected into the optical fiber for output 13a; when the mirror member 17 is located at a position in FIG. 54(b), the light emitted from the optical fiber for input 12 is injected into the optical fiber for output 13a and the optical fiber for output 13b in a ratio according to a position of the mirror member 17; and when the mirror member 17 is located at a position in FIG. 54(c), 100% of the light emitted from the optical fiber for input 12 is injected into the optical fiber for output 13b. Therefore, the variable optical attenuator 101 can optionally change a division ratio between the optical fiber for output 13a and the optical fiber for output 13b by sliding the mirror member 17, and can be used as the variable splitter.

Figure 55A:
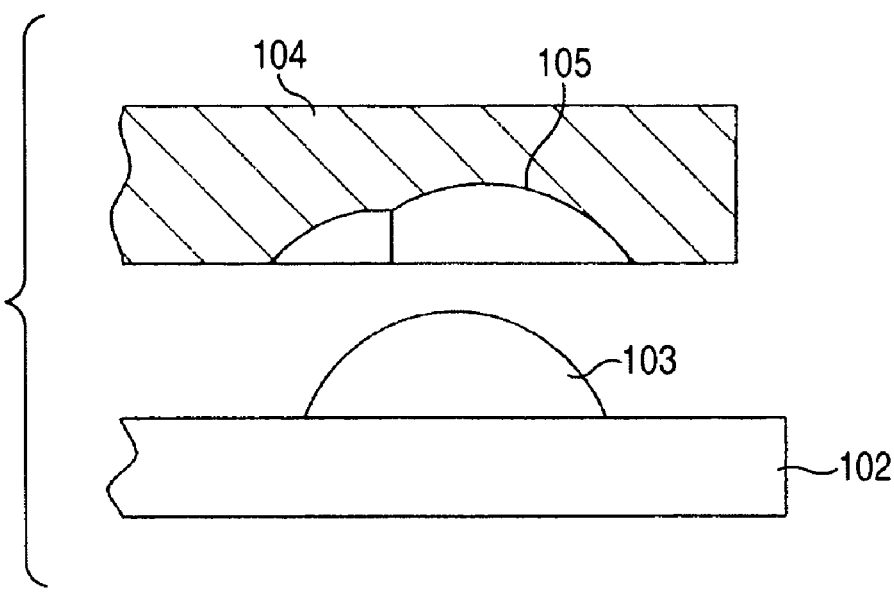
FIGS. 55(a), (b) and (c) are schematic views for illustrating a method for manufacturing the hybrid lens.
Figure 55B:
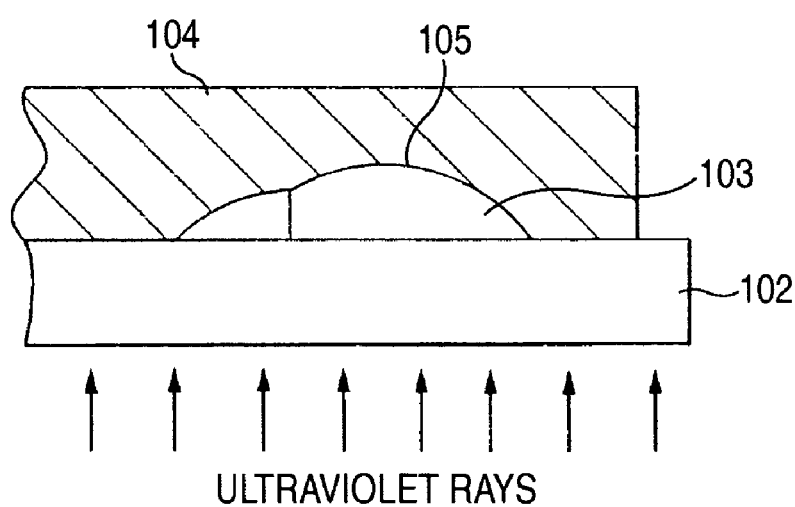
Figure 55C:
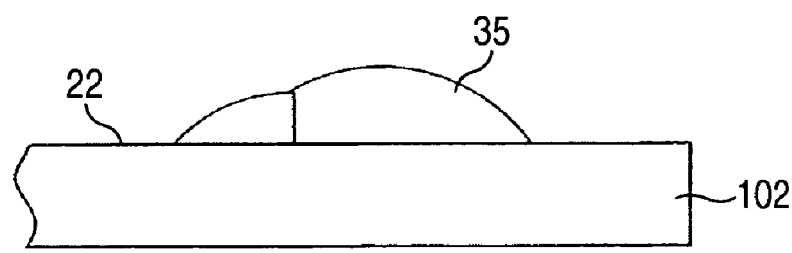

FIGS. 55(a), (b) and (c) are schematic views for illustrating a method for producing the hybrid lens 35. It is a so-called 2P (Photo-Polymerization) method, wherein ultraviolet curing resin is used to mold the lens. First, as shown in FIG. 55(a), a certain quantity of ultraviolet curing resin 103 is dropped on a glass substrate 102 using a syringe and the like. Then, a stumper 104 is laid on the glass substrate 102 from a top of the ultraviolet curing resin 103. A concave mold 105 having an inversion pattern of the hybrid lens 35 has been previously provided on a lower surface of the stumper 104. Then, the stumper 104 is pressed against the glass substrate 102, thereby the ultraviolet curing resin 103 is spread out in the concave mold 105 in the stumper 104. Then, as shown in FIG. 55(b), the ultraviolet curing resin 103 is irradiated with ultraviolet rays through the glass substrate 102, and the hybrid lens 35 is molded by curing the ultraviolet curing resin 103. When the stumper 104 is peeled from the glass substrate 102, the hybrid lens 35 as a whole is integrally molded by the ultraviolet curing resin 103 on an upper surface of the glass substrate 102. Although only molding of the hybrid lens 35 is described here, the emission lens 23 and the injection lens 24 are similarly molded together with the hybrid lens 35. Accordingly, the lens array 22 is produced.

To produce the stumper 104, an original mold having the same pattern as the hybrid lens 35 is produced by, for example, laser processing, and then an inversion mold is produced by depositing Ni and the like on the original mold by an electroforming method and the like. The same concave mold pattern as the concave mold 105 in the stumper 104 is formed in the inversion mold peeled from the original mold. Then, duplication of the original mold is produced from the inversion mold, and the stumper 104 is produced from the duplication.

Numerical values written in the description of the embodiments are merely an example, and the invention is not intended to be limited to the above numerical values. In addition, while the optical fiber is used as an optical transmission channel in the embodiments, the optical waveguide channel can be used without problems.

According to the variable optical attenuator of the invention described hereinbefore, the light reflection surface for reflecting the light emitted from the optical transmission channel for input is straightly moved by the actuator, thereby the optical axis of the light injected into the optical transmission channel for output can be moved relatively to the optical transmission channel for output, and thereby the light attenuation can be varied. Therefore, since it has a simple structure that the light reflection surface for reflecting the light emitted from the optical transmission channel for input is only straightly moved by the actuator, the variable optical attenuator can be miniaturized. In addition, because of only straightly moving the light reflection surface, the light attenuation does not sensitively respond to variation during moving the light reflection surface, and the light attenuation can be accurately controlled.

Accordingly, according to the invention, the light attenuation can be controlled in a simple structure, therefore the variable optical attenuator can be produced at low price.

INDUSTRIAL APPLICABILITY

The invention can be used for an application such as relatively short-distance optical-transmission or transmission of data or signals through optical fibers which connects the household devices to each together.

The invention claimed is:

1. A variable optical attenuator able to adjust optical attenuation, comprising:
a first optical transmission channel;
a second optical transmission channel;
at least one light reflection surface; and
an actuator, wherein
the at least one light reflection surface reflects light emitted from the first optical transmission channel into the second transmission channel, and
the actuator moves an entirety of the at least one light reflection surface linearly along a direction orthogonal to a light axis of the light emitted from the first optical transmission channel, relative to at least one of the first optical transmission channel and the second optical transmission channel.

2. The variable optical attenuator according to claim 1, wherein the actuator comprises a voice coil motor and a latch mechanism.

3. The variable optical attenuator according to claim 1, further comprising a fiber array that holds the first optical transmission channel and the second optical transmission channel arranged parallel to each other.

4. The variable optical attenuator according to claim 1, wherein the at least one light reflection surface is formed from a boundary face between transparent media having different refractive indicia and perfectly reflects light.

5. A variable optical attenuator that attenuates light injected from an optical transmission channel for input and outputs the light into an optical transmission channel for output and that can adjust optical attenuation, wherein
the optical transmission channel for input, the optical transmission channel for output, light reflection surfaces that reflect light emitted from the optical transmission channel for input to the optical transmission channel for output, and an actuator that moves all or part of the light reflection surfaces relatively and straightly to at least one of the optical transmission channel for input or the optical transmission channel for output, and
the actuator moves straightly one of at least part of the light reflection surfaces, and any one of the optical transmission channel for input and the optical transmission channel for output such that an optical axis of the light reflected to the optical transmission channel for emission is displaced with respect to an axis center of the optical transmission channel for emission.

6. A variable optical attenuator that attenuates light injected from an optical transmission channel for input and outputs the light into an optical transmission channel for output and that can adjust optical attenuation, wherein
the optical transmission channel for input, the optical transmission channel for output, light reflection surfaces that reflect light emitted from the optical transmission channel for input to the optical transmission channel for output, and an actuator that moves all or part of the light reflection surfaces relatively and straightly to at least one of the optical transmission channel for input or the optical transmission channel for output, and further comprising:
a monitor part that receives light which is emitted from the transmission channel for input but not injected into the optical transmission channel for output.

7. The variable optical attenuator according to claim 6, wherein an injection lens disposed oppositely to a light injection surface of the optical transmission channel for output and a monitor lens disposed oppositely to a light injection surface of the monitor part are unified.

8. The variable optical attenuator according to claim 6, which has a function of correcting a position of the light reflection surfaces depending on output from the monitor part.

9. A variable optical attenuator that attenuates light injected from an optical transmission channel for input and outputs the light into an optical transmission channel for output and that can adjust optical attenuation, wherein
the optical transmission channel for input, the optical transmission channel for output, light reflection surfaces that reflect light emitted from the optical transmission channel for input to the optical transmission channel for output, and an actuator that moves all or part of the light reflection surfaces relatively and straightly to at least one of the optical transmission channel for input or the optical transmission channel for output, and further comprising:
a mirror member having the light reflection surfaces that are two surfaces making an angle of 90 degrees, and the actuator that straightly moves the mirror member.

* * * * *